US012098108B2

(12) United States Patent
Rogers et al.

(10) Patent No.: US 12,098,108 B2
(45) Date of Patent: Sep. 24, 2024

(54) INTELLIGENT SENSOR-DRIVEN PROCESSING OF ORGANIC MATTER FOR THE SMART HOME

(71) Applicant: Chewie Labs LLC, San Bruno, CA (US)

(72) Inventors: Matthew Lee Rogers, San Francisco, CA (US); Harry E. Tannenbaum, San Francisco, CA (US); Adam Mittleman, Redwood City, CA (US); Jaideep Singh Chavan, Mountain View, CA (US); Ismail Uluturk, San Francisco, CA (US); Kelly Joan Veit, San Francisco, CA (US); Congyue Zhang, San Jose, CA (US); Alyssa Noelle Pollack, Lone Tree, CO (US); Geoffrey Becker Hill, Seattle, WA (US); Benjamin Joseph Chia, Sunnyvale, CA (US)

(73) Assignee: Chewie Labs LLC, San Bruno, CA (US)

( * ) Notice: Subject to any disclaimer, the term of this patent is extended or adjusted under 35 U.S.C. 154(b) by 220 days.

(21) Appl. No.: 17/897,499

(22) Filed: Aug. 29, 2022

(65) Prior Publication Data

US 2023/0083105 A1    Mar. 16, 2023

Related U.S. Application Data

(60) Provisional application No. 63/239,852, filed on Sep. 1, 2021.

(51) Int. Cl.
*B02C 25/00*    (2006.01)
*B02C 18/00*    (2006.01)
(Continued)

(52) U.S. Cl.
CPC ........ *C05F 17/907* (2020.01); *B02C 18/0092* (2013.01); *B02C 19/186* (2013.01);
(Continued)

(58) Field of Classification Search
CPC ... B02C 25/00; B02C 19/186; B02C 18/0092; B09B 3/35
See application file for complete search history.

(56) References Cited

U.S. PATENT DOCUMENTS 5,340,536 A    8/1994 Datar et al.
5,634,600 A    6/1997 Kubota et al.
(Continued)

FOREIGN PATENT DOCUMENTS

EP    0791568    8/1997
JP    2002-001262    1/2002
(Continued)

OTHER PUBLICATIONS

Jayalakshmi et al., "Waste to Wealth—A Novel Approach for Food Waste Management"; published in: 2017 IEEE International Conference on Electrical, Instrumentation and Communication Engineering (ICEICE); Date of Conference: Apr. 27-28, 2017.
(Continued)

*Primary Examiner* — Faye Francis
(74) *Attorney, Agent, or Firm* — Van Court & Aldridge LLP

(57) ABSTRACT

Embodiments disclosed herein provide an organic matter processing apparatus and method for the use thereof to convert organic matter into a ground and desiccated product. This can be accomplished using a bucket assembly that can grind, paddle, and heat organic matter contained therein. An algorithm is used to control the conversion of organic input to organic output by progressing through processing states based, in part, on time windows, runtimes, and sensor inputs.

34 Claims, 45 Drawing Sheets

(51) Int. Cl.
  *B02C 19/18*   (2006.01)
  *B09B 3/35*    (2022.01)
  *B09B 3/40*    (2022.01)
  *C05F 9/02*    (2006.01)
  *C05F 9/04*    (2006.01)
  *C05F 17/60*   (2020.01)
  *C05F 17/907*  (2020.01)
  *C05F 17/964*  (2020.01)
  *B02C 18/06*   (2006.01)
  *B02C 18/16*   (2006.01)
  *B09B 101/70*  (2022.01)

(52) U.S. Cl.
  CPC ............ *B09B 3/35* (2022.01); *B09B 3/40* (2022.01); *C05F 9/02* (2013.01); *C05F 9/04* (2013.01); *C05F 17/60* (2020.01); *C05F 17/964* (2020.01); *B02C 18/0084* (2013.01); *B02C 18/067* (2013.01); *B02C 2018/162* (2013.01); *B02C 25/00* (2013.01); *B09B 2101/70* (2022.01)

(56) References Cited

U.S. PATENT DOCUMENTS

| | | | |
|---|---|---|---|
| 6,150,939 A | 11/2000 | Lin | |
| 7,240,865 B2 | 7/2007 | Choi | |
| 9,308,535 B2 | 4/2016 | Delgado et al. | |
| 9,494,319 B2 * | 11/2016 | Sutton | B02C 25/00 |
| 9,597,620 B2 | 3/2017 | Verdegan et al. | |
| 9,895,726 B1 | 2/2018 | Atkinson et al. | |
| 10,065,196 B1 | 9/2018 | Tran et al. | |
| 10,906,046 B2 | 2/2021 | Crepeau et al. | |
| 11,241,694 B2 | 2/2022 | Crepeau et al. | |
| 11,278,908 B2 | 3/2022 | Crepeau et al. | |
| 11,389,804 B2 | 7/2022 | Hayman et al. | |
| 11,541,397 B2 | 1/2023 | Crepeau et al. | |
| 2003/0155228 A1 | 8/2003 | Mills | |
| 2004/0175303 A1 | 9/2004 | Lin | |
| 2004/0251339 A1 | 12/2004 | Strutz | |
| 2004/0265197 A1 | 12/2004 | Lin | |
| 2007/0190212 A1 | 8/2007 | Lee | |
| 2008/0067270 A1 | 3/2008 | Strutz | |
| 2009/0113791 A1 | 5/2009 | Bertin et al. | |
| 2009/0200180 A1 | 8/2009 | Capote | |
| 2010/0140248 A1 | 6/2010 | Yi et al. | |
| 2011/0020184 A1 | 1/2011 | Sun | |
| 2011/0062259 A1 | 3/2011 | Gregoire | |
| 2011/0151553 A1 | 6/2011 | Cruson et al. | |
| 2012/0021504 A1 | 1/2012 | Bradlee | |
| 2012/0034350 A1 | 2/2012 | Gard et al. | |
| 2012/0298658 A1 | 11/2012 | Bosetti et al. | |
| 2013/0217111 A1 | 8/2013 | Chang | |
| 2013/0263786 A1 | 10/2013 | Meisel, III et al. | |
| 2014/0117126 A1 | 5/2014 | Ceru et al. | |
| 2015/0196920 A1 | 7/2015 | Celli et al. | |
| 2015/0376882 A1 | 12/2015 | Park | |
| 2016/0022112 A1 | 1/2016 | Davenport | |
| 2016/0207845 A1 | 7/2016 | Delgado et al. | |
| 2016/0295906 A1 | 10/2016 | Jacobsen et al. | |
| 2017/0197857 A1 | 7/2017 | Whitener et al. | |
| 2017/0226466 A1 | 8/2017 | Grillo et al. | |
| 2017/0260111 A1 | 9/2017 | Maghas et al. | |
| 2017/0349501 A1 | 12/2017 | Buzruk | |
| 2018/0093814 A1 | 4/2018 | Espinosa | |
| 2018/0148391 A1 | 5/2018 | Ashbee et al. | |
| 2018/0281034 A1 * | 10/2018 | Lavallee | B02C 23/36 |
| 2019/0030544 A1 | 1/2019 | Kratzer, III et al. | |
| 2019/0083989 A1 | 3/2019 | Tran et al. | |
| 2019/0152698 A1 | 5/2019 | Zhao | |
| 2020/0001389 A1 | 1/2020 | Ryan et al. | |
| 2020/0147617 A1 | 5/2020 | Atkinson et al. | |
| 2020/0148604 A1 | 5/2020 | Atkinson et al. | |
| 2020/0329719 A1 * | 10/2020 | Subbiah | A21C 1/12 |
| 2020/0353473 A1 | 11/2020 | Hayman et al. | |
| 2020/0353474 A1 | 11/2020 | Crepeau et al. | |
| 2021/0154676 A1 | 5/2021 | Crepeau et al. | |
| 2022/0242799 A1 | 8/2022 | Ying et al. | |
| 2022/0347693 A1 | 11/2022 | Hayman et al. | |
| 2023/0142555 A1 | 5/2023 | Hotte et al. | |
| 2023/0149939 A1 | 5/2023 | Crepeau et al. | |

FOREIGN PATENT DOCUMENTS

| | | | |
|---|---|---|---|
| JP | 2004-216253 | 12/2004 | |
| JP | 2006255592 | 9/2006 | |
| KR | 19980047631 | 9/1998 | |
| KR | 100692243 | 3/2007 | |
| KR | 100694645 B1 | 3/2007 | |
| KR | 100694646 B1 | 3/2007 | |
| KR | 20090123375 | 12/2009 | |
| KR | 101017615 B1 | 2/2011 | |
| KR | 101017616 B1 | 2/2011 | |
| KR | 101053035 B1 | 8/2011 | |
| KR | 101187381 | 10/2012 | |
| KR | 101332453 | 11/2013 | |
| KR | 101461608 | 12/2014 | |
| KR | 20150112689 | 10/2015 | |
| KR | 102474495 B1 | 4/2016 | |
| KR | 20160044110 | 4/2016 | |
| KR | 101866863 | 6/2018 | |
| KR | 300966490 S | 7/2018 | |
| KR | 101882829 B1 | 8/2018 | |
| KR | 101884662 B1 | 8/2018 | |
| KR | 101921624 B1 | 11/2018 | |
| KR | 101941620 | 1/2019 | |
| KR | 301095230 S | 2/2021 | |
| KR | 301109396 S | 5/2021 | |
| KR | 301109397 S | 5/2021 | |
| KR | 301109403 S | 5/2021 | |
| KR | 301109404 S | 5/2021 | |
| KR | 301154947 S | 3/2022 | |
| KR | 301140601 S | 12/2022 | |
| KR | 301202238 S | 2/2023 | |
| KR | 1020230060939 A | 5/2023 | |
| KR | 301223966 S | 11/2023 | |
| WO | WO2008030997 | 3/2008 | |
| WO | WO2009157744 | 12/2009 | |
| WO | WO2015182929 | 3/2015 | |
| WO | WO2016060290 | 4/2016 | |
| WO | WO2016102947 | 6/2016 | |
| WO | WO2017083944 | 5/2017 | |
| WO | WO-2018036978 A1 * | 3/2018 | ............ B02C 25/00 |
| WO | WO-2020245915 A1 * | 12/2020 | ............ B02C 25/00 |
| WO | WO2022055212 A1 | 3/2022 | |

OTHER PUBLICATIONS

Zhu, "Food Waste Drum Sieve Design"; Mar. 26, 2015; Technology, Communication and Transport; Sovonia University of Applied Sciences.

* cited by examiner

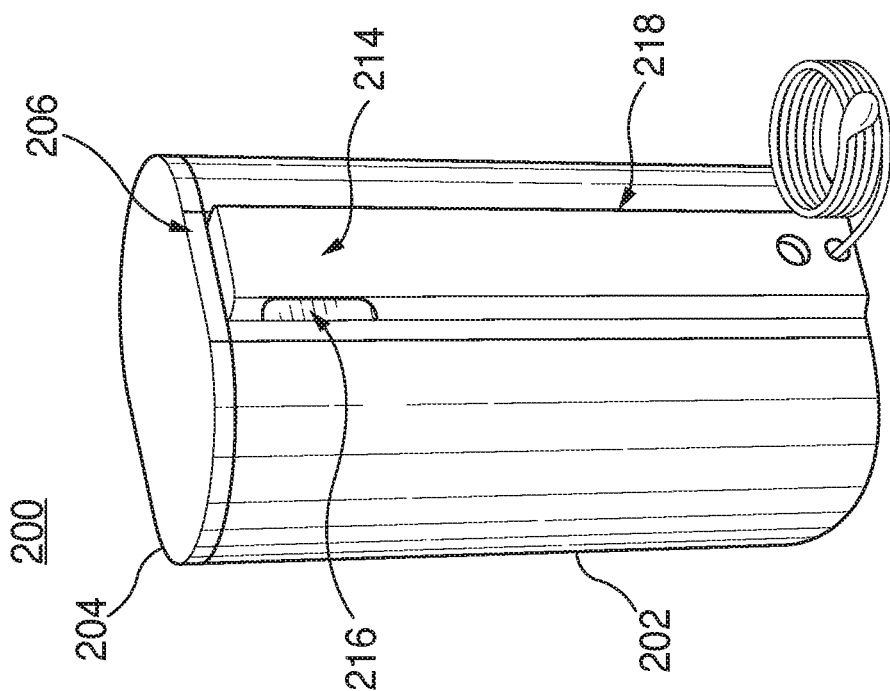
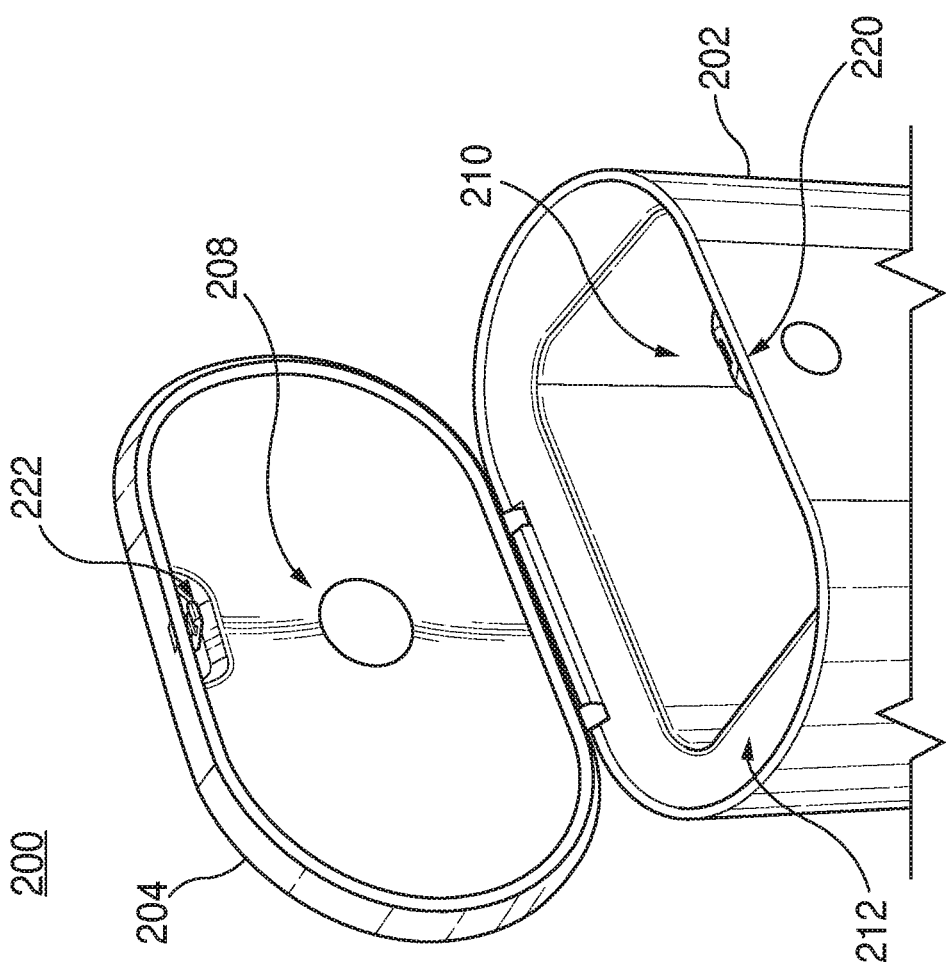
FIG. 2B
FIG. 2A

| Component or Sensor | Function | Data |
|---|---|---|
| Lid Switch 1 | Detects Lid Open/Close Status | Open/Close Status |
| Lid Switch 1 | Detects Lid Open/Close Status | Open/Close Status |
| Latch Switch | Detects Latch Lock/Unlock Status | Lock/Unlock Status |
| Lid VOC Sensor & Temp/RH Sensor | Monitors VOCs, Temperature, and Relative Humidity in the Lid | VOCs contained in air being forced into the bucket assembly and the temperature and relative humidity of that air |
| Lid Fan | Pulls in ambient air from outside of the OMPA and forces the (optionally heated) ambient air into the bucket assembly | Fan Speed; Electrical Characteristics (e.g., current consumption, power consumption) |
| Lid Heater | Heats ambient air supplied by the Lid Fan | Heater Temperature |
| Lid Motor | Opens and Closes the Lid | Electrical Characteristics (e.g., current consumption, power consumption) |
| Encoder | Monitors position of the motor | Position of the lid angle |
| Physical Safety Switch | Detects Lid Open/Close Status | Open/Close Status |

FIG. 15A

| Component or Sensor | Function | Data |
|---|---|---|
| ATS Inlet VOC Sensor & Temp/RH Sensor | Monitors VOCs, Temperature, and Relative Humidity of untreated air entering the Air Treatment System | VOCs contained in untreated air being pulled from the bucket assembly into the ATS and the temperature and relative humidity of that untreated air |
| ATS Fan | Pulls untreated air from the bucket assembly into the ATS | Fan Speed; Electrical Characteristics (e.g., current consumption, power consumption) |
| ATS Outlet VOC Sensor & Temp/RH Sensor | Monitors VOCs, Temperature, and Relative Humidity in the Lid | VOCs contained in treated air being forced out of the OMPA and the temperature and relative humidity of that treated air |
| Mass Sensors | Each sensor provides a mass value | Mass values |
| PCB with Mass Processor and Temp Sensor | Aggregates mass values received from the Mass Sensors and applies temperature correction based on the temperature sensor | Temperature corrected mass values |

FIG. 15B

| Component or Sensor | Function | Data |
|---|---|---|
| Bucket Heater | Heats Bucket | Electrical Characteristics |
| Temperature Sensor 1 | Monitors temperature of the bucket | Temperature of the Bucket Heater |
| Temperature Sensor 2 | Monitors temperature of the bucket | Temperature of the Bucket Heater |
| Cutoff Switch(es) | Thermal based switch that disables the bucket heater | If cutoff switch(es) are tripped, the trip event is represented by an electrical characteristic |
| Bucket Motor | Drives the cut and paddle assembly | Motor speed; Motor torque; Electrical Characteristics |
| Electrical Interface | Provides power to the heater and signal connectivity for the the temperature sensors 1 and 2 | Electrical Characteristics; Bucket Present Determination |
| Bucket Present Switch | Detects whether the bucket is inserted or removed | Bucket is inserted into the OMPA or is removed |
| Blade Position Sensor | Detects position of the cut and paddle assembly | Position of the cut and paddle assembly |

FIG. 15C

| Safety Monitor Specified Feedback | MCU Specified Feedback | |
|---|---|---|
| Lid Switch 1 | Latch Switch | Lid Switch 2 |
| Temperature Sensor 1 | Temperature Sensor 2 | Bucket Motor and its Electrical Characteristics |
| Bucket Present Switch | Lid VOC Sensor & Temp/RH Sensor | Lid Motor and its Electrical Characteristics |
| Physical Safety Switch | ATS Input VOC Sensor & Temp/RH Sensor | Lid Motor Encoder |
| | ATS Output VOC Sensor & Temp/RH Sensor | Electrical Connection and its Electrical Characteristics |
| | Pedal Sensor Switch | Lid Fan and its Electrical Characteristics |
| | Mass Sensors and PCB with Mass Processor and Temperature Sensor | Lid Heater and its Electrical Characteristics |
| | Position Sensor | ATS Fan and its Electrical Characteristics |

FIG. 17A

| Minimum HIP Duration | 2.5 Hours |
|---|---|
| Maximum HIP Duration | 12 Hours |
| HIP Duration per mass | (m)*2.5 |

| Daily Pounds added | HIP Run Time (Hours) |
|---|---|
| <0.5 | 0 |
| 0.5 | 2.5 |
| 1 | 2.5 |
| 2 | 5 |
| 3 | 7.5 |
| 4 | 10 |
| 5 | 12.5 |

FIG. 27A

| Overall Bucket mass, pounds | Sanitize Time (Hours) | Cooldown Time (Hours) |
|---|---|---|
| 0 | 0 | 0 |
| 1 | 0.3 | 0.3 |
| 2 | 0.2 | 0.2 |
| 3 | 0.3 | 0.3 |
| 4 | 0.5 | 0.5 |
| 5 | 0.7 | 0.6 |
| 6 | 0.9 | 1.0 |
| 7 | 1.0 | 1.0 |
| 8 | 1.2 | 1.0 |

FIG. 27B

| States & Priorities - Lower Priority states can move to higher priority during scheduling conflicts | P7<br>Standby | P5<br>Daytime LIP | P4<br>Fixed Time LIP |
|---|---|---|---|
| Description | Everthing Off when device in frame/time | All fans and heaters off, device slowly mixing food to coat freah inputs with predried grounds | Fixed time Grinding before HIP to catch any olbvious grinder jams due to hard inputs etc. Enables user to unjam when Bucket is Cold |
| State Needs Interrupt to Start? When in Frame | NO | YES | NO |
| Cycle Delay at Start Trigger | NA | 5 min | NA |
| Lid Fan PWM, % (with heater in place) | 0 | 0 | 0 |
| Lid Fan CFM (from PWM above) | 0 | 0 | 0 |
| Exhaust Fan PWM, % | 0 | 0 | 0 |
| Exhaust Fan CFM | 0 | 0 | 0 |
| Bucket Heater Set Point, deg C | 0 | 0 | 0 |
| Bucket Heater hysterisis range, deg C | 0 | 0 | 0 |
| State Run Time, Hrs | | 4Mins | 15Mins |
| State Frame Start Time | 8:00 AM | 8:00 AM | User Configurable Default value: 8PM |
| Grinder Duty OFF, s State Frame End Time | 7:59 AM | 7:59 AM | "+0.75 Hours" |
| Grinder Amp Limit, milli Amps | 550 | 550 | 550 |
| Grinder PWM, % | 0 | 100 | 100 |
| Grinder Stall Speed drop Limit, % | 30 | 30 | 30 |
| Grinder Amp threshold, milli sec | 3000 | 3000 | 3000 |
| Grinder Speed Threshold, s | 4 | 4 | 4 |
| Grinder Ramp Up % | 100 | 100 | 100 |
| Grinder Ramp Down % | 100 | 100 | 100 |
| Max Stall Cycles every 10 mins | 0 | 5 | 5 |
| Stall Recovery Attempts | NA | 2 | 2 |
| Grinder Enabled | OFF | ON | ON |
| Grinder Duty ON, s | 0 | 180 | 180 |
| Grinder Duty OFF, s | NA | 30 | 30 |
| Grinder direction | NA | Bidirectional | Bidirectional |
| Lid Heater Enabled | OFF | OFF | OFF |

FIG. 28     TO FIG. 28 Cont.d

| | P1 | P1a | P2 | P3 | P6 |
|---|---|---|---|---|---|
| | HIP | Boost | Sanitize | Post HIP/ACooldown cycle | Vacation Mode HIP |
| | Core drying state, runs all heaters with airflow and heats up the bucket to reduce moisture content, reduce mass and volume | Similar to HIP, but with faster fan speeds and higher temperature | High heat state with reduced airflow that heats and mixes dried material to reduce pathogens | Essentially an LIP cycle config that kicks in after HIP/Sanitize cycle to rapidly cool down bucket temperatures, safe to touch <40C ish | One off short HIP cycle that runs every "x" days when lid is not opened and/or no mass added to device to prolong storability |
| | NO | NO | NO | NO | NO |
| | NA | NA | NA | NA | NA |
| | 100 | 100 | 40 | 40 | 100 |
| | 5 | 6 | 1, approx | 1, approx | 5 |
| | 40 | 40 | 20 | 20 | 40 |
| | 5 | 6 | 1, approx | 1, approx | 5 |
| | 80 | 88 | 96 | 0 | 80 |
| | 3 | 3 | 2 | 0 | 3 |
| | 2.5 TO 12 HRS | 2.5 TO 12 HRS | 30 mins | 30 mins | 4 HRS |
| | User Configurable Default Start Time: 8PM | User Configurable Default Start Time: 8PM | Post HIP Default Start Time: 6AM | Post Sanitize Default Start Time: 7AM | 12:00 AM |
| | "+2.5 to 12 Hours" See table | "+2.5 to 12 Hours" See table | "+0.3 to 1.5 Hours" See table | "+0.3 to 1.0 Hour" See table | 4:00 AM |
| | 550 | 550 | 550 | 550 | 550 |
| | 100 | 100 | 100 | 100 | 100 |
| | 30 | 30 | 30 | 30 | 30 |
| | 3000 | 3000 | 3000 | 3000 | 3000 |
| | 4 | 4 | 4 | 4 | 4 |
| | 100 | 100 | 100 | 100 | 100 |
| | 100 | 100 | 100 | 100 | 100 |
| | 5 | 5 | 5 | 5 | 5 |
| | 2 | 2 | 2 | 2 | 2 |
| | ON | ON | ON | ON | ON |
| | 180 | 180 | 180 | 180 | 180 |
| | 180 | 180 | 180 | 180 | 180 |
| | Bidirectional | Bidirectional | Bidirectional | Bidirectional | Bidirectional |
| | ON | ON | OFF | OFF | ON |

FROM FIG. 28    FIG. 28 Cont'd

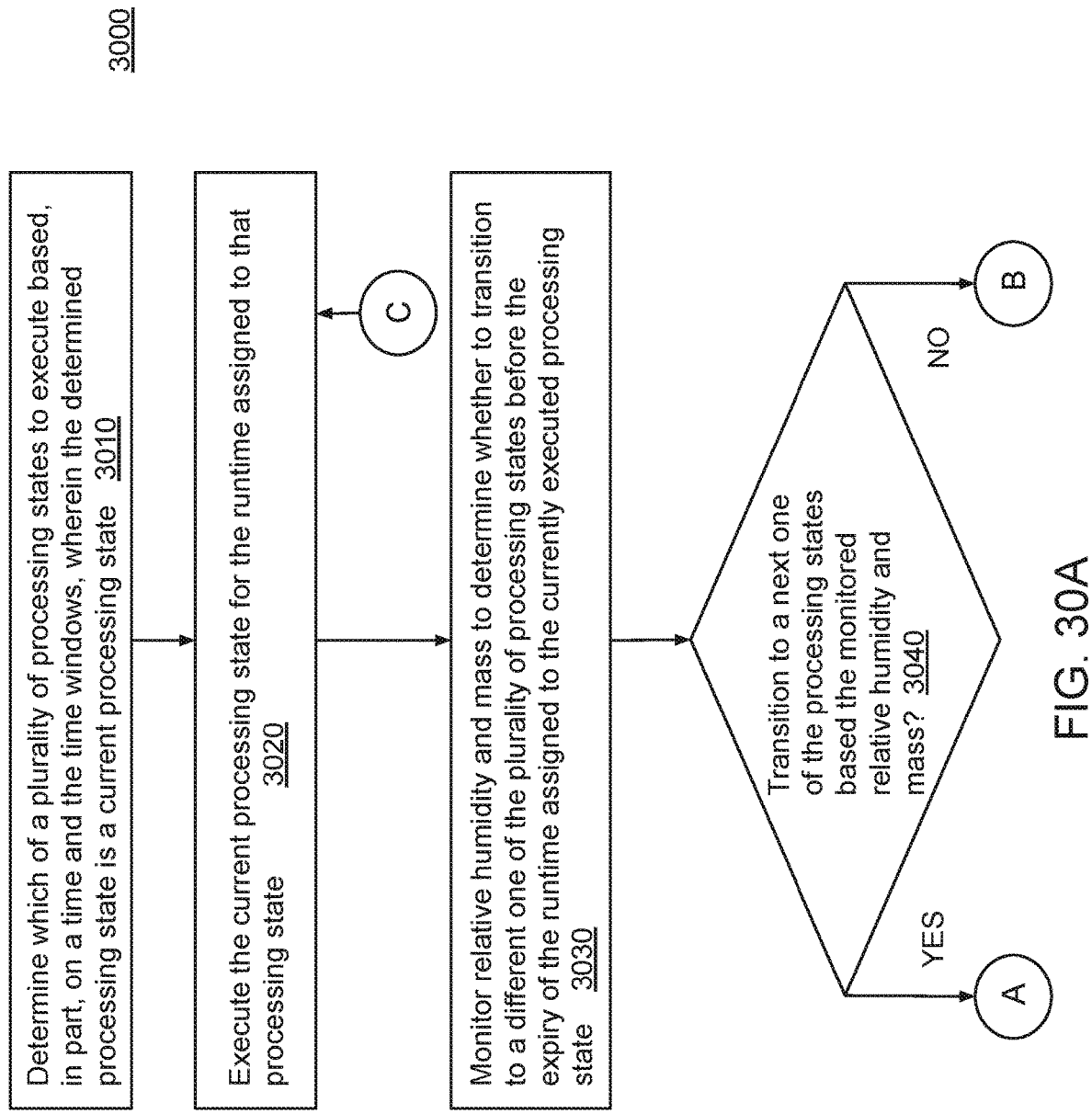

| Lid Heater Logic Based on Temp/ Humidity | | | | |
|---|---|---|---|---|
| Intake Temp | Intake RH | Mass | Lid Heater On/ OFF | |
| T>20C | 0<RH<50 | Any | OFF | Nominal |
| T<15C | Any RH | Any | ON | Cold |
| Any | RH>70 | Any | ON | Humid |
| Any | Any RH | >3.0lb | ON | Heavy Bucket |

Activating the lid heater if any one of the lid heater logic conditions that require the lid heater to be turned on is met
3610

Operating the lid fan at a boosted fan speed if two or more of the lid heater logic conditions that require the lid heater to be turned on are met
3620

Transitioning to the standby state if the relative humidity is above a predetermined high humidity value for a fixed period of time
3630

FIG. 36

INTELLIGENT SENSOR-DRIVEN PROCESSING OF ORGANIC MATTER FOR THE SMART HOME

CROSS-REFERENCE TO A RELATED APPLICATION

This patent application claims the benefit of U.S. Provisional Application No. 63/239,852, filed Sep. 1, 2021, the disclosure of which is incorporated herein in its entirety.

TECHNICAL FIELD

This patent specification relates to an organic matter processing apparatus, and more particularly to an algorithm for controlling conversion of organic matter to an organic output.

BACKGROUND

Individuals, groups of people, and families living and eating in their respective residences generate resident-based organic matter that degrades into methane—a powerful greenhouse gas—without oxygen. These harmful emissions can be avoided by diverting the resident-based organic matter such as uneaten or spoiled food from landfills. One way to divert food and other organic matter from landfills is to process the food and other organic matter into a partially desiccated product using a conventional food recycler or food grinder. These conventional food recyclers and food grinders, however, are not efficient in processing food and other organic matter.

The food industry (e.g., restaurants, grocery stores, etc.) has followed many traditional paths for handling food. For example, the food industry strives to prevent food from non-use or spoil by attempting to sell the food according to a first in first out method where older product is prioritized by sale. If the food is fit for consumption, such food may be provided to a food bank or charity. If the food is unfit for human consumption, but is safe for use as animal feed, the food can be used as animal feed. If the food is unsafe for human consumption and for animal feed, the food can be turned into compost. If the food is unsuitable for composting, the food may be converted into energy through anaerobic digestion (e.g., microorganisms convert the food into a biogas). Lastly, the food can be sent to a landfill if any of the other options are not viable. Each of these paths, however, require transportation of non-desiccated (and relatively heavy) food matter to the appropriate facilities. The volume and weight of the food may require use of heavy internal combustion engine trucks—thereby further contributing to greenhouse gas—to transport the food. In addition, the heavy trucks further increase wear and tear on roads and other infrastructure, and require costs for manpower and equipment.

Accordingly, what is needed is a residential or consumer oriented organic matter processing apparatus capable of efficiently and consistently rendering an end product that is curated according to specific properties to enable light-weight and lowcost shipping of the end product for use in a regulatory approved upcycling process.

BRIEF SUMMARY

Embodiments disclosed herein provide an organic matter processing apparatus and method for the use thereof to convert organic matter into a ground and desiccated product. This can be accomplished using a bucket assembly that can grind, paddle, and heat organic matter contained therein. A fan is provided to dry out the organic matter. An algorithm is used to control the conversion of organic input to organic output by progressing through processing states based, in part, on time windows, runtimes, and sensor inputs.

A further understanding of the nature and advantages of the embodiments discussed herein may be realized by reference to the remaining portions of the specification and the drawings.

BRIEF DESCRIPTION OF THE DRAWINGS

FIG. 2A includes a perspective view of an organic matter processing apparatus that includes a lid in a closed position according to embodiment.

FIG. 2B includes another perspective view of the organic matter processing apparatus with the lid in an open position according to embodiment.

FIGS. 15A-15C show a table identifying a component or sensor, its function, and its associated data according to an embodiment.

FIG. 17A shows tables illustrating the first subset of feedback designated specifically to the safety monitor and second subset of feedback designated specifically to the MCU according to an embodiment.

FIG. 27A shows an illustrative look-up table for determining run times for a high intensity processing (HIP) state according to an embodiment according to an embodiment.

FIG. 27B shows an illustrative look-up table for determining run times for a sanitize processing state and a cool down processing state according to an embodiment.

FIG. 28 shows an illustrative chart showing the OMPA processing states, the time windows thereof, the run times thereof, and other information according to an embodiment.

FIGS. 30A and 30B show an illustrative process for executing an OMPA algorithm according to an embodiment.

FIG. 35 shows an illustrative table of lid heater logic according to an embodiment.

FIG. 36 shows an illustrative process operating the OMPA in a boost mode to avoid condensation or to speed up the drying process according to an embodiment.

Figure 1:
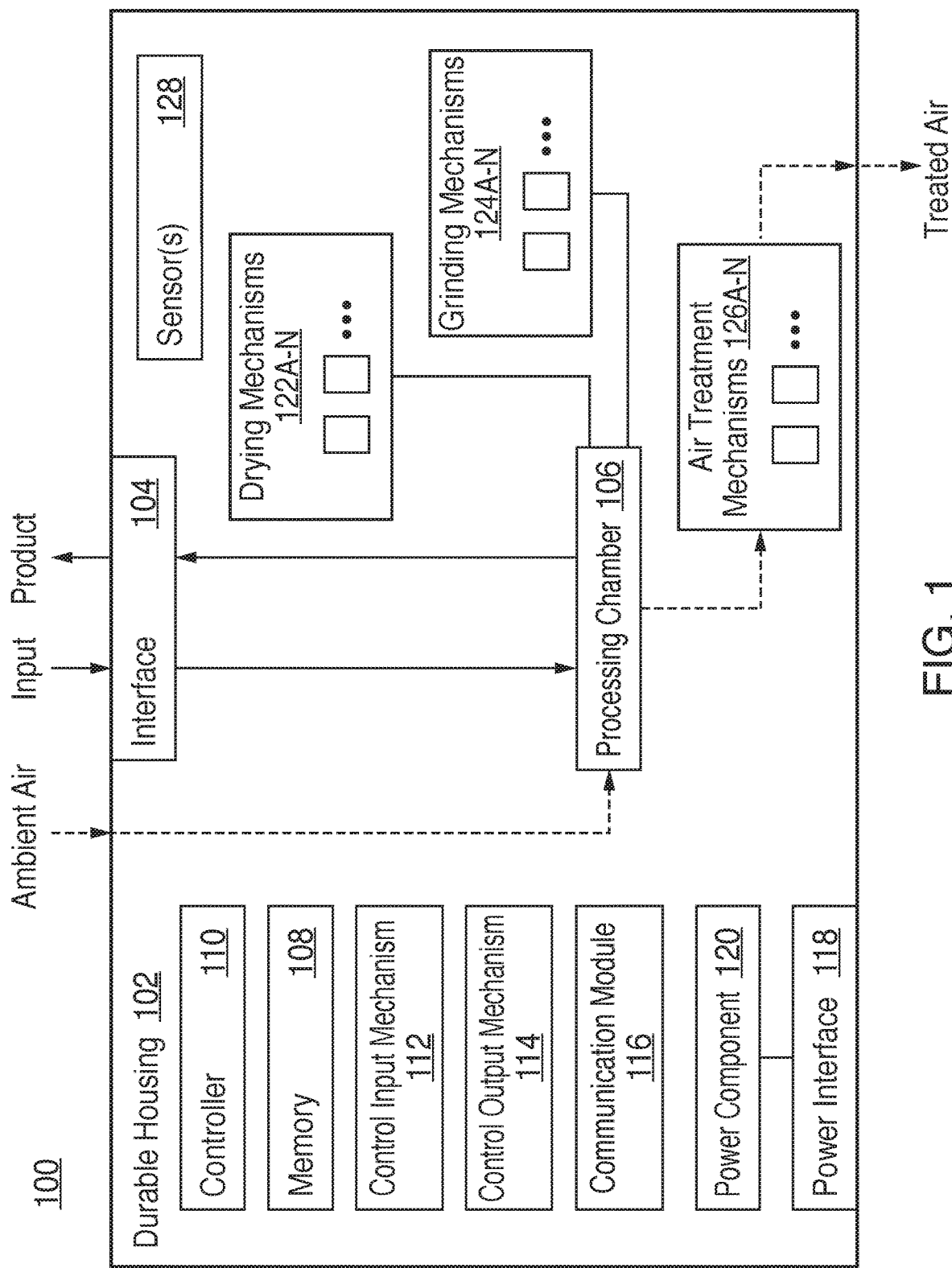
FIG. 1 includes a high-level illustration of an organic matter processing apparatus in accordance with various embodiments according to embodiment.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

As defined herein, an organic matter processing apparatus (OMPA) is an aero-mechanical device operative to convert OMPA input into an OMPA output using judicious combinations of physical, aero, and thermal processes including grinding, paddling, electric heating, and airflow.

OMPA input is defined herein as predominantly organic matter that is intended for processing by the OMPA. OMPA input can include food matter and/or mixed organic matter. Food matter can include consumable food items such as fats, oils, sweets such as sugars and chocolates, dairy products such as milk, yogurt, cheese, proteins such as meat (and bones thereof), poultry (and bones thereof), fish (and bones thereof), beans, eggs, and nuts, vegetables, fruits, and starches such as bread, cereal, pasta, and rice. Food matter is sometimes referred to as foodstuffs. Mixed organic matter can include paper or other fiber materials (e.g., soiled napkins or paper towels), compostable resins, compostable plastics, cellulosic materials (e.g., compostable silverware), and other non-food organic materials. OMPA input can also include other types of biodegradable matter (e.g., compostable diapers).

For many implementations, OMPA input may include food matter and/or mixed organic matter that is post-consumer, post-commercial, or post-industrial in nature, matter that if not processed according to the present teachings could be considered as waste, garbage, refuse, leavings, remains, or scraps. By way of example, food that is leftover on a child's dinner plate, and not in suitable condition or quantity to be stored and served later as leftovers, can represent one example of OMPA input. As another example, items such as potato peels, apple cores, cantaloupe rinds, broccoli stumps, and so forth, and similar organic materials that are spun off from the food preparation process, can represent other examples of OMPA input.

OMPA output is defined herein as processed organics derived from transformation of organic matter processed by the OMPA to yield a ground and selectively desiccated product. The processed organics can be a substantially desiccated product having water content ranging between 0.1 and 30 percent of total weight, between 5 and 25 percent of total weight, between 5 and 20 percent of total weight, between 1 and 15 percent of total weight, between 5 and 15 percent of total weight, between 10 and 15 percent of total weight, between 10 and 20 percent of total weight, between 15-20 percent of total weight, or between 10 and 25 percent of total weight. Alternatively, the processed organics can be a substantially desiccated product having water content of less than 15 percent of total weight, less than 10 percent of total weight, or less than 5 percent of total weight. The processed organics can exist as granulated or ground media. One type of processed organics can be FOOD GROUNDS™.

As defined herein FOOD GROUNDS™ refers to an OMPA output characterized as having a minimum nutritional value. FOOD GROUNDS™ can be derived from OMPA input comprised of a minimum percentage of food matter such that the FOOD GROUNDS™ OMPA output has the minimum nutritional value. The minimum percentage of food matter can ensure that the FOOD GROUNDS™ OMPA output attains at least the minimum nutritional value. For example, a higher nutrient value OMPA output can be more readily obtained from food matter than from mixed organics such as fiber materials and cellulosic materials.

As defined herein, an OMPA output processor repurposes the OMPA output for a commercial purpose. For example, the OMPA output can be used as feed or feedstock for feed for animals or fish. In some embodiments, an OMPA output processor that receives FOOD GROUNDS™ may produce a derivative product having a higher intrinsic value (e.g., nutritional, monetary, or both nutritional and monetary) than a derivative product produced primarily from mixed organics.

As defined herein, non-processed matter refers to matter that is not intended for processing by an OMPA or an OMPA output processor. Non-processed matter is not an OMPA input or an OMPA output. An example of non-processed matter can include inorganic matter such as, for example, metals, plastics, glass, ceramics, rocks, minerals, or any other substance that is not linked to the chemistry of life. Another example of non-processed matter can be yard waste such as grass clippings, leaves, flowers, branches, or the like. In very general terms, non-processed matter can refer to the garbage or waste that a resident or business disposes in a conventional trash bin for transport to a landfill processor, a recycle bin for transport to recyclables processor, or a yard waste bin for transport to a yard waste processor.

In one embodiment, the OMPA is designed to be used primarily in a residential context (e.g., in single family homes, townhouses, condos, apartment buildings, etc.) to convert residential based OMPA input into residential sourced OMPA output. Converting residential generated OMPA input to OMPA output can have a net positive effect in the reduction of methane and space occupied by landfills or compost centers by redirecting the OMPA input and the OMPA output thereof away from traditional reception centers of such material. Moreover, because the OMPA is user friendly, aesthetically pleasing, energy efficient, clean, and substantially odor free, the OMPA provides an easy to use platform for the residential sector to handle OMPA input (e.g., food scraps, etc.), thereby making the decision on what to do with residential based OMPA input an easier one to handle. The OMPA can convert OMPA input into FOOD GROUNDS overnight, where the FOOD GROUNDS are substantially odorless, easily transportable, and shelf-stable. The FOOD GROUNDS can remain in the OMPA until it is full, at which point the FOOD GROUNDS are removed and transported to an OMPA processing facility, which may convert the FOOD GROUNDS into a higher value food product (e.g., animal feed). It should be understood that OMPAs can be used to serve entire communities, cities, and industries. Use of OMPAs in these other sectors, as well as the residential sector, can result in diversion from landfills and further serve a goal of preventing OMPA input from becoming waste in the first place by converting it into usable products that can be used to enable more resilient, sustainable food systems.

Overview of Organic Matter Processing Apparatus

FIG. 1 includes a high-level illustration of a OMPA 100 in accordance with various embodiments. As further discussed below, OMPA 100 may have a durable housing 102 with an interface 104 through which a processing chamber 106 can be accessed. The interface 104 may serve as the ingress interface through which OMPA input can be deposited into the processing chamber 106 and the egress interface through which the product can be retrieved from the processing chamber 106. As shown in FIGS. 2A-B, the durable housing 102 may take the form of a roughly cylindrical container that has an aperture along its top end.

Instructions for operating OMPA 100 may be stored in a memory 108. The memory 108 may be comprised of any suitable type of storage medium, such as static random-access memory (SRAM), dynamic random-access memory (DRAM), electrically erasable programmable read-only memory (EEPROM), flash memory, or registers. In addition to storing instructions that can be executed by the controller 110, the memory 108 can also store data that is generated by OMPA 100. For example, values generated by one or more sensors 128 included in OMPA 100 may be stored in the memory 108 in preparation for further analysis, as further discussed below. As further discussed below, these values may relate to characteristics (e.g., humidity or temperature) of the air traveling through OMPA 100, and insights into the OMPA input contained in the processing chamber 106 can be gained through analysis of these values. Note that the memory 108 is merely an abstract representation of a storage environment. The memory 108 could be comprised of actual integrated circuits (also referred to as "chips"). When executed by a controller 110, the instructions may specify how to control the other components of OMPA 100 to produce OMPA output from OMPA input in the processing chamber 106. The controller 110 may include a general purpose processor or a customized chip (referred to as an "application-specific integrated circuit" or "ASIC") that is designed specifically for OMPA 100.

Generally, OMPA 100 is able to operate on its own. Assume, for example, that OMPA 100 determines that OMPA input has been deposited into the processing chamber 106 based on measurements output by a weight sensor (also referred to as a "mass sensor"), as further discussed below. In response to such a determination, OMPA 100 may initiate processing of the OMPA input. Note, however, that the OMPA input need not necessarily be processed immediately. For example, OMPA 100 may not dry and then grind the OMPA input until a given criterion (e.g., time of day, weight of OMPA input, etc.) or combination(s) of various criteria is/are satisfied.

While OMPA 100 may be able to operate largely, if not entirely, on its own, there may be some situations where input from a user will be helpful or necessary. For example, the user may want to indicate when processing should be temporarily halted so that additional OMPA input can be added to the processing chamber 106. As another example, the user may to request that an operation be initiated or halted. For instance, the user could opt to initiate a "drying cycle" if the ambient environment is expected to be vacant, or the user could opt to halt a "grinding cycle" if the ambient environment is expected to be occupied. The various cycles of OMPA 100 are discussed in greater detail below.

As shown in FIG. 1, OMPA 100 may include a control input mechanism 112 (also referred to as a "data input mechanism" or simply "input mechanism") with which the user can interact to provide input. Examples of input mechanisms include mechanical buttons and keypads for tactile input, microphones for audible input, scanners for visual input (e.g., of machine-readable codes, such as barcodes or Quick Response codes), and the like. OMPA 100 may also include a control output mechanism 114 (also referred to as a "data output mechanism" or simply "output mechanism") for presenting information to inform the user of its status. For example, the control output mechanism 114 may indicate the current cycle (e.g., whether OMPA input is being processed, or whether product is ready for retrieval), connectivity status (e.g., whether OMPA 100 is presently connected to another electronic device via a wireless communication channel), and the like. One example of an output mechanism is a display panel comprised of light-emitting diodes (LEDs), organic LEDs, liquid crystal elements, or electrophoretic elements. In embodiments where the display panel is touch sensitive, the display panel may serve as the control input mechanism 112 and control output mechanism 114. Another example of an output mechanism is a speaker that is operable to output audible notifications (e.g., in response to a determination that the product is ready for retrieval).

Some embodiments of OMPA 100 are able to communicate with other electronic devices via wireless communication channels. For example, a user may be able to interact with OMPA 100 through a control platform (not shown) that is embodied as a computer program executing on an electronic device. The control platform is discussed in greater detail below with reference to FIG. 11. In such embodiments, OMPA 100 may include a communication module 116 that is responsible for receiving data from, or transmitting data to, the electronic device on which the control platform resides. The communication module 116 may be wireless communication circuitry that is designed to establish wireless communication channels with other electronic devices. Examples of wireless communication circuitry include chips configured for Bluetooth®, ZigBee®, LoRa®, Thread, Near Field Communication (NFC), and the like.

OMPA 100 may include a power interface 118 (also referred to as a "power port" or "power jack") that is able to provide main power for the drying and grinding functionality, as well as power for the other components of OMPA 100, as necessary. The power interface 118 may allow OMPA 100 to be physically connected to a power source (e.g., an electrical outlet) from which power can be obtained without limitation. Alternatively, the power interface 118 may be representative of a chip that is able to wirelessly receive power from the power source. The chip may be able to receive power transmitted in accordance with the Qi standard developed by the Wireless Power Consortium or some other wireless power standard. Regardless of its form, the power interface 118 may allow power to be received from a source external to the durable housing 102. In addition to the power interface 118, OMPA 100 may include a power component 120 that can store power received at the power interface 118. The power component 118 could advantageously be useful to maintain some or all operations (e.g., the state of communications and functionality of electronic components) in the event of a power outage. Examples of power components include rechargeable lithium-ion (Li-Ion) batteries, rechargeable nickel-metal hydride (NiMH) batteries, rechargeable nickel-cadmium (NiCad) batteries, and the like.

In order to produce an OMPA output from OMPA input, OMPA 100 (and, more specifically, its controller 110) may control one or more drying mechanisms 122A-N and one or more grinding mechanisms 124A-N. The drying mechanisms 122A-N are discussed in greater detail below with reference to FIGS. 2A-4, while the grinding mechanisms 124A-N are discussed in greater detail below with reference to FIG. 6. The drying mechanisms 122A-N are responsible for desiccating the OMPA input. Desiccation may not only allow the OMPA input easier to process (e.g., grind), but also may prevent the formation of mold that thrives in humid conditions. Examples of drying mechanisms include heating elements that reduce moisture by introducing heat and fans that reduce moisture by introducing an airflow. Meanwhile, the grinding mechanisms are responsible for cutting, crushing, or otherwise separating the OMPA input into fragments. Examples of grinding mechanisms include paddles, mixers, impellers, and rotating blades (e.g., with two, three, or four prongs). Grinding mechanisms are normally comprised of a durable material, such as die cast aluminum, stainless steel, or another material that offers comparable strength and rigidity. By working in concert, the drying and grinding mechanisms 122A-N, 124A-N can convert OMPA input into a more stable product as further discussed below.

Moreover, air may be drawn from the ambient environment into the durable housing 102 and then expelled into the processing chamber 106 so as to help desiccate the OMPA input contained therein, as further discussed below with reference to FIGS. 2A-4. As shown in FIG. 1, air that is drawn from the processing chamber may be treated using one or more air treatment mechanisms 126A-N (also referred to as "air management mechanisms" or "air discharge mechanisms") before being released back into the ambient environment.

Other components may also be included in OMPA 100. For example, sensor(s) 128 may be arranged in various locations throughout OMPA 100 (e.g., along the path that the air travels through OMPA 100). The sensor(s) 128 may include a proximity sensor that is able to detect the presence of nearby individuals without any physical contact. The proximity sensor may include, for example, an emitter that is able to emit infrared (IR) light and a detector that is able to detect reflected IR light that is returned toward the proximity sensor. These types of proximity sensors are sometimes called laser imaging, detection, and ranging (LiDAR) scanners. Alternatively, the presence of an individual may be inferred based (i) whether sounds indicative of the user are detectable (e.g., by a passive microphone or an active sonar system) or (ii) whether an electronic device associated with the user is detectable (e.g., by the communication module 116).

OMPA 100 may adjust its behavior based on whether any individuals are nearby. For instance, OMPA 100 may change its operating state (or simply "state") responsive to a determination that an individual is nearby. As an example, OMPA 100 may stop driving the grinding mechanisms upon determining that someone is located nearby. Thus, OMPA 100 could intelligently react to changes in the ambient environment. Over time, outputs produced by the proximity sensor (plus other components of OMPA 100) could be used to better understand the normal schedule of individuals who frequent the physical space in which OMPA is situated.

In some embodiments, OMPA 100 includes an ambient light sensor whose output can be used to control different components. The ambient light sensor may be representative of a photodetector that is able to sense the amount of ambient light and generate, as output, values that are indicative of the sensed amount of ambient light. In embodiments where the control output mechanism 114 is a display panel, the values output by the ambient light sensor may be used by the controller 110 to adjust the brightness of the display panel.

Desiccating OMPA Input Through Airflow Generation

One core aspect of OMPA is its ability to desiccate OMPA input that is deposited into the processing chamber. By removing moisture from the OMPA input through a judicious application of heating, grinding, mixing, and airflow according to the teachings herein, the OMPA can substantially halt decomposition of the OMPA input and produce a stable mass of dried-and-grinded OMPA input (hereinafter "OMPA output" or "end product" or simply "product"). This can be accomplished by directing an airflow through the processing chamber that causes the OMPA input to become increasingly dry in a predictable manner.

FIG. 2A includes a front-side perspective view of OMPA 200 that includes a lid 204 in a closed position. FIG. 2B, meanwhile, includes a rear-side perspective view of OMPA 200 with the lid 204 in an open position. As further discussed below, the lid 204 may be pivotably connected to a durable housing 202, so as to allow a user to easily expose and then cover a processing chamber 210 located inside the durable housing 202. As described further herein, OMPA 200 can be advantageously designed and configured such that it can be placed flush up against a wall or other barrier in a space-saving manner, in that it does not require gapped separation from the wall, while at the same time maintaining the ability for good airflow in and out of OMPA 200.

As shown in FIG. 2A, the lid 204 may have one or more air ingress openings 206 (or simply "openings") through which air can be drawn from the ambient environment by a first fan (also referred to as a "turbulent fan") installed therein. Here, for example, a single opening 206 is located along a periphery of the lid 204 near a rear side of the OMPA 200. Generally, the opening(s) 206 are located near where the lid 204 is pivotably connected to the durable housing 202. Advantageously, there may be a built-in offset between a plane of the opening 206 and a backmost plane of the overall durable housing 202, whereby airflow into OMPA 200 will not be impeded even while the backmost plane is flush against a wall. However, the opening(s) 206 could be located, additionally or alternatively, elsewhere along the exterior surface of the lid 204. For example, multiple openings may be spaced along a periphery of the lid 204 to further ensure that sufficient air can be drawn into the lid 204 by the first fan even if OMPA 200 is positioned proximate to an obstacle (e.g., a wall).

As shown in FIG. 2B, this air can then be expelled toward the OMPA input through one or more openings 208 along the interior surface of the lid 204. This will create a downward airflow that causes turbulence inside the processing chamber 210, thereby increasing the rate at which the OMPA input is dried. The speed of the first fan may be roughly proportional to the speed of the downward airflow (and thus, the amount of turbulence). OMPA 200 may increase the speed of the first fan if quicker drying is desired.

Accordingly, the first fan may draw air through the opening(s) 206 in the exterior surface of the lid 204 and then blow the air downward toward the OMPA input to create a turbulent airflow (also referred to as a "turbulent airstream"). This turbulent airflow may create small vortices inside the processing chamber 210 that ensure the air continues to move across the surface of the OMPA input.

In the embodiment shown in FIG. 2B, the opening(s) 208 are centrally located along the interior surface of the lid 204. However, the opening(s) 208 could be located elsewhere along the interior surface of the lid 204. For example, the opening(s) 208 may be located along one edge of the lid 204 if the intake vent through which air is removed from the processing chamber 210 is located near an opposing edge of the lid 204.

When in operation, air can be removed from the processing chamber 210 through a used-air intake vent (not shown) in an exhaust hood that is located beneath a bezel 212. The intake vent is further discussed below with reference to FIGS. 3A-B. The bezel 212 may extend around a periphery of the durable housing 202 to "frame" the aperture through which OMPA input can be deposited in the processing chamber 210. The exhaust hood may be partially or fully obstructed when the bezel 212 is installed within the durable housing 202. Here, for example, the exhaust hood is fully obstructed by the bezel 212, and therefore cannot be easily viewed while the bezel 212 is installed within the durable housing 202.

As further discussed below, a user may need to remove the bezel 212 in order to remove the processing chamber 210 from the durable housing 202. To remove the bezel 212, the user may grasp a structural feature 220 (referred to as a "lip") that allows the bezel 212 to be readily removed by hand. The structural feature 220 may also serve other purposes. For example, the structural feature 220 may accommodate a locking mechanism 222 that extends downward from the lid 204 into the durable housing 202. After the locking mechanism 222 extends into the durable housing 202, a latch (e.g., driven by a solenoid) may secure the locking mechanism 222 in place. This may be helpful to restrict access when, for example, the OMPA 200 is operating at high intensity and contents of the processing chamber 210 are hot.

Figure 3A:
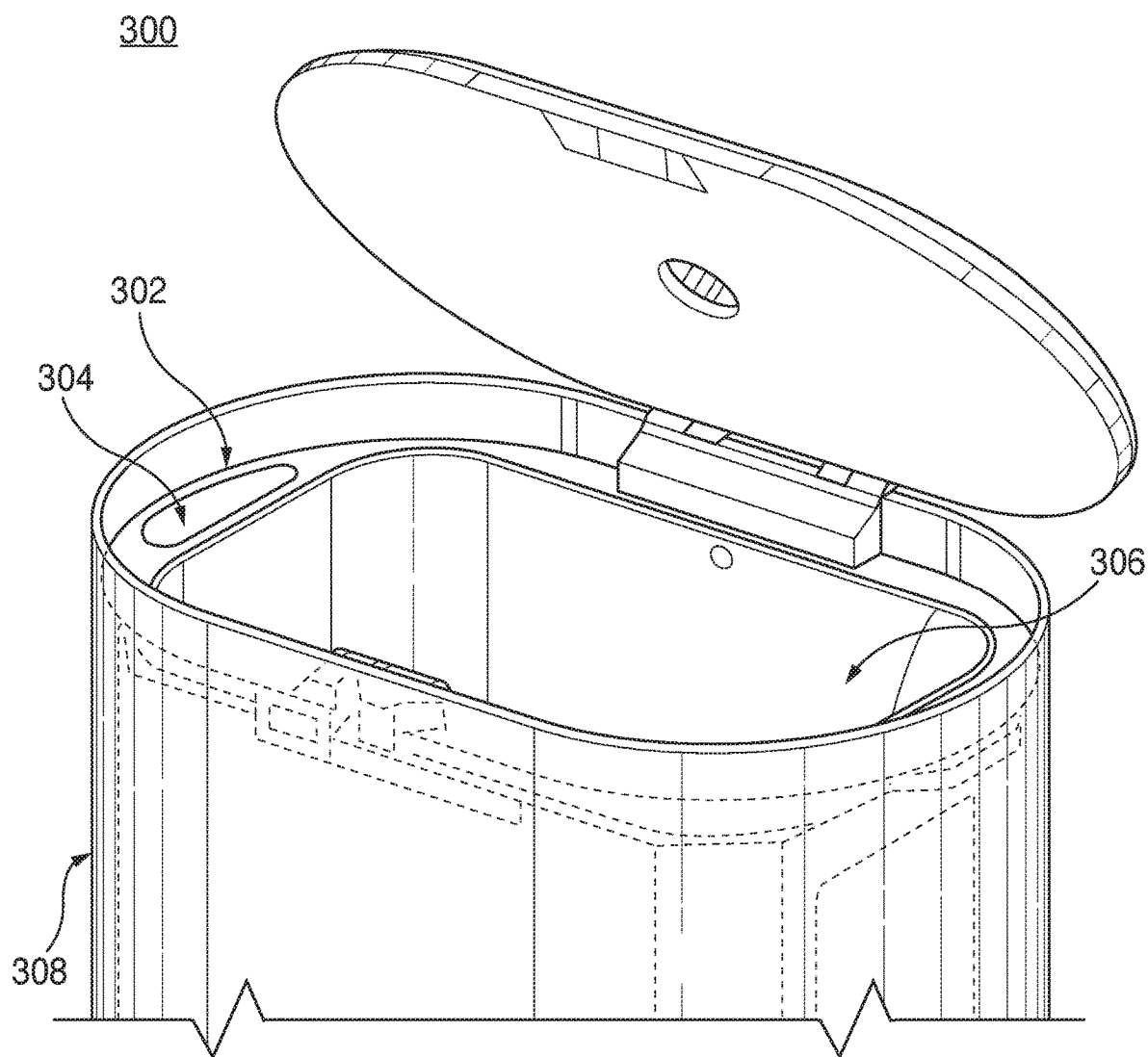
FIG. 3A includes a perspective view of an organic matter processing apparatus without its bezel to illustrate one possible location for the exhaust hood that extends over an intake vent according to embodiment.

Removal of the bezel 212 may expose the exhaust hood as mentioned above. FIG. 3A includes a perspective view of OMPA 300 without its bezel to illustrate one possible location for the exhaust hood 302 that extends over a used-air intake vent. As further discussed below, the processing chamber 306 of OMPA 300 may be representative of a receptacle that can be removably installed within a cavity that is defined by an interior surface of the durable housing 308. Normally, the exhaust hood 302 is located along the interior surface such that, when the receptacle is installed within the cavity, the used-air intake vent is positioned proximate to an upper end of the receptacle. Said another way, the exhaust hood 302 may be positioned so that the used-air intake vent is not obstructed when the receptacle is installed within the cavity in the durable housing 308.

At a high level, the exhaust hood 302 may be designed to guide or direct air from the processing chamber 306 through the used-air intake vent for treatment and then release into the ambient environment. A filter 304 may be installed in the used-air intake vent to prevent large fragments of OMPA input or product from entering the odor treatment system. This filter 304 may be removable. Accordingly, a user may be able to remove the filter 304 (e.g., for cleaning purposes), or the user may be able to replace the filter 304.

Figure 3B:
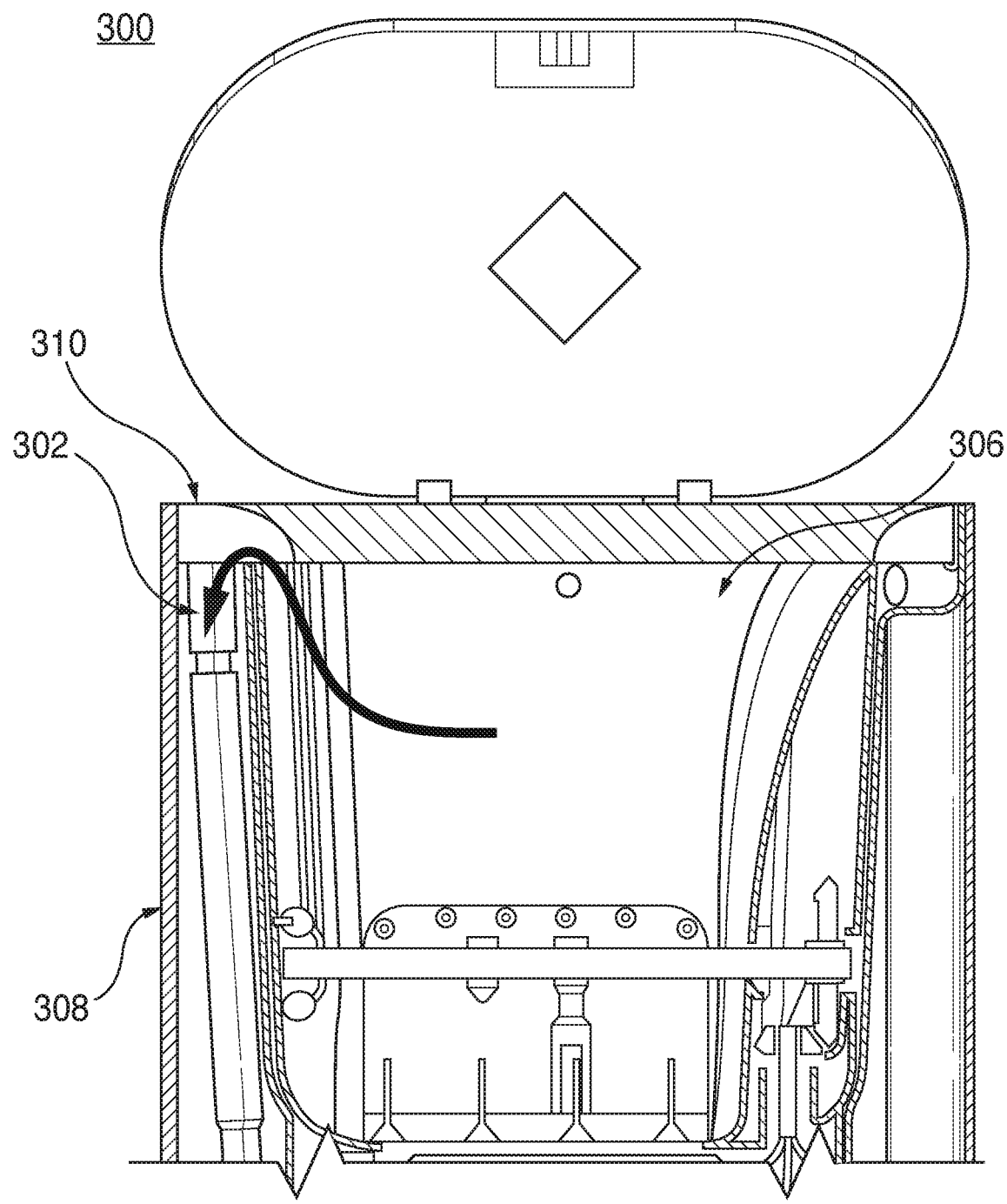
FIG. 3B illustrates how, when the bezel is installed in the organic matter processing apparatus, air in the processing chamber can flow underneath the bezel into a space above the edge of the receptacle and then downward through the used-air intake vent according to embodiment.

FIG. 3B illustrates how, when the bezel 310 is installed in OMPA 300, air in the processing chamber 306 can flow underneath the bezel 310 into a space above the edge of the receptacle and then downward through the used-air intake vent. Air that is removed from the processing chamber 306 through the used-air intake vent can be routed through an odor treatment system (not shown) of OMPA 300 for treatment, as further discussed below with reference to FIG. 4A. Then, the treated air can be expelled from OMPA 300 into the ambient environment. Referring again to FIG. 2, the treated air may be expelled through one or more air egress openings (or simply "openings") located along an interior surface of a mechanical feature 214. The interior surface of the mechanical feature 214 may define a space 216 into which treated air can be expelled. As shown in FIG. 2B, the space may not be fully enclosed. Here, for example, the mechanical feature 214 is roughly in the form of an open cylinder, and thus may also serve as a handle along the exterior surface of the durable housing 202. Additionally or alternatively, opening(s) may be located along the rear surface of the durable housing 202 but oriented such that the treated air is expelled outward at an angle. For example, opening(s) may be located along one or both sides of a vertical pillar 218 (also referred to as a "spine") that runs along the rear side of OMPA 200, so that the treated air is expelled toward the sides of OMPA 200. These designs allow treated air—which may be moister than ambient air—to exit OMPA 200 without being expelled directly onto a nearby obstacle (e.g., a wall). Another benefit of these designs is that "recycling" of air is minimized by ensuring that the treated air is not expelled toward the opening 206 in the lid 204 through which air is drawn into OMPA 200. Advantageously, the vertical pillar 218 can serve multiple functions. The vertical pillar 218 may not only serve as a mechanical offset that allows OMPA 200 to be placed adjacent to obstacles without obstructing incoming and outgoing airflow, but may also function as a plenum by providing a pathway along which air can travel while inside the durable housing 202. Moreover, the vertical pillar can act as an anti-tipping mechanism by providing stability.

Figure 4A:
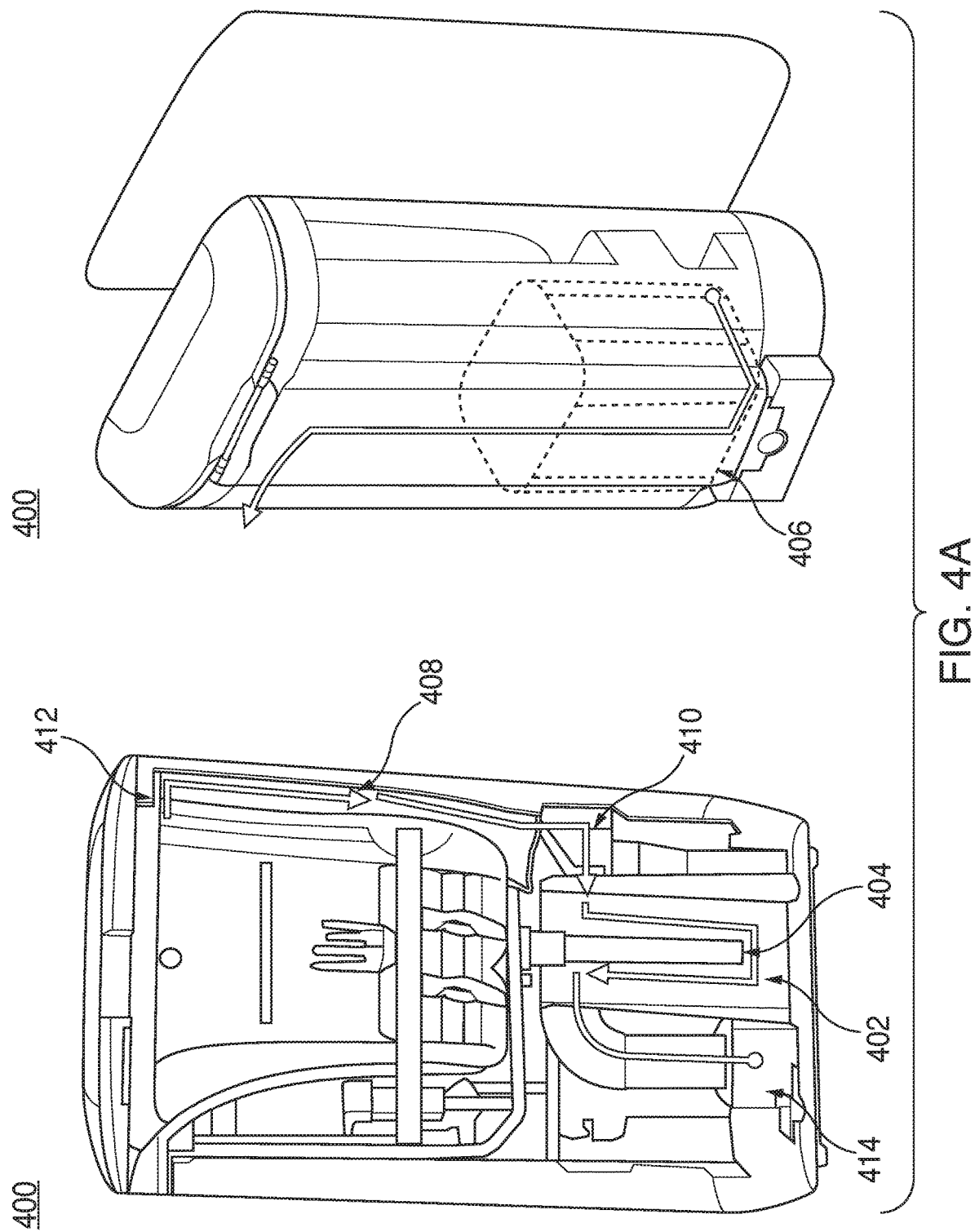
FIG. 4A includes isometric front and rear perspective views of an organic matter processing apparatus where the durable housing is transparent to show additional details according to embodiment.

FIG. 4A includes isometric front and rear perspective views of OMPA 400 where the durable housing is transparent to show additional details. In FIG. 4A, a trace is shown to indicate the route that air drawn from the processing chamber (e.g., through the exhaust hood 302 of FIG. 3) traverses before exiting OMPA 400. There are two main chambers through which the air guided as it traverses the route.

First, the air is guided through a photolysis chamber 402. In the photolysis chamber 402, the air is exposed to light emitted by a light source 404 that is meant to cause the decomposition or separation of odor-causing molecules. The light source 404 may be, for example, an ultraviolet (UV) bulb or UV light-emitting diode (LED).

Second, the air is guided through a dry media chamber 406. In the dry media chamber 406, the air is exposed to dry media that is meant to trap odor-causing molecules through a process referred to as adsorption. Examples of dry media include charcoal, coconut shell carbon, and manganese dioxide. In addition to acting as an odor destructor, the dry media may also act as an ozone destructor. Ozone may be generated by the light source 404 in the photolysis chamber 402, and the dry media may help to destroy that ozone.

In some embodiments, the durable housing includes a pivotable door that permits access to the dry media chamber 406. By opening the pivotable door, a user may be able to easily replace the dry media in the dry media chamber 406. For example, the user may remove existing canisters and then reinstall new canisters that have loose granules, disks, or other particulates of the dry media stored therein. Such a design allows the dry media to be replaced whenever necessary.

Following treatment in the dry media chamber 406, the air may rise upward through the vertical pillar along the rear side of the OMPA 400 that acts as a plenum. Then, the air can be expelled into the ambient environment through opening(s) located near the upper end of the vertical pillar as discussed above with reference to FIG. 2B.

Accordingly, air may initially be drawn through a used-air intake vent 412 into a channel 408 by a second fan 410 (also referred to as a "blower fan") that is located in or near the channel 408. The used-air intake vent 412 is the same used-air intake vent as mentioned above with reference to FIGS. 2-3. The air can then be directed into the photolysis chamber 402. Air leaving the photolysis chamber 402 can be directed into the dry media chamber 406. In some embodiments, the air is heated by a heater 414 before it enters the dry media chamber 406 in order to decrease moisture. This may help lengthen the lifespan of the dry media in the dry media chamber 406. After the air has been treated in the photolysis and dry media chambers 402, 406—which collectively represent the odor treatment system—the air can be guided upward through the vertical pillar that acts as a plenum, and then the air can be expelled into the ambient environment. As mentioned above, the air could be expelled through opening(s) along the rear surface of the durable housing.

The first fan included in the lid of OMPA 400 and the second fan 410 situated in the odor treatment system of the OMPA 400 may have variable speeds. Accordingly, a controller (e.g., controller 110 of FIG. 1) may be able to easily change the speed of the first and second fans. However, to ensure that air is drawn through the used-air intake vent 412, the second fan 410 may be driven at a higher speed than the first fan. Driving the second fan 410 at a higher speed than the first fan will result in a pressure differential that causes air to be advantageously drawn through the used-air intake vent 412.

Figure 4B:
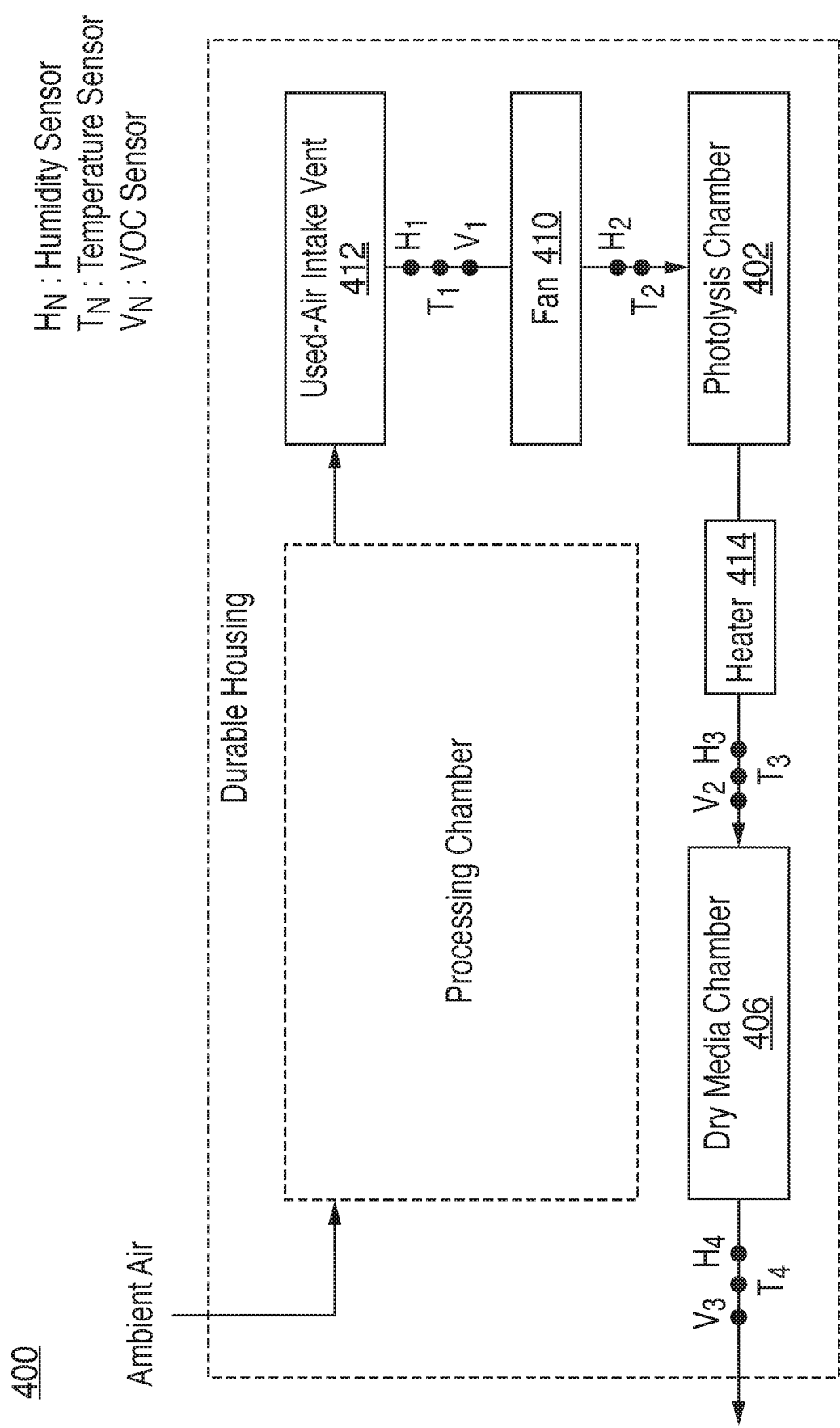
FIG. 4B includes a conceptual diagram that identifies possible locations for different types of sensors according to embodiment.

In order to gain insights in the nature of the air as it travels through OMPA 400, one or more sensors may be located along the route indicated by the trace. FIG. 4B includes a conceptual diagram that identifies possible locations for different types of sensors. Note that the selection and placement of sensors in FIG. 4B is provided for the purpose of illustration, and some or all of these sensors could be included in OMPA 400. For example, sensors able to measure temperature and humidity may be located proximate to the intake vent 412, the entry of the photolysis chamber 402, the channel interconnected between the photolysis and dry media chambers 402, 406, the exit of the dry media chamber 406, or any combination thereof. As another example, a sensor able to measure ozone may be located in the channel 408 leading to the photolysis chamber 402 and/or the channel interconnected between the photolysis and dry media chambers 402, 406. As another example, a sensor able to measure volatile organic compounds (VOCs) may be located along the route. If the VOC sensor is located before the photolysis chamber 402, its measurements may be used to monitor variations in odor across the lifetime of the OMPA 400. Meanwhile, if the VOC sensor is located after the photolysis chamber 402, its measurements may be used to determine the degree to which the dry media chamber 406 is responsible for destroying odor. Said another way, measurements produced by a VOC sensor located after the photolysis chamber 402 could be a useful indicator of the expected lifetime of the dry media in the dry media chamber 406. Other measurement dimensions that may be monitored by sensor(s) include carbon dioxide ($CO_2$), carbon monoxide (CO), dioxygen ($O_2$), hydrogen sulfide ($H_2S$), nitrogen dioxide ($NO_2$), potential of hydrogen (pH), and salinity.

Because the sensors are located along the route indicated by the trace, the odor treatment system may be able to operate as a closed loop system. The term "closed loop system," as used herein, is meant to describe a system that is able to dynamically adjust its activities based on feedback to achieve a desired goal. For instance, measurements generated by VOC sensors located along the route indicated by the trace may influence how a controller (e.g., the controller 110 of FIG. 1) controls different components of the OMPA 400. As an example, if measurements generated by a VOC sensor (e.g., V2 or V3 in FIG. 4B) located after the photolysis chamber 402 indicate that the air still has a relatively high concentration of an undesired gas, then the controller may adjust the speed of the second fan 410 so as to change the amount of time that the air remains in the photolysis and dry media chambers 402, 406. The measurements generated by VOC sensors could also be used to infer the condition of the photolysis and dry media chambers 402, 406. Assume, for example, that a VOC sensor is located between the photolysis chamber 402 and dry media chamber 406 as shown in FIG. 4B. In such a scenario, measurements generated by the VOC sensor may be used to predict the state of the dry media included in the dry media chamber 406. Said another way, measurements generated by the VOC sensor may be used to infer the amount of undesired gasses to which the dry media contained in the dry media chamber 406 has been exposed. Rather than simply instruct a user to replace the dry media on a periodic basis (e.g., every month, two months, or three months), an OMPA could instead intelligently indicate when replacement is necessary based on an analysis of measurements generated by the VOC sensor.

While sensors could be located at various positions along the route, sensors generally should not be installed in the photolysis chamber 402. As mentioned above, the light source 402 located in the photolysis chamber 402 may generate ozone as it emits light. This ozone can have a significant oxidative effect on various sensors. As such, sensors are generally not installed in the photolysis chamber 402.

One or more sensors could also be installed inside the processing chamber, for example, to measure characteristics of the air above the OMPA input (i.e., air in the "headspace" of the processing chamber), For example, sensors could be located along the interior surface of the lid, or sensors could be located along the interior surface of the processing chamber.

Additional sensors could also be located along the route indicated by the trace shown in FIG. 4A. For example, OMPA 400 may include a tachometer that measures the rotation speed of the shift of the second fan 410. Values output by the tachometer may be used (e.g., by the controller 110 of FIG. 1) to predict the speed at which the airflow is traveling through the OMPA 400, and therefore how to control other components (e.g., the drying and grinding mechanisms 122A-N, 124A-N of FIG. 1) of OMPA 400. Additionally or alternatively, OMPA 400 may include a dedicated sensor that is responsible for measuring the speed of the airflow, either directly or indirectly. For example, a hot wire anemometer may be situated along the route within the airflow. The hot wire anemometer may be electrically heated to some temperature above the ambient temperature. The airflow will cool the wire, and the speed of the airflow can be inferred based on the decrease in temperature. As another example, a pressure sensor may be situated along the route within the airflow. As the airflow contacts the pressure sensor, values indicative of the total force may be produced. The speed of the airflow can be inferred based on these values.

Practical Processing Chamber

Figure 5:
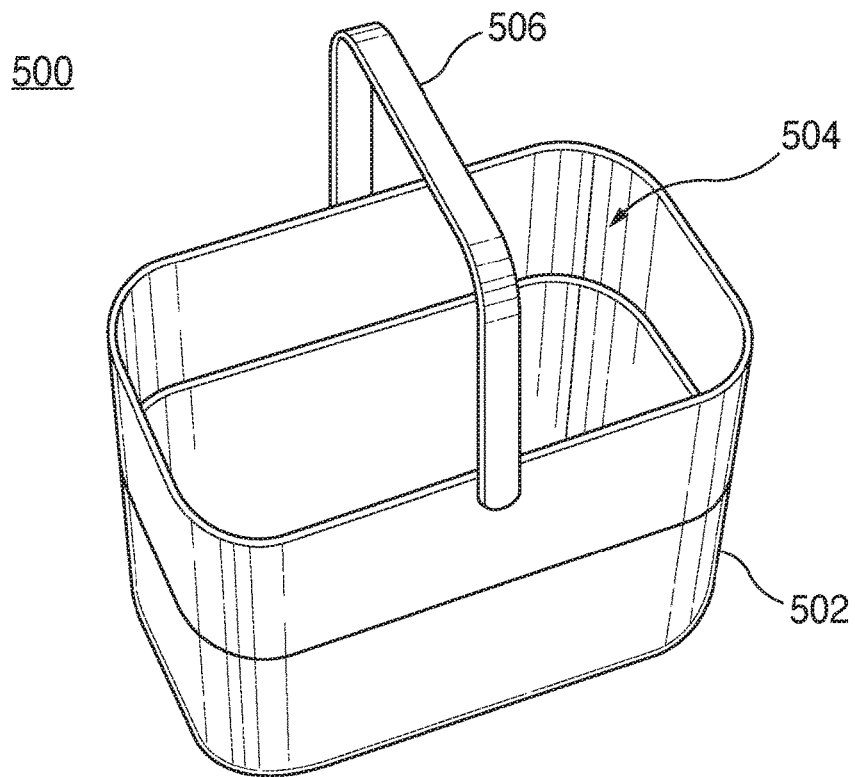
FIG. 5 includes a perspective view of a processing chamber that comprises a receptacle (also referred to as a "bucket") designed to fit securely within the durable housing of an organic matter processing apparatus according to embodiment.

Another core aspect of the OMPA is providing a processing chamber that not only allows OMPA input to be processed in a consistent, predictable manner, but is also easy to use by various individuals. FIG. 5 includes a perspective view of a processing chamber 500 that comprises a receptacle 502 (also referred to as a "bucket") designed to fit securely within the durable housing of an OMPA. The bucket 502 is preferably user-removable from the durable housing, so as to allow for easier integration into existing workflows. For example, the bucket 502 may be placed on the counter during food preparation and then reinstalled in the durable housing afterwards. As another example, the bucket 502 may be removed from the durable housing after production of the product is complete to allow for easier handling (e.g., disposal, storage, or use) of the product.

Generally, the bucket 502 is designed so that, when installed in the durable housing, OMPA input can be easily deposited by simply opening the lid of the OMPA. Normally, the bucket 502 includes an aperture 504 along its top end that is sized to allow for various forms of OMPA input. In some embodiments, the aperture 504 has a rectangular form that is 200-500 millimeters (mm) (7.87-19.68 inches) in length and 150-300 mm (5.90-11.81) in width. For example, the aperture 504 may have a length of roughly 350 mm (13.78 inches) and a width of roughly 200 mm (7.87 inches). Meanwhile, the bucket 502 may have a roughly prismatic form with a length of 250-500 mm (9.84-19.68 inches), a width of 100-300 mm (3.94-11.81 inches), and a height of 150-350 mm (5.90-13.78 inches). For example, the bucket 502 may have a length of roughly 320 mm (12.60 inches), a width of roughly 195 mm (7.68 inches), and a height of roughly 250 mm (9.84 inches).

Moreover, the bucket 502 may be designed to be easily washable (e.g., in a dishwasher). Thus, the bucket 502 may be comprised of one or more durable materials that can withstand prolonged exposure to OMPA input in various states (e.g., moist and dry), as well as repeated washings. Examples of durable materials include plastics, ceramics, metals, and biocomposites. The term "biocomposite," as used herein, may refer to a composite material formed by a matrix (e.g., of resin) and a reinforcement of natural fibers. Biocomposites may be well suited because the matrix can be formed with polymers derived from renewable resources. For example, fibers may be derived from crops (e.g., cotton, flax, or hemp), wood, paper, and the like. This makes biocomposites an attractive option since the benefits (e.g., a focus on renewability and recyclability) align with those offered by the OMPA.

As shown in FIG. 5, a handle 506 may be pivotably connected to opposing sides of the bucket 502. Such a design allows the handle 506 to be pivoted downward when the bucket 502 is installed in the structural body of the OMPA. This can be seen in FIG. 2A, where the handle is folded downward to accommodate a bezel. Thus, the handle 506 may be designed so as to not impede the deposition of OMPA input into the bucket 502. The handle 506 may be designed to allow a user to easily carry the entire processing chamber 500, with either one or two hands. To ensure that the processing chamber 500 can be transported without issue, the bucket 502 may be designed so that, when loaded with product, the weight does not exceed a threshold. The threshold may depend on the size of the bucket 502 and/or the material(s) from which the bucket 502 is made, though it may be desirable to limit the weight to no more than 10-25 pounds (and preferably 15-20 pounds).

Figure 6:
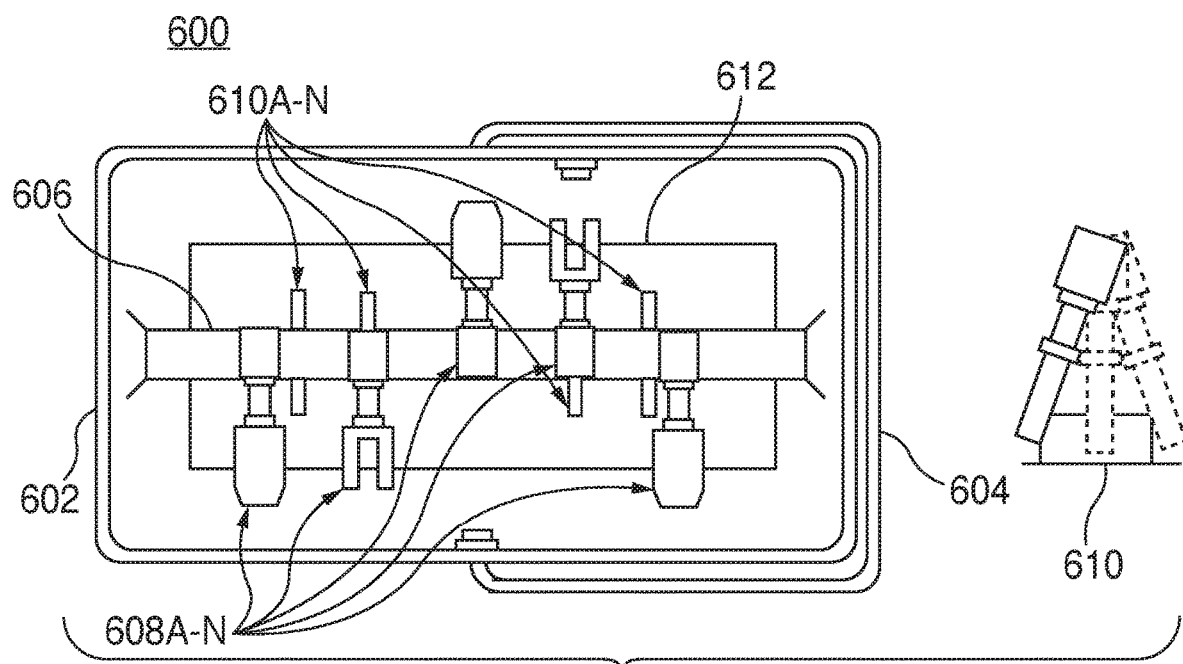
FIG. 6 includes a top view of a processing chamber that includes a bucket with a handle pivotably connected thereto according to embodiment.

FIG. 6 includes a top view of a processing chamber 600 that includes a bucket 602 with a handle 604 pivotably connected thereto. As mentioned above, a OMPA may include one or more grinding mechanisms 608A-N that are responsible for cutting, crushing, or otherwise separating OMPA input deposited into the bucket 602 into fragments. The grinding mechanisms 608A-N may be part of the processing chamber 600 as shown in FIG. 6. Here, for example, five grinding mechanisms are fixedly attached to a central rod 606 that arranged horizontally across the width of the bucket 602 and is driven by gears (not shown), which are in turn driven by a motor (not shown). The motor may be located in the durable housing, while the gears may be located in the bucket 602 as further discussed with reference to FIG. 7.

The grinding mechanisms 608A-N can be driven in such a manner that an appropriate amount of grinding occurs. In some embodiments, the appropriate amount of grinding is predetermined (e.g., programmed in memory of the OMPA). In other embodiments, the appropriate amount of grinding is determined dynamically based on a characteristic of OMPA input in the bucket 602. For example, the appropriate amount of grinding may be based on the amount of OMPA input (e.g., as determined based on measurements output by a mass sensor) contained in the bucket 602. As another example, the appropriate amount of grinding may be based on the amount of resistance that is experienced by the grinding mechanisms 608A-N. Generally, dried OMPA input that has been at least partially ground will offer less resistance than wet OMPA input or dried OMPA input that has not been ground.

As the central rod 606 rotates, the grinding mechanisms 608A-N may also rotate. Generally, the grinding mechanisms rotate at a rate of 1-10 rotations per minute (RPM), at a rate of 1-2 RPMs, or 1.6 RPMS. This rotating action may cause OMPA input located near the bottom of the bucket 602 to be brought toward the top of the bucket 602, such that all OMPA input contained in the bucket 602 is occasionally exposed to the downward airflow emitted from the lid.

The grinding mechanisms 608A-N may not provide sufficient shear on their own to break apart more solid OMPA input. Examples of solid OMPA input include bones, raw produce, and the like. To address this issue, the bucket 602 may include one or more stationary blades 610A-N that can work in concert with some or all of the grinding mechanisms 608A-N. Assume, for example, that the processing chamber 600 includes at least one paddle and at least one two-prong rotating blade. In FIG. 6, the processing chamber 600 includes three paddles and two two-prong rotating blades that are alternately arranged along the length of the central rod 606. In such an embodiment, the stationary blades 610A-N may be positioned so that as each two-prong rotating blade rotates, a corresponding stationary blade will pass through its two prongs to create cutting action. A side view of this scenario is shown in FIG. 6. Paddles may also create some cutting action. However, paddles may create less cutting action than the two-prong rotating blades since (i) the paddles are generally oriented at an angle to promote upward and sideward movement of OMPA input and (ii) the paddles generally pass alongside the stationary blades 610, thereby providing less shear.

Generally, more than one type of grinding mechanism is included in the processing chamber 600. For example, paddles and rotating blades could be arranged in an alternating pattern across the width of the bucket 602 so provide different functionalities. While the paddles may have limited usefulness in terms of grinding OMPA input, the paddles may be useful in churning OMPA input so that wetter material rises toward the top of the bucket 602. Accordingly, some "grinding mechanisms" may be primarily responsible for cutting OMPA input into smaller fragments while other "grinding mechanisms" may be primarily responsible for mixing the OMPA input to promote desiccation.

In FIG. 6, the paddles and rotating blades are shown to be coplanar—though extending from opposing sides of the central rod 606—for the purpose of illustration. The grinding mechanisms 608A-N could be radially arranged about the periphery of the central rod 606 in different ways. For example, the three paddles shown in FIG. 6 could be equally spaced about the circumference of the central rod 606 to ensure that OMPA input contained in the bucket 602 is constantly, or nearly constantly, jostled. Generally, the two-prong rotating blades are offset to minimize the torque that is needed to cut through OMPA input at any given point in time. Said another way, the two-prong rotating blades may be offset so that only one is actively cutting OMPA input in conjunction with its corresponding stationary blade 610 at a time. Here, for example, the two two-prong rotating blades are offset by 180 degrees, though the blades could be offset by more or less than 180 degrees.

Grinding mechanisms (and the power available to those grinding mechanisms) may govern the types of OMPA input that can be handled by a given OMPA. Generally, stronger grinding mechanisms in combination with more power will allow heavier duty OMPA input (e.g., bones) to be handled without issue. Accordingly, different embodiments of OMPA could be designed for residential environments (e.g., with less power and weaker grinding mechanisms) and commercial environments (e.g., with more power and stronger grinding mechanisms).

In some embodiments, the bucket 602 includes a thermally conductive base portion 612 that is responsible for conveying heat to the OMPA input. Normally, the thermally conductive base portion 612 may extend up the longitudinal sidewalls of the bucket 602 that are parallel to the central rod 606. In embodiments where the thermally conductive base portion 612 is responsible for heating the OMPA input, the thermally conductive base portion 612 may extend up the longitudinal sidewalls roughly 40-70 percent of their height. In embodiments where the thermally conductive base portion 612 is responsible for heating the OMPA input and air in the "headspace" of the processing chamber 600, the thermally conductive base portion 612 may extend up the longitudinal sidewalls roughly 70-90 percent of their height.

Figure 7:
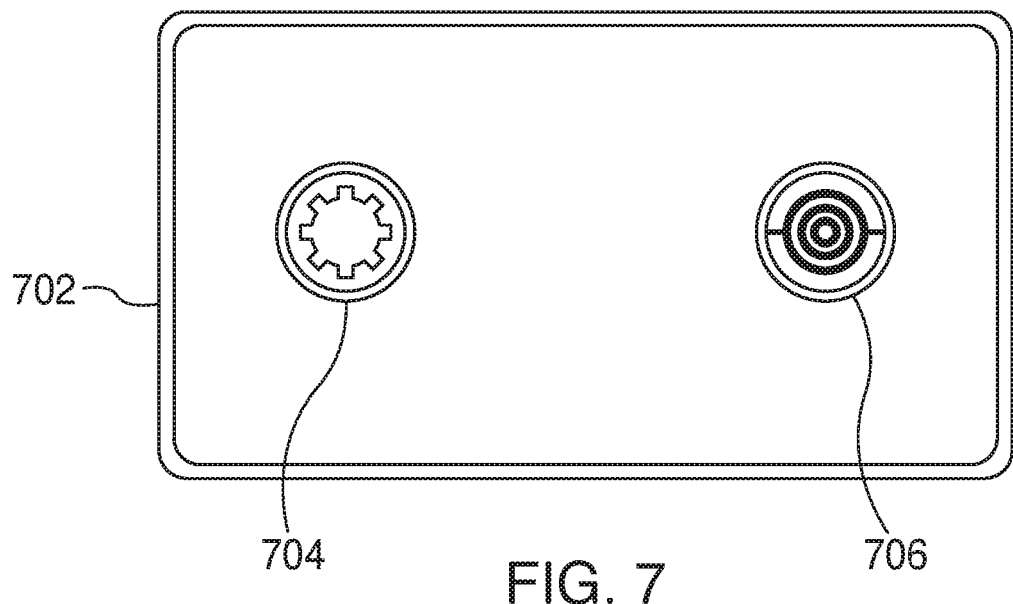
FIG. 7 includes a top view of a cavity in a durable housing that includes a mechanical coupling and an electrical coupling according to embodiment.

When the bucket 602 is installed within the durable housing, the thermally conductive base portion 612 may be electrically connected to a heating element (e.g., a resistive heating element in the form of a coil) that is located in the durable housing. FIG. 7 includes a top view of a cavity in a durable housing 702 that includes a mechanical coupling 704 and an electrical coupling 706. When installed within the cavity in the durable housing 702, the processing chamber 600 may be connected to the mechanical and electrical couplings 704, 706. Thus, the mechanical and electrical couplings 704 may be detachably connectable to respective interconnects on the processing chamber 600. The mechanical coupling 704 may be responsible for driving gears that are located in the bucket 602, while the electrical coupling 706 may be responsible for providing electricity to a heating element (not shown) that heats the thermally conductive base portion 612. The heating element may be part of the bucket 602. In some embodiments, the heating element is included in the cavity of the durable housing 702. In such embodiments, the thermally conductive base portion 612 of the bucket 602 may be heated through contact with the heating element. Accordingly, the thermally conductive base portion 612 may be heated through thermo-mechanical conductive heating or on-bucket electrical heating instead of convective heating.

A mass sensing system may be incorporated into the OMPA so that mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor.

One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). However, because the bucket 602 can be removable installed within the durable housing, mass sensors could additionally or alternatively be located along the bottom of the bucket 602. As an example, a mass sensor may be located on each "foot" of the bucket 602. Regardless of location, the mass sensor(s) included in the OMPA may continually or periodically output measurements that can be used to calculate, infer, or otherwise establish the total weight of the bucket 602 (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play an important role in ensuring that the OMPA can dynamically react to changes in the state of the OMPA input.

Figure 8:
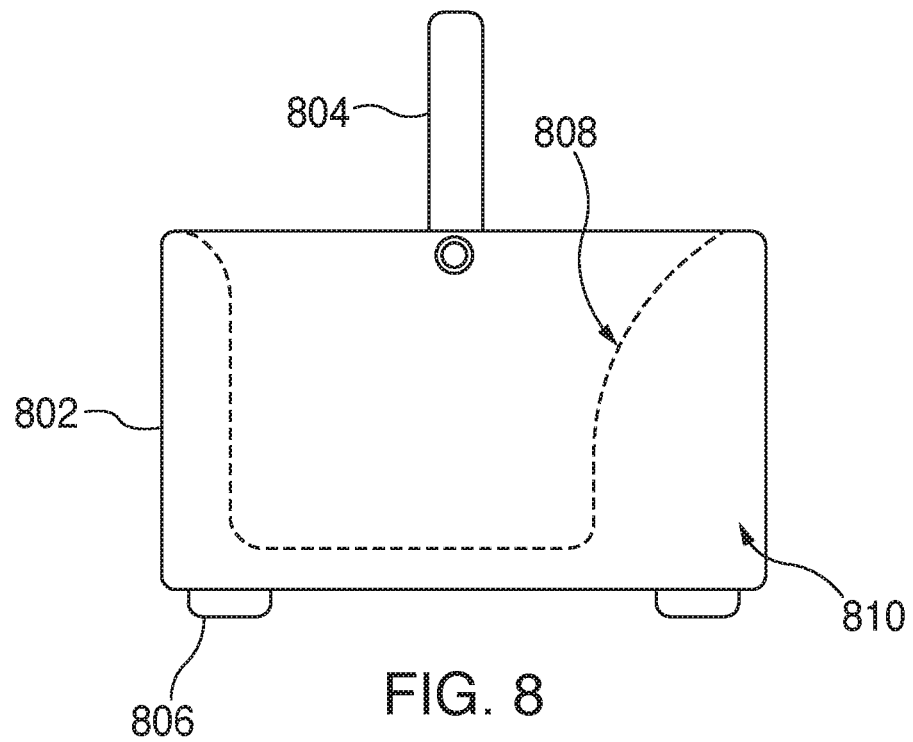
FIG. 8 includes a side profile view of a bucket in which organic matter can be deposited according to embodiment.

FIG. 8 includes a side profile view of a bucket 802 in which OMPA input can be deposited. A handle 804 may be pivotably connected to opposing sides of the bucket 802. The handle 804 may allow the bucket 802 to be easily removed from the OMPA as discussed above, as well as easily conveyed to another location. The bucket 802 may also have structural features 806 that terminate along a substantially planar level. These structural features 806 (also referred to as "feet") may help stabilize the bucket 802. Moreover, these structural features 806 may include the corresponding interconnects for the mechanical and electrical couplings 704, 706 discussed above with reference to FIG. 7. Such a design not only allows the corresponding interconnects to be readily aligned with those couplings, but also ensures that the structural features 806 can protect the corresponding interconnects when the bucket 802 is removed from the OMPA. As mentioned above, while mass sensor(s) are normally installed along the bottom of the OMPA in which the bucket 802 is to be installed, mass sensor(s) could additionally or alternatively be installed within some or all of these structural features 806 to measure the weight of the bucket 802 and its contents.

As shown in FIG. 8, the cavity defined by the interior surface of the bucket 802 may not necessarily by symmetrical across the longitudinal and latitudinal planes defined therethrough. For reference, the term "latitudinal plane" may be used to refer to the plane that is substantially parallel to the handle 804 while extended upward as shown. Meanwhile, the term "longitudinal plane" may be used to refer to the plane that is substantially orthogonal to the latitudinal plane. For example, the cavity may be more gradually tapered along one end to form a lip 808 (also referred to as a "spout"). The spout may allow a user to empty contents from the bucket 802 by simply tipping it along one end.

This gradual tapering along one end may also create a space 810 along one end of the bucket 802 in which components can be installed. For example, the gears that are responsible for driving the central rod that extends through the cavity may be located in this space 810. In addition to conserving valuable space within the bucket 802 (and OMPA as a whole), locating the gears in the space 810 will also add weight to one end of the bucket 802. This added weight may make it easier for the user to rotate the bucket 802 along that end to empty contents via the lip 808.

Practical Lid

An important aspect of increasing adoption is that the OMPA should be easily deployable and operable. The component with which many users will interact most frequently is the lid (e.g., lid 204 of FIG. 2). Accordingly, it is important that the lid be easy to use but also offer some functionality.

Figure 9:
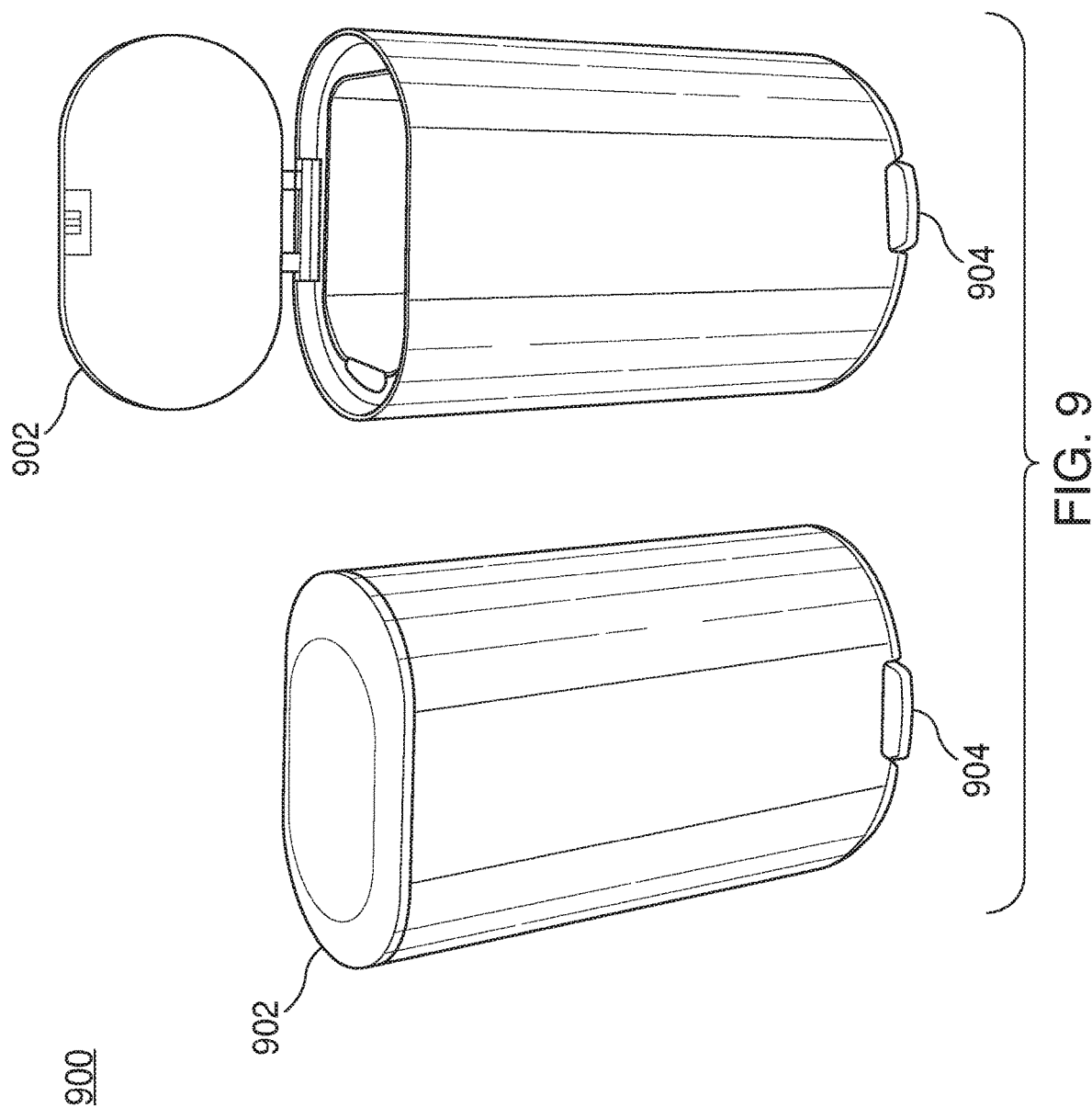
FIG. 9 includes front perspective views of an organic matter processing apparatus with the lid in a closed position and an open position according to embodiment.

As an example, a user may not only be able to open the lid with her hands, but also by interacting with an electro-mechanical pedal switch that is accessible along the front side of the OMPA. FIG. 9 includes front perspective views of OMPA 900 with the lid 902 in a closed position and an open position. As shown in FIG. 9, an electro-mechanical pedal switch 904 (or simply "pedal switch") may be located along the front side of OMPA 900. When a user applies pressure to the pedal switch 904 (e.g., with her foot), the lid 902 may be electro-mechanically actuated to the open position. As further discussed below, the open position may be one of multiple open positions to which the lid 902 can be actuated. When the user stops applying pressure to the pedal switch 904, the lid 902 may automatically close. The lid 902 may not close immediately, however. Instead, the lid 902 may be electro-mechanically actuated to the closed position a short interval of time (e.g., several seconds). Thus, the pedal switch 904 may allow the lid 902 of the OMPA 900 to be partially, if not entirely, operated in a hands-free manner.

As another example, the lid may be controllably lockable, for example, via a damped mechanism with a smooth spring-loaded retraction. Assume, for example, that the OMPA is performing high intensity processing where the processing chamber is heated. In such a situation, the lid may remain locked so long as the temperature of the processing chamber (or its contents) remains above a threshold (e.g., programmed in memory). This locking action may serve as a safety mechanism by ensuring that a user cannot easily access the interior of the OMPA under unsafe conditions. Note, however, that the user may still be able to override this locking action (e.g., by interacting with an input mechanism accessible along the exterior of the OMPA).

As another example, air may be "sucked" downward whenever the lid is opened, thereby preventing odors from escaping into the ambient environment. This action may be particularly helpful in preventing odors from escaping the OMPA when the lid is opened mid-cycle (i.e., while the OMPA input is being dried or ground). This action can be initiated by a controller based on one or more outputs produced by a sensor that is located proximate to where the lid contacts the durable housing when in the closed position. For example, a sensor could be located along the periphery of the lid, and its output may be indicative of whether the lid is adjacent to the durable housing (i.e., in the closed position). As another example, a sensor could be located along the periphery of the durable housing, and its output may be indicative of whether the lid is adjacent to the durable housing (i.e., in the closed position).

As another example, the lid may be intelligently controlled based on the intent of a user as inferred by the OMPA. Assume, for example, that the user either partially opens the lid by pivoting the lid roughly 30-75 degrees with respect to its original location or softly presses on a pedal switch (e.g., pedal switch 904 of FIG. 9). In such a situation, the OMPA may infer that the user is interested in performing a short-duration activity and then actuate the lid to a first angle (e.g., 60 degrees or 75 degrees). Examples of short-duration activities include depositing more OMPA input in the processing chamber or observing the OMPA input in the processing chamber. Now, assume that the user either fully opens the lid by pivoting the lid roughly 90 degrees with respect to its original location or firmly presses on the pedal switch. In such a situation, the OMPA may infer that the user is interested in performing a long-duration activity and then actuate the lid to a second angle (e.g., 90 degrees). Examples of long-duration activities include removing the processing chamber and cleaning the interior of the OMPA. Similarly, if the lid is actuated to the first angle and the OMPA then infers that the user is likely interested in performing a long-duration activity (e.g., based on removal of the bezel), then the lid may be actuated to the second angle. Accordingly, the OMPA may automatically further open the lid responsive to a determination that the user intends to access the interior for a longer period of time.

Similarly, the OMPA may control how quickly the lid closes based on the intent of the user. If the OMPA infers that the user is interested in performing a short-duration activity, the OMPA may maintain the lid in a given position (e.g., at the first angle) for a first amount of time. If the OMPA infers that the user is interested in performing a long-duration activity, the OMPA may maintain the lid in another given position (e.g., at the second angle) for a second amount of time. The first amount of time may be 2-10 seconds, while the second amount of time may be 10-60 seconds.

Overview of Operating States

Figure 10:
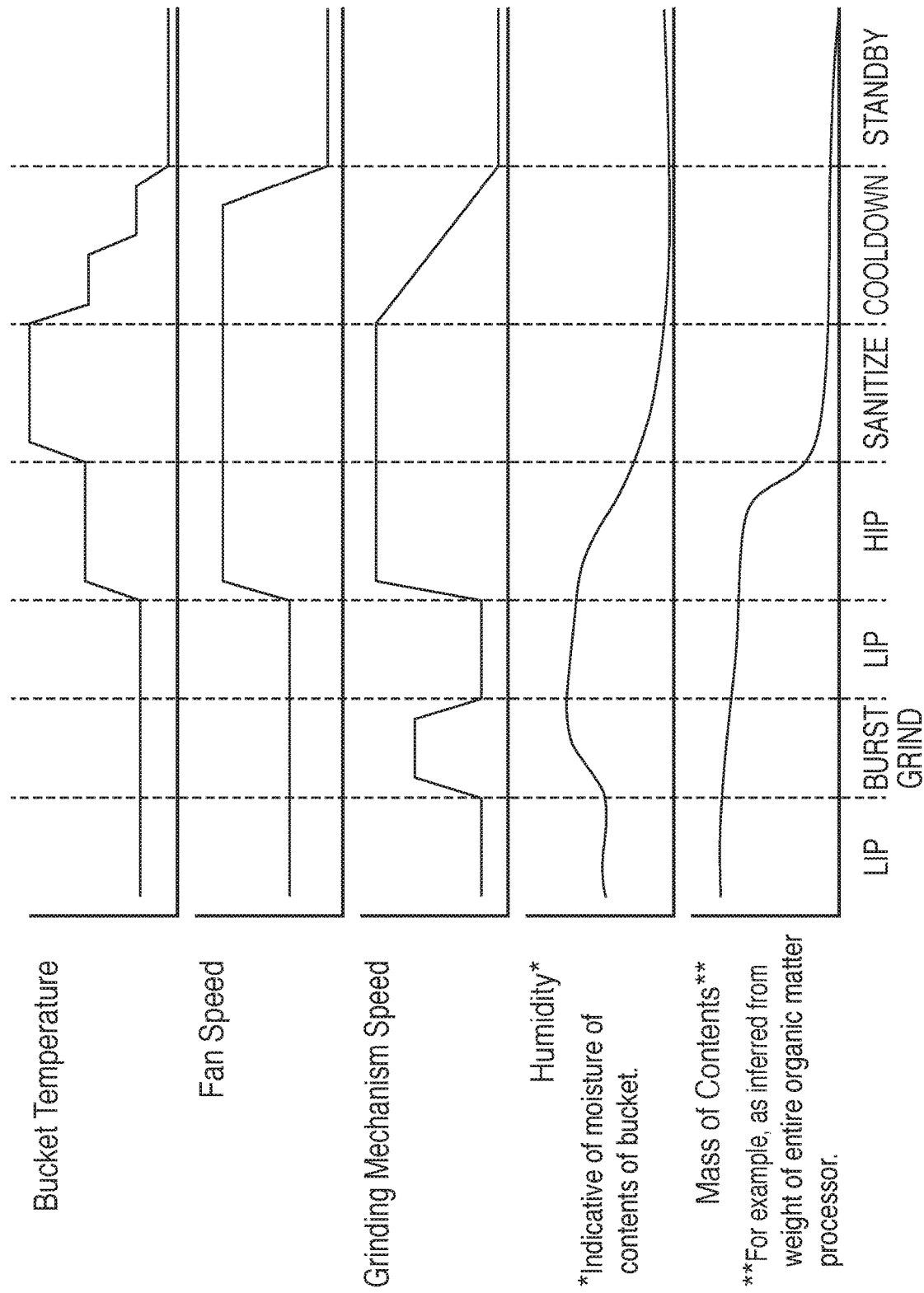
FIG. 10 includes an example of an operating diagram that illustrates how control parameters can be dynamically computed in accordance with an intelligent time recipe in order to process the contents of an organic matter processing apparatus according to embodiment.

Over time, the OMPA may cycle between various states to process OMPA input. As mentioned above, the OMPA may be able to convert OMPA input into a relatively stable product (e.g., food grounds) by drying and grinding the OMPA input. The control parameters for drying or grinding the OMPA input may be dynamically computed (e.g., by the controller 110 of FIG. 1) as a function of the outputs produced by sensors tasked with monitoring characteristics of the air traveling through the OMPA, as well as the mass or weight of the OMPA input in the processing chamber. For example, the control parameters could be dynamically computed as a function of (i) humidity of the air traveling through the OMPA, (ii) temperature of the air traveling through the OMPA, and (iii) weight of OMPA input contained in the OMPA. FIG. 10 includes an example of an operating diagram that illustrates how control parameters can be dynamically computed in accordance with an intelligent time recipe in order to process the contents of an OMPA.

As mentioned above, the OMPA may be able to intelligently cycle between different states to process OMPA input. Six different states are described in Table I. Those skilled in the art will recognize, however, that embodiments of the OMPA may be able to cycle between any number of these states. For example, some OMPAs may only be able to cycle between two, three, or four of these states, while other OMPAs may be able to cycle between all six states.

The OMPA may rely on a single target criterion or multiple target criteria to determine when to cycle between these states. The target criteria could be programmed into the memory of the OMPA, or the target criteria could be specified by a user (e.g., through an interface generated by a control platform). Examples of target criteria include moisture level, temperature, and weight. Using moisture level as an example, there may be multiple preset moisture levels (e.g., 10, 20, 30, and 40 percent) from which the target criterion could be selected (e.g., based on the nature of the OMPA input). The OMPA may not measure moisture of the OMPA input, but can instead predict or infer the moisture based on, for example, the humidity of air traveling through the OMPA and the weight of OMPA input. The OMPA could also rely on the average times for completion of these states. Assume, for example, that the OMPA receives input indicative of a request to process OMPA input deposited into the processing chamber. In such a situation, the OMPA may determine when to schedule the various states based on (i) how long those states have historically taken to complete and (ii) the weight of the OMPA input, among other factors. For example, the OMPA may attempt to schedule high intensity processing to be completed overnight as the grinding mechanisms may operate at a noise that might disturb nearby individuals.

| Priority | State Identifier (ID) | State Description |
|---|---|---|
| P1 | High Intensity Processing (HIP) | Goal: Achieve the target moisture level at a given temperature and reduce mass and volume of OMPA input.<br>Details: Temperature, airflow, and/or grinding mechanisms can be set to high settings. HIP normally takes at least several hours to complete, so the OMPA may attempt to schedule overnight. HIP may be triggered manually (e.g., via an interaction with an input mechanism, or via an instruction provided through the control platform) or automatically (e.g., based on a determination that the weight of the OMPA input exceeds a threshold). |
| P2 | Sanitize | Goal: Kill at least a predetermined number (e.g., greater than 99 percent) of pathogens.<br>Details: Temperature of bucket heater and speed of the grinding mechanism may be higher than that of the temperature and speed used in HIP. The lid fan may not be activated during sanitization. Executed after HIP cycle. |
| P4 | Fixed Time Low Intensity Processing (LIP) | Goal: Advance drying in a non-intrusive manner while individuals are more likely to be nearby (e.g., during daylight hours).<br>Details: Operate the grinding mechanism for a fixed period of time before activating HIP to catch any obvious grinder jams due to hard inputs. |
| P5 | Burst Grind/Daytime Grind LIP | Goal: Incorporate wet (e.g., unprocessed) OMPA input into dry (e.g., processed or semi-processed) OMPA input to make drying easier.<br>Details: Lid Fan and Bucket Heater may be turned off and the grinding mechanisms is set to operate at a slower speed to mix newly added OMPA input with previously processed OMP input. |
| P7 | Standby | Goal: OMPA apparatus is turned off.<br>Details: Grinding mechanism, fans, and heaters are turned off, unless necessary to meet some other criterion. For example, airflow and/or grinding mechanisms may be occasionally triggered to maintain an odor criterion. |
| P3 | Cooldown | Goal: Allow the user to handle the processing chamber.<br>Details: Settings are similar to standby, though airflow may be higher if necessary to cool the processing chamber or the product stored therein. Bucket heater is turned off and grinder mechanism may operate at same speed as a LIP cycle. Executed after Sanitize cycle. |

-continued

| Priority | State Identifier (ID) | State Description |
|---|---|---|
| P6 | Vacation Mode HIP | Goal: Preserve integrity of the OMPA output when OMPA apparatus is maintained an unused state.<br>Details: Run a short HIP cycle once every X number of days when the OMPA apparatus is not opened and/or no OMPA input is added. |

As mentioned above, the durations of these states can be dynamically determined based on, for example, analysis of outputs generated by sensors housed in the OMPA. However, the durations of these states are predefined—at least initially—in some embodiments. For example, high intensity processing may be programmed to occur for a certain amount of time (e.g., 4, 6, or 8 hours), and burst grind may be programmed to occur for a certain amount of time (e.g., 30 seconds, 5 minutes, 30 minutes) whenever new OMPA input is added. Those skilled in the art will also recognize that the duration of some states could be dynamically determined, while the duration of other states could be predefined. As an example, the OMPA may continue performing high intensity processing until the target criteria are achieved. However, whenever new OMPA input is added, the OMPA may cycle to burst grind for a certain amount of time (e.g., 30 seconds, 5 minutes, 30 minutes) before reverting back to its previous state.

Overview of Control Platform

In some situations, it may be desirable to remotely interface with a OMPA. For example, a user may want to initiate high intensity processing if she is not at home and does not expect to return home for an extended duration (e.g., several hours). This could be done through a control platform that is communicatively connected to the OMPA. Thus, the user may be able to interact with the OMPA through the control platform. Through the control platform, the user may also be able to view information regarding the OMPA (e.g., its current state, average duration of each state, how much OMPA input has been processed over a given interval of time, current weight of the bucket and its contents) through interfaces that are generated by the control platform.

Figure 11:
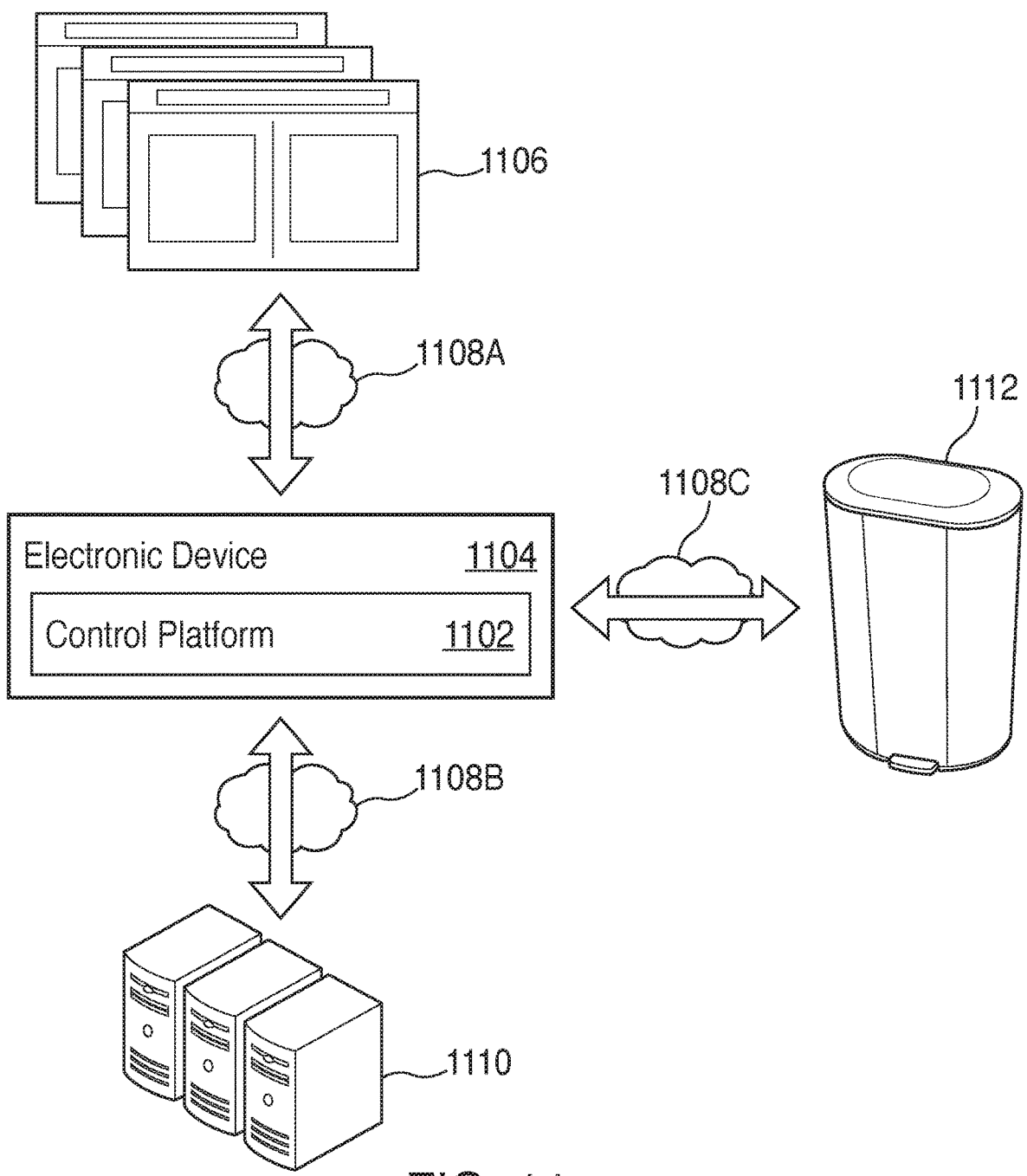
FIG. 11 illustrates a network environment that includes a control platform according to embodiment.

FIG. 11 illustrates a network environment 1100 that includes a control platform 1102. For the purpose of illustration, the control platform 1102 may be described as a computer program that is executing on an electronic device 1104 accessible to a user of OMPA 1112. As discussed above with reference to FIG. 1, OMPA 1112 may include a communication module that is responsible for receiving data from, or transmitting data to, the electronic device 1104 on which the control platform 1102 resides.

Users may be able to interface with the control platform 1102 via interfaces 1106. For example, a user may be able to access an interface through which information regarding OMPA 1112 can be viewed. This information may include historical information related to past performance (e.g., total pounds of OMPA input that has been processed), or this information may include state information related to current activity (e.g., the current state of OMPA 1112, an indication of whether OMPA 1112 is presently connected to the electronic device 1104, an indication of whether OMPA 1112 is presently locked). Thus, a user may be able to educate herself on the OMPA and its contents by reviewing content posted to interfaces generated by the control platform 1102.

Moreover, a user may be able to access an interface through which instructions can be provided to OMPA 1112. Said another way, the user may be able to specify, through the control platform 1102, when or how OMPA 1112 should process OMPA input stored therein. As an example, the OMPA 1112 may initially be configured to perform high intensity processing between 10 PM and 8 AM under the assumption that its ambient environment will generally be devoid of individuals during that timeframe. However, the user may be able to adjust aspects of setup or operation of OMPA 1112 through the control platform 1102. For instance, the user could specify that high intensity processing should not begin until 2 AM, or the user could specify that high intensity processing should not end after 6 AM.

A user could also program, through the control platform 1102, a preference regarding the weight at which to empty the processing chamber of OMPA 1112. On its own, the processing chamber may weigh 8-10 pounds. The total weight of the processing chamber (including its contents) can quickly become unwieldy for some users, such as elderly individuals and juvenile individuals. Accordingly, the control platform 1102 may permit users to define a weight at which to generate notifications (also referred to as "alarms"). Assume, for example, that a user indicates that the total weight of the processing chamber (including its contents) should not exceed 15 pounds through an interface generated by the control platform 1102. In such a scenario, the control platform 1102 may monitor mass measurements received from OMPA 1112 and then generate a notification in response to determining that the total weight of the processing chamber (including its contents) is within a certain amount of 15 pounds. The certain amount may be a fixed value (e.g., 1 pound or 2 pounds), or the certain amount may be a dynamically determined value (e.g., 5 percent or 10 percent of the weight specified by the user).

The notification could be presented in various ways. In embodiments where the control platform 1102 is implemented as a computer program executing on an electronic device 1104 as shown in FIG. 11, the notification may be generated by the computer program (e.g., in the form of a push notification). Additionally or alternatively, the control platform 1102 may transmit an instruction to OMPA 1112 to generate the notification. Accordingly, the notification could be a visual, audible, or tactile notification that is generated by the electronic device 1104 or OMPA 1112.

As shown in FIG. 11, the control platform 1102 may reside in a network environment 1100. Thus, the electronic device 1104 on which the control platform 1102 is implemented may be connected to one or more networks 1108A-C. These networks 1108A-C may be personal area networks (PANs), local area networks (LANs), wide area networks (WANs), metropolitan area networks (MANs), cellular networks, or the Internet. Additionally or alternatively, the electronic device 1104 could be communicatively connected to other electronic devices—including OMPA 1112—over a short-range wireless connectivity technology, such as Bluetooth, NFC, Wi-Fi Direct (also referred to as "Wi-Fi P2P"), and the like.

In some embodiments, at least some components of the control platform 1102 are hosted locally. That is, part of the control platform 1102 may reside on the electronic device 1104 that is used to access the interfaces 1106 as shown in FIG. 11. For example, the control platform 1102 may be embodied as a mobile application that is executable by a mobile phone. Note, however, that the mobile application may be communicatively connected to (i) OMPA 1112 and/or (ii) a server system 1110 on which other components of the control platform 1102 are hosted.

In other embodiments, the control platform 1102 is executed entirely by a cloud computing service operated by, for example, Amazon Web Services®, Google Cloud Platform™, or Microsoft Azure®. In such embodiments, the control platform 1102 may reside on a server system 1110 that is comprised of one or more computer servers. These computer servers can include different types of data (e.g., regarding batches of product that have been produced by OMPAs associated with different users), algorithms for implementing the routine described above (e.g., based on knowledge regarding ambient temperatures, humidity, etc.), algorithms for tailoring or training the routine described above (e.g., based on knowledge gained from nearby OMPAs or comparable OMPAs), and other assets (e.g., user credentials). Those skilled in the art will recognize that this information could also be distributed amongst the server system 1110 and one or more other electronic devices. For example, some data that is generated by a given OMPA may be stored on, and processed by, that OMPA or an electronic device that is "paired" with that OMPA. Thus, not all data generated by OMPAs—or even the control platform—may be transmitted to the server system 1110 for security or privacy purposes.

One benefit of having a network-connected OMPA is that it enables connectivity with other electronic devices, and thus integration into related systems.

Assume, for example, that a user purchases and then deploys a OMPA in a home. This OMPA may include a set of instructions (also referred to as the "intelligent time recipe") that, when executed, indicate how its components are to be controlled. These instructions may involve the execution of heuristics, algorithms, or computer-implemented models. Rather than learn best practices "from scratch," the OMPA (or a control platform to which it is communicatively connected) may be able to learn from the experiences of other OMPAs. These OMPAs may be located nearby, and therefore may experience comparable ambient conditions such as humidity, temperature, and the like. Alternatively, these OMPAs may be comparable, for example, in terms of amount of actual or expected OMPA input, type of actual or expected OMPA input, number of users (e.g., a single individual versus a family of four individuals), etc. Thus, knowledge may be shared among OMPAs as part of a networked machine learning scheme. Referring again to the above-mentioned example, the OMPA may initiate a connection with a control platform after being deployed in the home. In such a scenario, the control platform may provide another set of instructions that is learned based on knowledge gained by the control platform from analysis of the activities of other OMPAs. Accordingly, the control platform may further develop instruction sets based on machine learning. Learning may be performed continually (e.g., as OMPAs perform activities and generate data), and insights gained through learning may be provided continually or periodically. For instance, the control platform may communicate instructions to a OMPA whenever a new set is available, or the control platform may communicate a new set of instructions to an OMPA only upon receiving input (e.g., from the corresponding user) indicating that the OMPA is not operating as expected.

As another example, assume that a municipality is interested in collecting the products produced by various OMPAs for further processing (e.g., composting). In such a scenario, the municipality may be interested in information such as the weight and water content of product that is available for collection. Each OMPA may not only have the sensors needed to measure these characteristics as discussed above but may also have a communication module that is able to transmit measurements elsewhere. In some embodiments, these OMPA directly transmit the measurements to the municipality (e.g., by uploading to a network-accessible data interface, such as an application programming interface). In other embodiments, these OMPAs indirectly transmit the measurements to the municipality (e.g., by forwarding to respective control platforms, which then transmit the measurements—or analyses of the measurements—onward to the municipality). With these measurements, the municipality may be able to retrieve, transport, and handle the products produced by these OMPAs in a more intelligent manner. For example, the municipality may have a better understanding of when retrieval needs to occur, and how much storage space is needed for the products, if the weight is shared.

Users may also be able to communicate with one another, directly or indirectly, through OMPA. Assume, for example, that a first OMPA has finished processing its OMPA input into a product. Although processing is complete, a corresponding first user may not be ready to offload the product. In such a situation, a second user who is located nearby (e.g., as determined based on information generated by the respective OMPA, information input by the respective users, etc.) may offer to handle the product. For instance, the second user may retrieve the product from the first user and then handle it, add it to her own product, etc. Users may be able to communicate through the interfaces 1106 generated by the control platform 1102, or users may be able to communicate directly through their respective OMPAs.

Computing System

Figure 12:
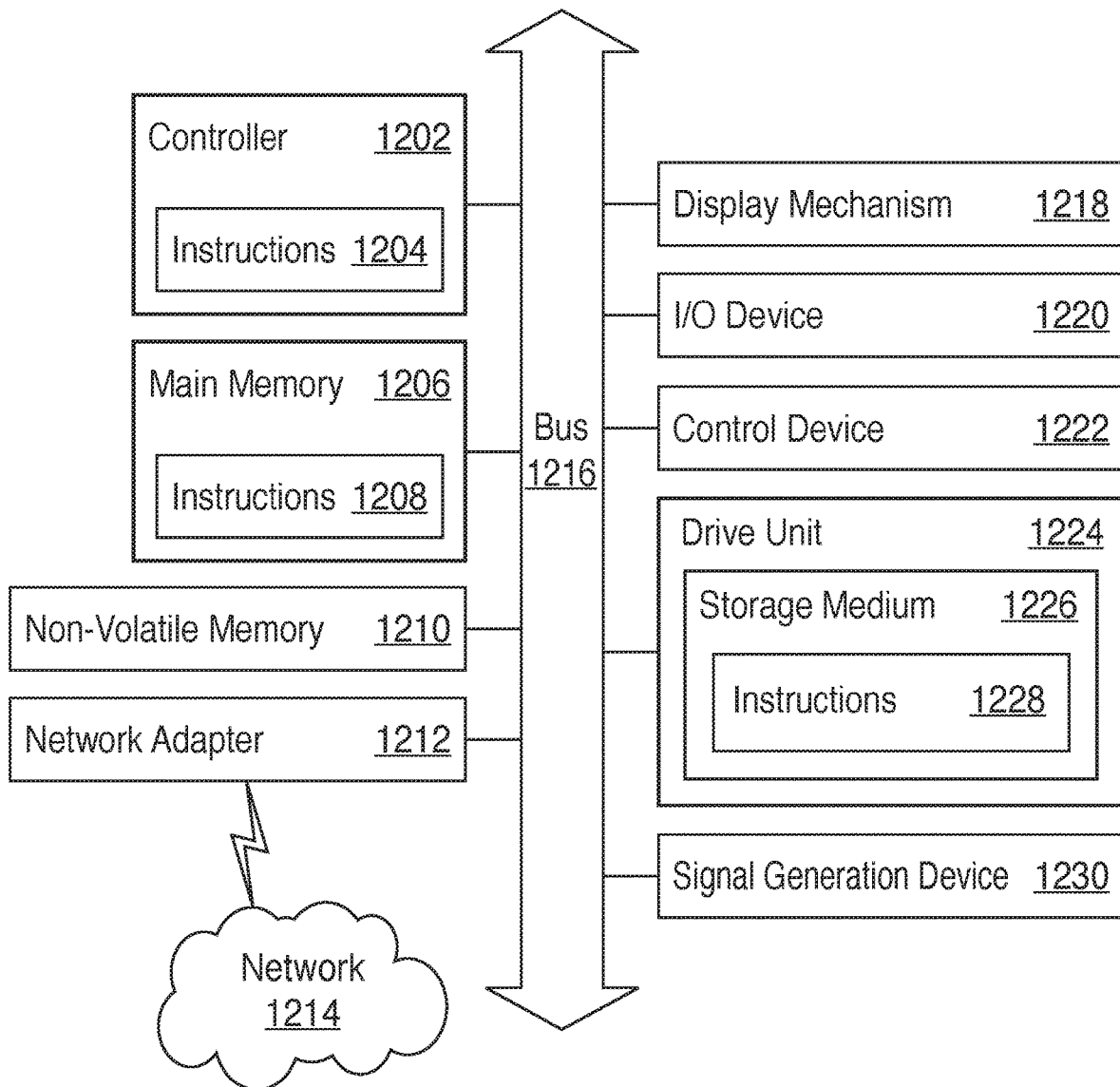
FIG. 12 is a block diagram illustrating an example of a computing system in which at least some operations described herein can be implemented according to embodiment.

FIG. 12 is a block diagram illustrating an example of a computing system 1200 in which at least some operations described herein can be implemented. For example, components of the computing system 1200 may be hosted on an OMPA that is tasked with converting OMPA input into a more stable product. As another example, components of the computing system 1200 may be hosted on an electronic device that is communicatively connected to an OMPA.

The computing system 1200 may include a controller 1202, main memory 1206, non-volatile memory 111210, network adapter 1212, display mechanism 1218, input/output (I/O) device 1220, control device 1222, drive unit 1224 including a storage medium 1226, and signal generation device 1230 that are communicatively connected to a bus 1216. The bus 1216 is illustrated as an abstraction that represents one or more physical buses or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

While the main memory 1206, non-volatile memory 1210, and storage medium 1226 are shown to be a single medium, the terms "machine-readable medium" and "storage medium" should be taken to include a single medium or multiple media (e.g., a database distributed across more than one computer server) that store instructions 1228. The terms "machine-readable medium" and "storage medium" shall also be taken to include any medium that is capable of storing, encoding, or carrying instructions for execution by the computing system 1200.

In general, the routines executed to implement the embodiments of the present disclosure may be implemented as part of an operating system or a specific computer program. Computer programs typically comprise instructions (e.g., instructions 1204, 1208, 1228) that are set at various times in various memory and storage devices in an electronic device. When read and executed by the controller 1202, the instructions cause the computing system 1200 to perform operations to execute various aspects of the present disclosure.

The network adapter 1212 enables the computing system 1200 to mediate data in a network 1214 with an entity that is external to the computing system 1200 through any communication protocol that is supported by the computing system 1200 and the external entity. The network adapter 1212 can include a network adaptor card, wireless network interface card, router, access point, wireless router, switch, protocol converter, gateway, bridge, hub, digital media receiver, repeater, or any combination thereof.

Figure 13:
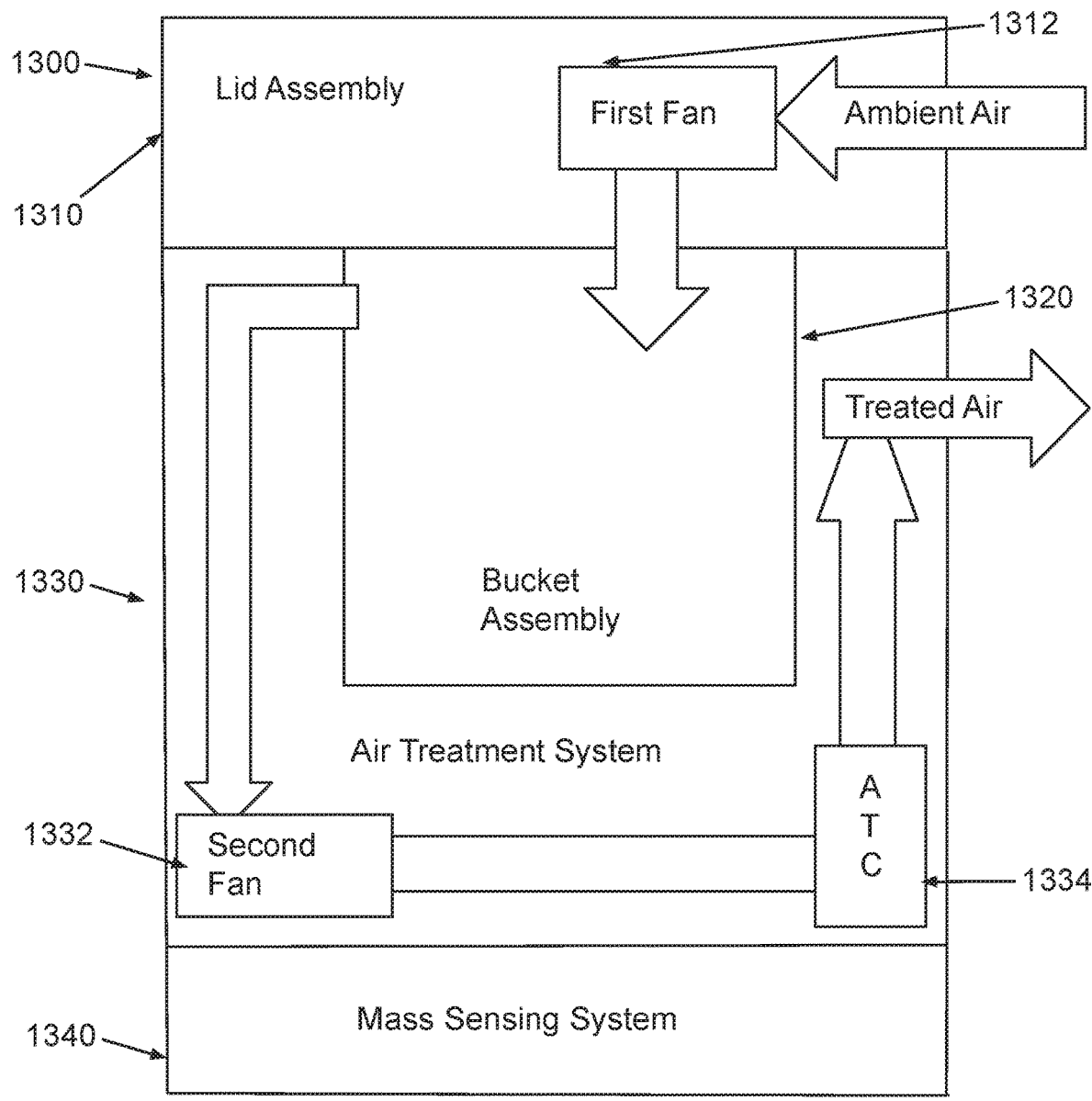
FIG. 13 shows a simplified illustrative block diagram of an OMPA and airflow paths according to an embodiment.

FIG. 13 shows a simplified illustrative block diagram of OMPA 1300 and airflow paths according to an embodiment. OMPA 1300 can include lid assembly 1310, bucket assembly 1320, air treatment system 1330, and mass sensor system 1340. Lid assembly 1310 may be akin to lid 204 of FIG. 2, embodiments discussed below, and FIGS. 16A-26 discussed in U.S. Provisional Application No. 63/392,339, filed Jul. 26, 2022, entitled "Lid Assembly, Air Treatment System, and Airflow control system for an Organic Matter Processing Apparatus and Method for the use thereof," hereinafter referred to as the "'339 application," the disclosure of which is incorporated by reference in its entirety. Bucket assembly 1320 may be akin to processing chambers of FIGS. 5-7 and the bucket of FIG. 8 and embodiments disclosed in U.S. Provisional Application No. 63/313,946, filed Feb. 25, 2022, the disclosure of which is incorporated by reference in its entirety. Air treatment system 1330 may be akin to the air treatment system discussed above in connection with FIGS. 3A, 3B, 4A, and 4B, embodiments discussed in detail below, and FIGS. 27A-32 of the '339 application.

OMPA 1300 has a length corresponding to an X axis, a width corresponding to a Z axis, and a height corresponding to a Y axis.

Lid assembly 1310 can open and close a movable lid. The movable lid can be opened in response to a user command (e.g., pressing of a pedal at the bottom of OMPA 1300) to enable the user to deposit OMPA input into bucket assembly 1320 or to remove bucket assembly 1320. When the movable lid is closed, OMPA 1300 may engage OMPA input processing. Lid assembly 1310 may be responsible for controlling a first airflow path in which ambient air is pulled into lid assembly 1310 by first fan 1312 and directed into bucket assembly 1320. The first air flow path forces air into bucket assembly 1320 to assist bucket assembly 1320 in the desiccation of any OMPA input that is being processed by bucket assembly 1320. Bucket assembly 1320 is operative to cut and grind and heat OMPA input to convert it to OMPA output. Lid assembly 1310 may optionally preheat the ambient air using a heater (not shown) prior to directing the air into bucket assembly 1320. The heated air may further assist bucket assembly 1320 with processing OMPA input to produce OMPA output. Heating the ambient air also reduces the moisture content of the air being injecting into bucket assembly 1320 and the moisture of the air being treated by air treatment system 1330. Reducing the moisture content of the air circulating in the OMPA can improve efficiency of OMPA input processing and air treatment.

Air treatment system 1330 may be responsible for controlling a second airflow path in which untreated air is drawn from bucket assembly 1320 by second fan 1332 and directed through air treatment chamber 1334, which converts the untreated air to treated air that is exhausted away from OMPA 1300. As defined herein, untreated air refers to air that has been in the vicinity of bucket assembly 1320 and has potentially been imparted with particles or compounds that have odorous qualities. As defined herein, treated air refers to air that been "scrubbed" or "cleaned" of particles or compounds that have odorous qualities. Air treatment chamber (ATS) 1334 can one or more of an activated carbon chamber and an ultraviolet light chamber. Air treatment system 1330 may heat the untreated air using a heater (not shown) to reduce moisture content of the untreated air before it the air is pushed through an activated carbon filter (not shown). The activated carbon filter can extract odor causing molecules from the air as it passes through the filter such that treated air is exhausted out of OMPA 1300.

When lid assembly 1310 is in a closed configuration and OMPA 1300 is managing operations that require use of first fan 1312 and second fan 1332, OMPA 1300 may ensure that a negative pressure differential is maintained between inlet air and exhausted air. This negative pressure differential can be achieved by operating second fan 1332 at a higher airflow rate (e.g., higher cubic feet per minute (CFM)) than first fan 1312. In other words, the airflow rate (or volume) of treated air exiting out of OMPA 1300 is greater than the airflow rate (or volume) of ambient air being pulled into OMPA 1300. This can ensure that air treatment system 1330 controls the flow of air from bucket assembly 1320 to the exhaust port and prevents any untreated air from prematurely exiting OMPA 1300.

Mass sensing system 1340 may be responsible for obtaining mass measurements of the OMPA. Mass measurements can be made throughout an organic matter processing cycle or anytime the bucket is present within the OMPA. The mass sensing system may include one or more mass sensors such as, for example, piezoelectric mass sensors. Alternatively, the mass sensing system may include a strain gauge mass sensor. One or more mass sensors are normally located along the bottom of the OMPA (e.g., on each "foot" where the OMPA terminates along a substantially planar level). These mass sensor(s) can be used to measure the weight of the OMPA (and thus, the weight of contents of the processing chamber). The mass sensor(s) included in the OMPA may continually or periodically output measurements that can be used to calculate, infer, or otherwise establish the total weight of the bucket (including any OMPA input stored therein). These measurements can be communicated to a controller (e.g., controller 110 of FIG. 1). The controller may determine how to control other components of the OMPA (e.g., its drying and grinding mechanisms) based on these measurements. For example, the controller may determine how long to perform high intensity processing based on the rate at which the weight lessens due to loss of moisture. Mass sensing may play a key role in ensuring that the OMPA can dynamically react to changes in the state of the OMPA input. Additional details of how mass or weight measurements are used, collected, and communicated by the OMPA are discussed in more detail below.

Figure 14:
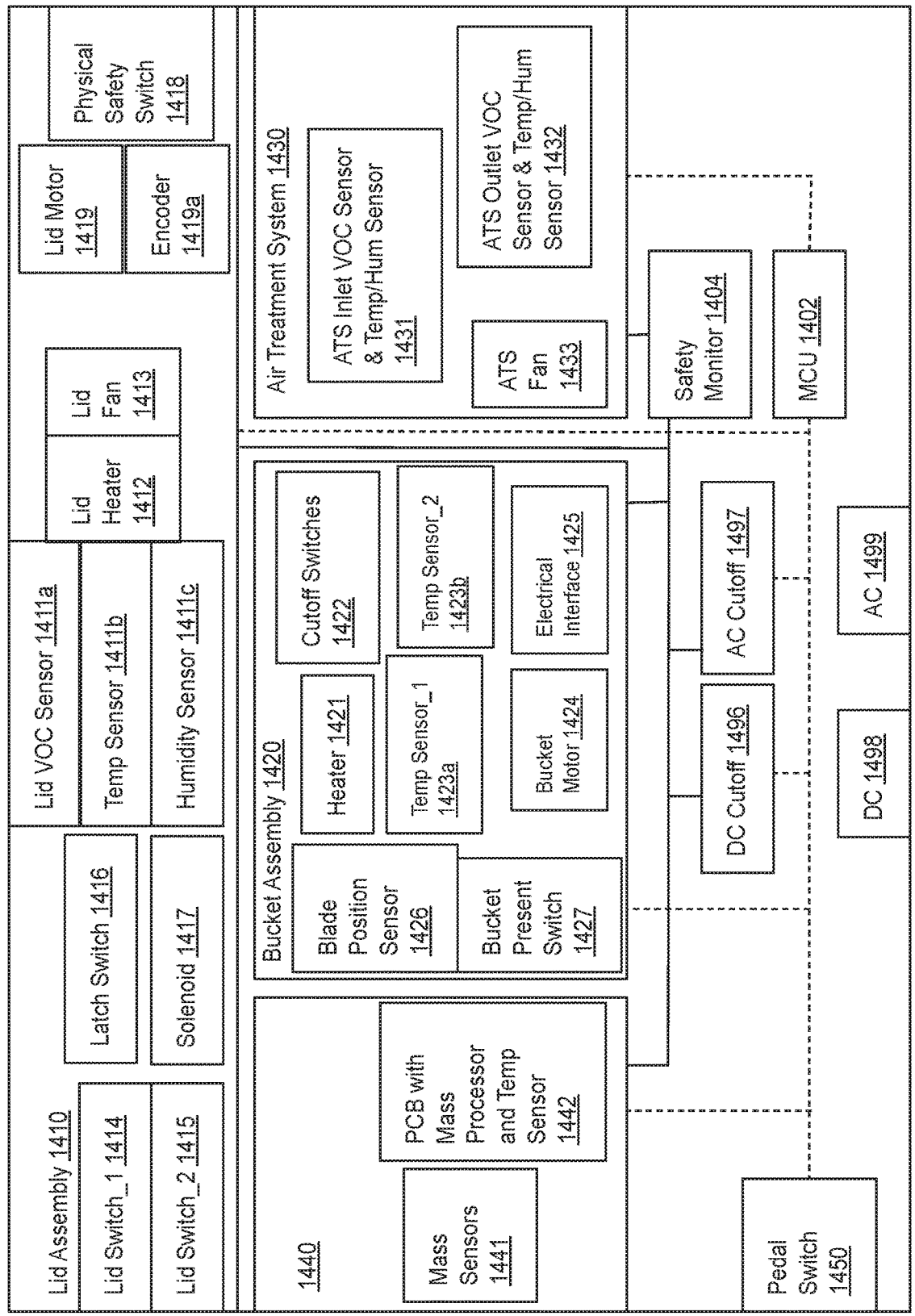
FIG. 14 shows an illustrative block diagram showing sensors and components of an OMPA according to an embodiment.

FIG. 14 shows an illustrative block diagram showing sensors and components of OMPA 1400. The sensors are operative to provide sensor based data to a processor such as, for example, master control unit (MCU) 1402 or safety monitor 1404. The components can be classified according to two different data types: feedback data and control data. Components (e.g., switches) may be dedicated specifically to only providing feedback data (e.g., switch is either ON or OFF). Other components can provide both feedback to a processor and be controlled by a processor. For example, the bucket motor may be controlled by a processor (e.g., MCU 1402). The inputs provided by the processor to the motor may be used as control data. In addition, during operation of the bucket motor, the electrical characteristics (e.g., current consumption, torque load, etc.) of the bucket motor can be used as feedback data. Yet other components may be dedicated specifically to only being controlled and are not able to provide feedback data. The sensors and components are strategically placed within OMPA 1400 to reliably procure feedback data and control data for use in various operational embodiments discussed herein. The sensors and components are discussed in conjunction with FIGS. 15A-15C, which shows a table identifying the component or sensor, its function, and its associated data.

Lid assembly 1410 can include lid VOC sensor 1411a, lid temperature sensor 1411b, lid humidity sensor 1411c, lid heater 1412, lid fan 1413, lid switch_1 1414, lid switch_2 1415, latch switch 1416, solenoid 1417, physical safety switch 1418, and lid motor with encoder 1419a. In some embodiments, volatile organic compound (VOC) sensor 1411a may be a standalone sensor that resides on shared circuit board with lid temperature sensor 1411b and humidity sensor 1411c. VOC sensor 1411a may be selected to monitor a subset of potential VOCs. In a further embodiment, lid temperature sensor 1411b and humidity sensor 1411c can be integrated into a single sensor that monitors both temperature and humidity. The monitored humidity can be absolute humidity or relative humidity. VOC sensor 1411a, temperature sensor 1411b, and humidity sensor 1411c may positioned with lid assembly 1410 to monitor air characteristics of the optionally heated ambient air being forced into bucket assembly 1420. For example, sensors 1411a-1411c may be positioned next to an access port of a manifold that directs the optionally heated ambient air into bucket assembly 1420. See FIG. 21 of the '339 application, which show an access port in a manifold where sensors 1411a-1411c can monitor air characteristics.

Lid heater 1412 and lid fan 1413 may operate under the control of MCU 1402 and provide electrical characteristics feedback to MCU 1402 and/or safety monitor 1404

Lid switch_1 1414 may be a mechanical switch that detects whether the lid is closed. Switch 1414 may be tactile switch that is depressed when a movable portion of the lid is fully closed. In one embodiment, switch 1414 may be depressed when a latch interfaces with switch 1414 when the lid is closed. See, for example, FIG. 16A of the '339 application. Lid switch_2 1415 may be hall effect switch that electrically detects whether the lid is closed. In one embodiment, a magnet may be included in the latch or other portion of the movable lid and the hall effect switch can detect the presence of the magnet when the lid is closed. See, for example, FIG. 16C of the '339 application. In some embodiments, OMPA 1400 may include only one of switch 1414 and switch 1415 because switches 1414 and 1415 are redundant.

Latch switch 1416 may be a mechanical switch that detects whether a latch sliding block, which is designed to interface with the latch, has successfully locked the lid. Solenoid 1417 may be operative to move the latch sliding block along a track depending on whether the MCU instructs the solenoid 1417 to lock the latch of the lid. When the latch sliding block is positioned in the locked position, the latch sliding block can depress latch switch 1416, confirming that the latch is locked. See FIG. 16A of the '339 application for example embodiment of the latch switch, solenoid, and latch sliding block.

In one embodiment, physical safety switch 1418 may be a mechanical switch that detects whether the lid is closed. Switch 1418 may be mounted on the rear of OMPA 1400 and is operative to interface with an actuation arm that causes the lid to open and close. Switch 1418 may be activated when the lid is closed and deactivated when the lid is open. In another embodiment, physical safety switch can be an electromechanical switch such as, for example, a reed switch that can placed near the top of the bucket assembly (e.g., next to the air treatment system inlet port). A reed switch can detect a magnet secured in the lid when the lid is closed. For example, the presence of the magnet can cause the reed switch to close and open when the magnet is no longer next to the switch. In one embodiment, physical safety switch 1418 can activate/disable AC cutoff 1497 and DC cutoff 1496 independently of safety monitor 1402 and MCU 1402. Incorporating physical safety switch 1418 adds yet another layer of safety to the OMPA that does not need to rely on the safety monitor or the MCU.

Lid motor 1419 is a component that can operate under the control of MCU 1402. The motor can provide electrical characteristics feedback to MCU 1402 and/or safety monitor 1403. Encoder 1419a can also provide feedback data to MCU 1402. Encoder 1419a can indicate the position of the lid.

It should be noted that the components and sensors that are associated with lid assembly 1410 are merely illustrative and that some components or sensors may be omitted. For example, in an embodiment where a motor is not used to open or close the lid, but a mechanical linkage actuation system is used to open and close the lid, lid motor 1419 and encoder 1419a can be omitted. In this embodiment, physical safety switch 1418 can be repurposed to detect operation of the mechanical actuation system to provide feedback as to whether the lid is open.

Bucket assembly 1420 can include heater 1421, cutoff switches 1422, temperature sensor_1 1423a, temperature sensor_2 1423b, bucket motor 1424, electrical interface 1425, position sensor 1426, and bucket present switch 1427. Heater 1421 may be a component that is controlled by MCU 1402 to impart heat into a bucket being used to process OMPA input. Electrical characteristics of heater 1421 may be provided to MCU 1402, safety monitor 1404, or both. Cutoff switches 1422 may be integrally formed within heater 1421 and are operative to open the heater circuitry to prevent thermal runaway. If cutoff switches 1422 are opened, the electrical characteristics of heater 1421 (e.g., the open circuit) can be provided as feedback data. Temperature Sensor_1 1423a and temperature sensor_2 1423b may be components that provide temperature feedback data. Two temperature sensors provide redundant heater 1421 monitoring.

Bucket motor 1424 may be a component that operation under the control of MCU 1402 to drive a cut and paddle assembly (not shown) to grind and cut OMPA input contained in the bucket. Bucket motor 1424 may be powered by DC source 1498. Electrical characteristics of bucket motor 1424 may be provided as feedback data. For example, the current draw, torque output, and speed of bucket motor 1424 may be provided as feedback data. Electrical interface 1425 may be provide a conduit through which power and signals are routed. For example, AC power supplied by AC source 1499 may be provided heater 1421. Signals provided by sensors 1423a and 1423b may be provided to MCU 1402 or safety monitor 1404. In some embodiments, electrical interface 1425 may include a switch or sensor that can detect whether the bucket is inserted or removed. Such a switch or sensor can be used as feedback data.

Blade position sensor 1426 may provide feedback indicating the position of the cut and paddle assembly (not shown) within the bucket. In some embodiments, position sensor 1426 can be implemented using a magnet and Hall Effect sensor. The magnet may be mounted to or within a gear that turns in conjunction with the cut and paddle assembly. When the magnet passes by the Hall Effect sensor, this can trigger a response indicative of cut and paddle assembly's orientation within the bucket. In another embodiment, position sensor may be embodied as an encoder that monitors the position of bucket motor 1424. Based on the encoder information, the position of the cut and paddle assembly can be inferred.

Bucket present switch 1427 can provide feedback indicating whether the bucket is present. The bucket can be removed from and inserted into the OMPA. Switch 1427 can confirm the bucket status: present or not present. In some embodiments, bucket present switch 1427 can be omitted and bucket detection can be determined by examining an electrical characteristic of electrical interface 1425. For example, a thermistor may exist within electrical interface 1425. The thermistor can provide information that identifies whether the bucket is present.

It should be noted that the components and sensors that are associated with bucket assembly 1420 are merely illustrative and that some components or sensors may be omitted, new components or sensors may be added, or the positioning of one or more sensor or components can be rearranged with the OMPA. For example, in one embodiment, the bucket can be relatively simple device devoid of a heater and associated temperature sensors. In this embodiment, the heater and temperature sensors be positioned adjacent to the bucket when the bucket is inserted into the OMPA.

Air treatment system 1430 can include ATS inlet VOC sensor and temperature/humidity sensor 1431, ATS outlet VOC sensor and temperature/humidity sensor 1432, and ATS fan 1433. Sensors 1431 and 1432 can perform the same function as sensors 1411a-1411c as discussed above. Sensor 1431 may be positioned to monitor characteristics of air entering the air treatment system. For example, sensor 1431 may be positioned at an inlet port the enables untreated air emanating from the bucket to enter the air treatment system. Sensor 1432 may be positioned to monitor characteristics of air exiting the air treatment system. For example, sensor 1432 may be positioned downstream from an air treatment chamber (e.g., an activated carbon media chamber). Sensors 1431 and 1432 can provide feedback data on VOCs, temperature, and humidity of monitored air.

It should be noted that the components and sensors that are associated with air treatment system 1430 are merely illustrative and that some components or sensors may be omitted, added, or repositioned within the OMPA.

Mass sensing system 1440 can include mass sensors 1441 and printed circuit board (PCB) with processor and temperature sensor 1442. Mass sensors 1441 can provide mass measurement feedback. In one embodiment, the mass measurements can be provided to PCB with processor and temperature sensor 1442, which processes the mass measurements based on a temperature measured by the on board temperature sensor. The temperature corrected mass measurement can be provided as feedback data to MCU 1402 or safety monitor 1404. Additional details of mass sensing system 1440 are discussed below.

OMPA 1400 can include pedal sensor switch 1450 that operative to detect a user initiated event to open the lid. When the user depresses a pedal to initiate a lid open event, the depression of the pedal can trigger pedal sensor switch 1450, which provide feedback indicating that the user desires to open the lid. Pedal sensor switch 1450 can be used in an OMPA embodiment that uses a motor (e.g., motor 1419) to open and close the lid or in an OMPA embodiment that uses a mechanical linkage actuation system (sans motor) to open and close the lid.

OMPA 1400 can include DC cutoff 1496 and AC cutoff 1497. DC cutoff 1496 and AC cutoff 1497 may be controlled by MCU 1402, safety monitor 1404, or both. DC cutoff 1496 can be operative to disconnect DC source 1498 from received by various DC supplied components within OMPA 1400. For example, when DC source cutoff 1496 is activated, DC power may be cut from supplying bucket motor 1424 and any other DC powered component (e.g., fan 1413 or fan 1433). AC cutoff 1497 can be operative to disconnect AC source 1499 from being received by various AC supplied components within OMPA 1400. For example, AC power to heater 1421 and heater 1412 may be cutoff when AC cutoff 1497 is activated.

MCU 1402 may be a firmware controller designed to control the OMPA and provide safety features. MCU 1402 is intended to be the primary controller of the OMPA and is capable of detecting safety concerns and handling them as appropriate. MCU 1402 may be responsible for controlling the OMPA input to OMPA output conversion process, controlling on-board displays, controlling wireless communications, monitoring component health, and all other general purpose functionality of the OMPA. Safety monitor 1404 serves as a hardware backup to MCU 1402 to ensure safe operation of the OMPA in the event MCU 1402 is not functioning properly or bypassed.

Safety monitor 1404 can be ROM based circuitry designed to provide hardware based safety functionality for the OMPA. Safety monitor 1404 may operate independently of MCU 1402 by operating in response to various safety monitor inputs. Safety monitor 1404 can operate as a hardware watchdog by requiring all threads to check in on a periodic basis. The threads may be associated with various sensors and components in the OMPA. If any thread fails, safety monitor 1404 may initiate a reboot of OMPA 1400.

Figure 16:
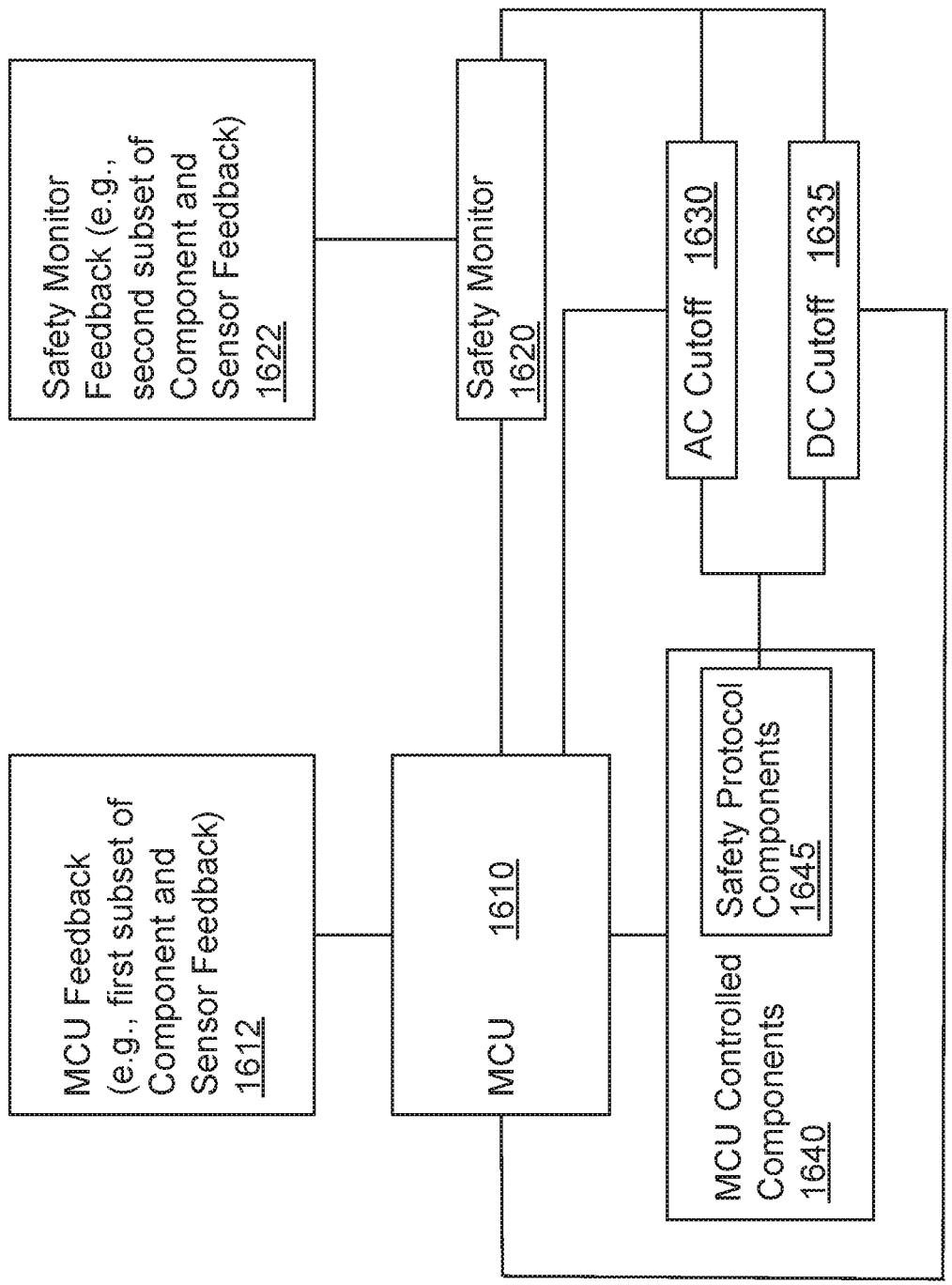
FIG. 16 shows an illustrative block diagram of a MCU and a safety monitor according to an embodiment.

FIG. 16 shows an illustrative block diagram of an MCU, a safety monitor, the inputs provided to the MCU and the safety monitor, and the components that are controlled by the MCU and the safety monitor according to an embodiment. MCU 1610 can receive MCU specified feedback data 1612 as inputs. MCU specified feedback data can include feedback data provided by a first subset of the sensors or components (as discussed in connection with FIGS. 14 and 15A-15C). MCU 1610 can control operation of various MCU controlled components, as shown in box 1640. Some of MCU controlled components 1640 may be designated as safety protocol components 1645. Safety protocol components 1645 may be turned off via signal control or such components may have their power supply cutoff by AC cutoff 1630 or DC cutoff 1635. Examples of safety components can include a bucket motor, a bucket heater, a lid fan, a lid heater, an ATS fan, or any other suitable component. Safety monitor 1620 can receive safety monitor specified feedback data 1622 as inputs. Safety monitor specified feedback data 1622 can include feedback data provided by a second subset of sensor or components. In one embodiment, the first and second subsets can be mutually exclusive in that there are no feedback data sources shared among MCU 1610 and safety monitor 1620. In another embodiment, first and second subsets can be configured such that one or more feedback data sources are shared among MCU 1610 and safety monitor 1620. Safety monitor 1620 can control operation of components that are jointly controlled by MCU 1610 and safety monitor 1620, as shown in box 1630. MCU 1610 and safety monitor 1620 can communicate with each other. For example, a "heart beat" signal may be exchanged between MCU 1610 and safety monitor 1620 to indicate that MCU 1610 and/or safety monitor 1620 are operating properly.

MCU 1610 and safety monitor 1620 can jointly control AC cutoff 1630 and DC cutoff 1635. For example, if MCU 1610 receives data in its MCU feedback 1612 that indicates a safety protocol should be enforced, MCU 1610 can instruct safety protocol components 1645 to stop operating via signal control and MCU 1610 can enable power cutoff to safety protocol components 1645 by engaging AC cutoff 1630 and DC cutoff 1635. If safety monitor 1620 receives data in its safety monitor 1622 that indicates a safety protocol should be enforced, safety monitor 1620 can enable power cutoff to safety protocol components 1645 by engaging AC cutoff 1630 and DC cutoff 1635.

FIG. 17A shows a table 1710 illustrating the first subset of feedback designated specifically to the safety monitor according to an embodiment. As shown, the safety monitor specified feedback can include a first lid switch for detecting whether the lid is closed (e.g., lid sensor 1414), a first temperature sensor for monitoring temperature of the bucket (e.g., temperature sensor_1 1423a), a bucket present switch for detecting whether the bucket is present (e.g., bucket present switch 1427), and backup switch for detecting whether the lid is closed (e.g., physical safety switch 1418). The four safety monitor inputs identified in table 1710 can enable the safety monitor to effectively monitor essential "checkpoints" for ensuring safe and optimal operation of the OMPA. Limiting the number of safety monitor inputs to just four inputs simplifies the logic and wiring interfacing requirements for the safety monitor, thereby ensuring that the safety monitor is configured in a robust and simple manner.

FIG. 17A also shows table 1720 illustrating the second subset of feedback designated specifically to the MCU according to an embodiment. Some of this feedback may be used for enforcing a safety protocol while other feedback may be used for executing operation of the OMPA. As shown, the MCU specified feedback can include a latch switch (e.g., latch switch 1416), a second lid switch (e.g., lid switch_2 1415), a second temperature sensor for monitoring temperature of the bucket (e.g., temperature sensor_2 1423b), the lid VOC sensor and temperature/humidity sensor (e.g., sensors 1411a-1411c), the ATS input VOC sensor and temperature/humidity sensor (e.g., 1431), the ATS output VOC sensor and temperature/humidity sensor (e.g., 1432), the pedal switch (e.g., switch 1450), the mass sensors (e.g., sensors 1441), temperature compensation processor (e.g., PCB 1442), the position sensor indicating the position of the cut and paddle assembly (e.g., 1426), the lid motor encoder (e.g., encoder 1419a), and the electrical characteristics of the bucket motor (e.g., motor 1424), the lid motor (e.g., motor 1419), electrical connection (e.g., interface 1425), lid fan (e.g., fan 1413), lid heater (e.g., heater 1412), and the ATS fan (e.g., fan 1433).

Figure 17B:
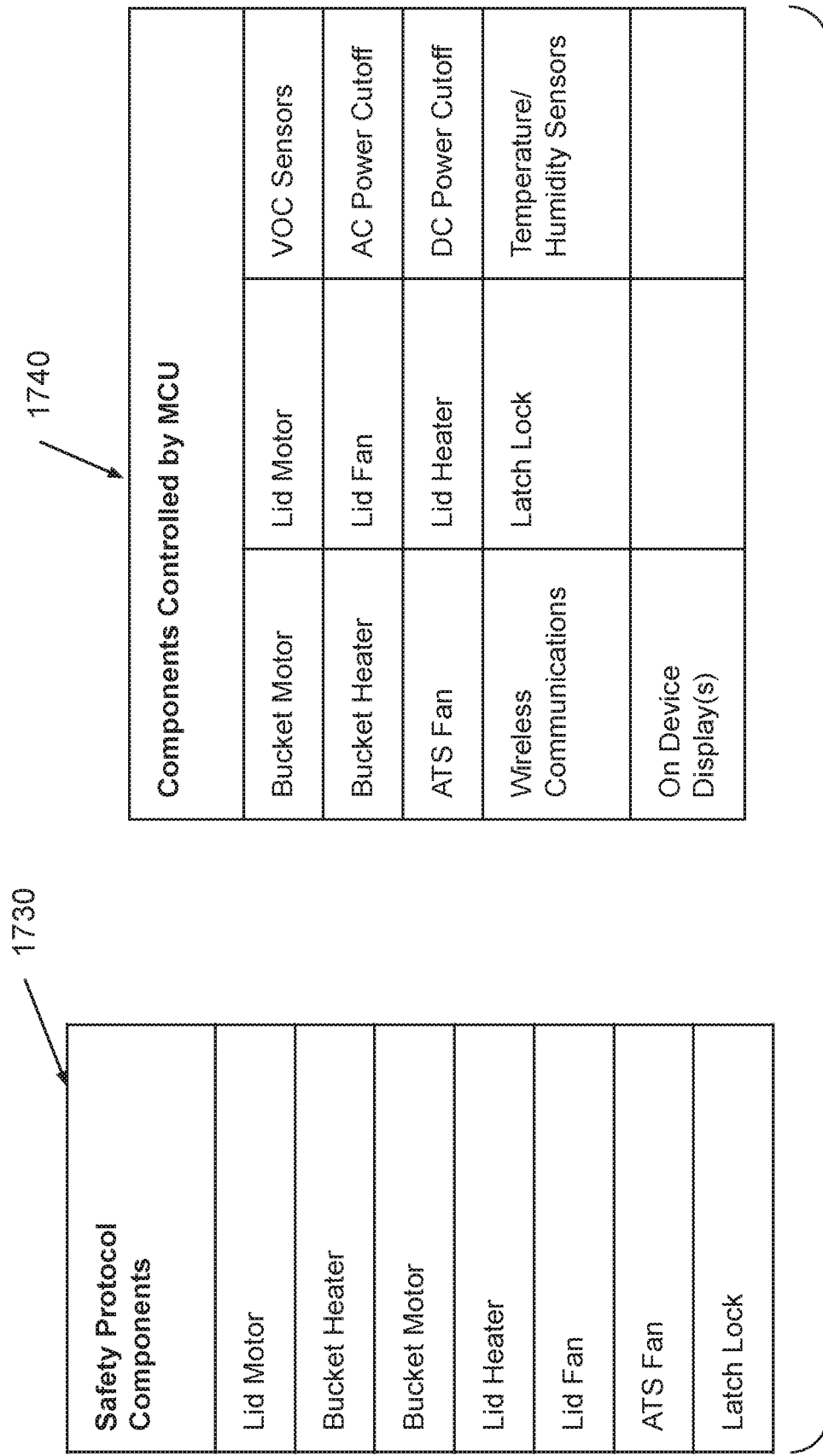
FIG. 17B shows tables illustrating which components can serve as safety protocol components and which components can be controlled by the MCU according to an embodiment.

FIG. 17B shows table 1730 illustrating which components can serve as safety protocol components. One or more of these components can be turned off or powered off during enforcement of a safety protocol. The safety protocol can be enforced by turning the components off (e.g., through use of control signals) or by cutting power to the components. These components can include an AC power cutoff (e.g., 1499), a DC power cutoff (e.g., 1498), the bucket heater for heating the bucket (e.g., 1421), the bucket motor for turning the cut and paddle assembly (e.g., bucket motor 1424), the lid motor for opening and closing the lid (e.g., lid motor 1419), the lid heater for heating ambient air being pushed into the bucket (e.g., lid heater 1412), the lid fan for drawing in ambient air from outside the OMPA (e.g., lid fan 1413), the air treatment fan for pulling in untreated air from the bucket (e.g., ATS fan 1433), and the latch lock (e.g., solenoid 1417 for locking the latch). In one embodiment, components such as the lid motor, lid heater, bucket heater, bucket motor, ATS fan, and latch lock may be deactivated with control signals. When the AC and DC power cutoffs are activated, then the power being supplied to those components may be cutoff, thereby ensuring that the components cannot be activated.

Table 1740 illustrates which components can be controlled by the MCU. These components can include, the bucket motor, the bucket heater, the lid motor, the lid fan, the lid heater, the latch lock, the ATS fan, wireless communications, on device display(s). The MCU may control these components to execute operations of the OMPA. When the MCU sends control signals to a particular component (e.g., the bucket motor) to perform an action (e.g., rotate in a first direction at a predetermined speed), the electrical characteristics of that component can be feedback to the MCU as input. This way, the MCU can monitor whether the component is operating as expected (e.g., continues to rotate in the first direction at the predetermined speed) or if there are conditions present that require a change in control signals (e.g., reverse direction of the motor) being provided to that component.

It should be understood the list of components in table 1740 is not exhaustive and that additional components may be controlled by the MCU. For example, the mass sensors may be controlled by the MCU.

Figure 18:
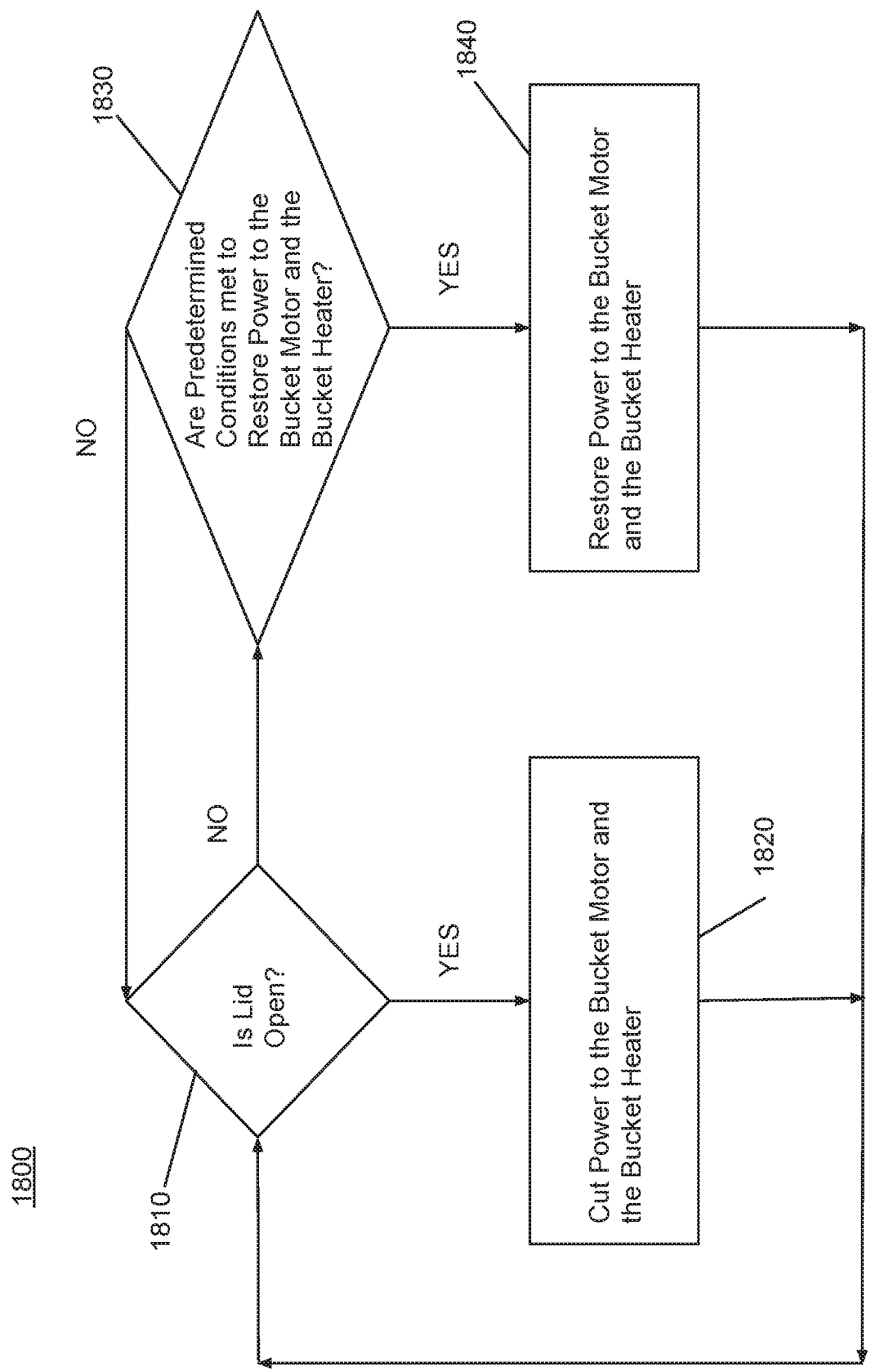
FIG. 18 shows a process for enforcing a safety protocol according to an embodiment.

FIG. 18 shows a process for enforcing a safety protocol according to an embodiment. Process 1800 can begin by determining whether the lid of the OMPA is open at step 1810. This determination can be made by the MCU, safety monitor, or both. The MCU is provided with MCU specified feedback data and the safety monitor is provided with safety monitor specified feedback data. If the MCU, in response to detecting a lid open event in the MCU specified feedback data, or if the safety monitor, in response to detecting a lid open event in the safety monitor specified feedback data, the MCU or the safety monitor can cut power to the bucket motor and bucket heater (and any other component as deemed necessary such as the lid fan, lid heater, and ATS fan), as indicated in step 1820. Cutting power to at least the bucket motor and the bucket heater ensures that the safety protocol is enabled whenever the lid is open. Process 1800 may revert back to step 1810 after power is cut.

If at step 1810, it is determined that the lid is closed, process 1800 may determine whether predetermined conditions are met before power can be restored to the bucket motor and the bucket heater (and any other components that may have had their power cut) at step 1830. The predetermined conditions can include verification of whether the bucket is present, whether all feedback data that provides lid closure data is in agreement, whether the latch is locked, and any other suitable criteria. If the determination at step 1830 is NO, process 1800 may revert back to step 1810. If the determination at step 1830 is YES, power may be restored to the bucket motor and the bucket heater (and any other components that may have had their power cut) at step 1840. Process 1800 may revert back to step 1810 after power is restored.

It should be understood that the steps shown in FIG. 18 are illustrative and the order of the steps may be changed, additional steps may be added, or steps may be omitted.

Figure 19A:
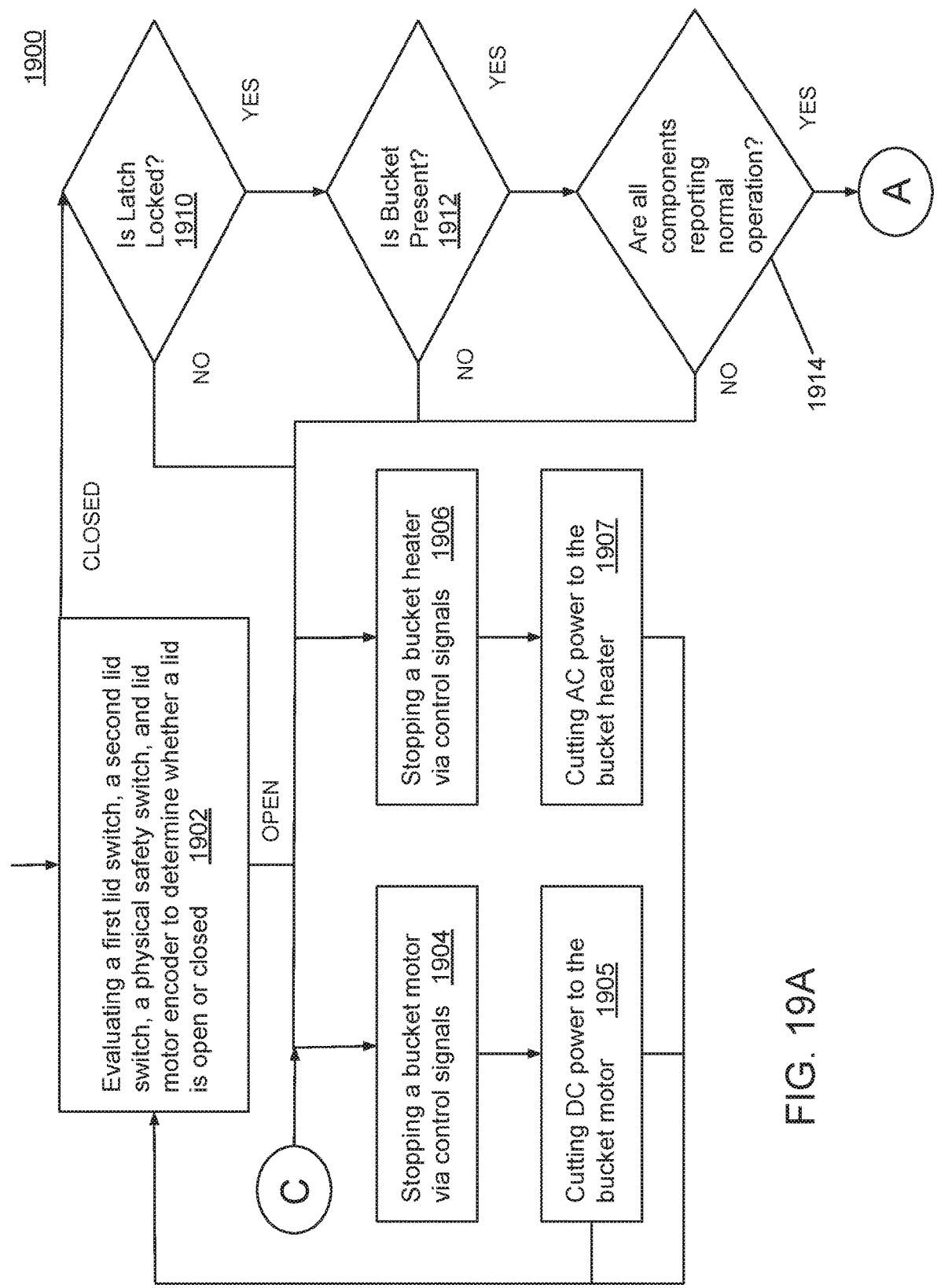
FIGS. 19A-19C show an illustrative process for enforcing a safety protocol in an OMPA according to an embodiment.
Figure 19B:
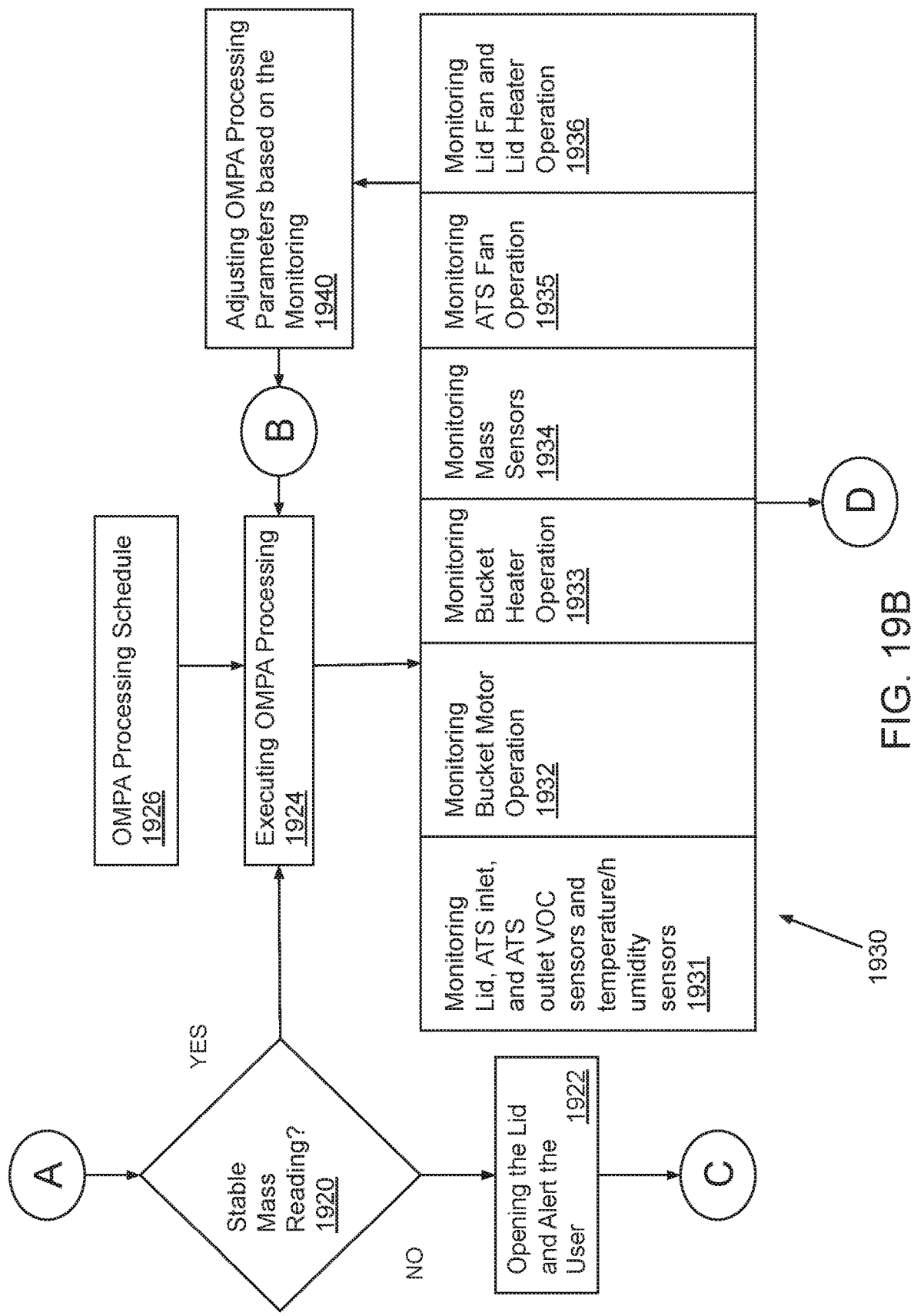
Figure 19C:
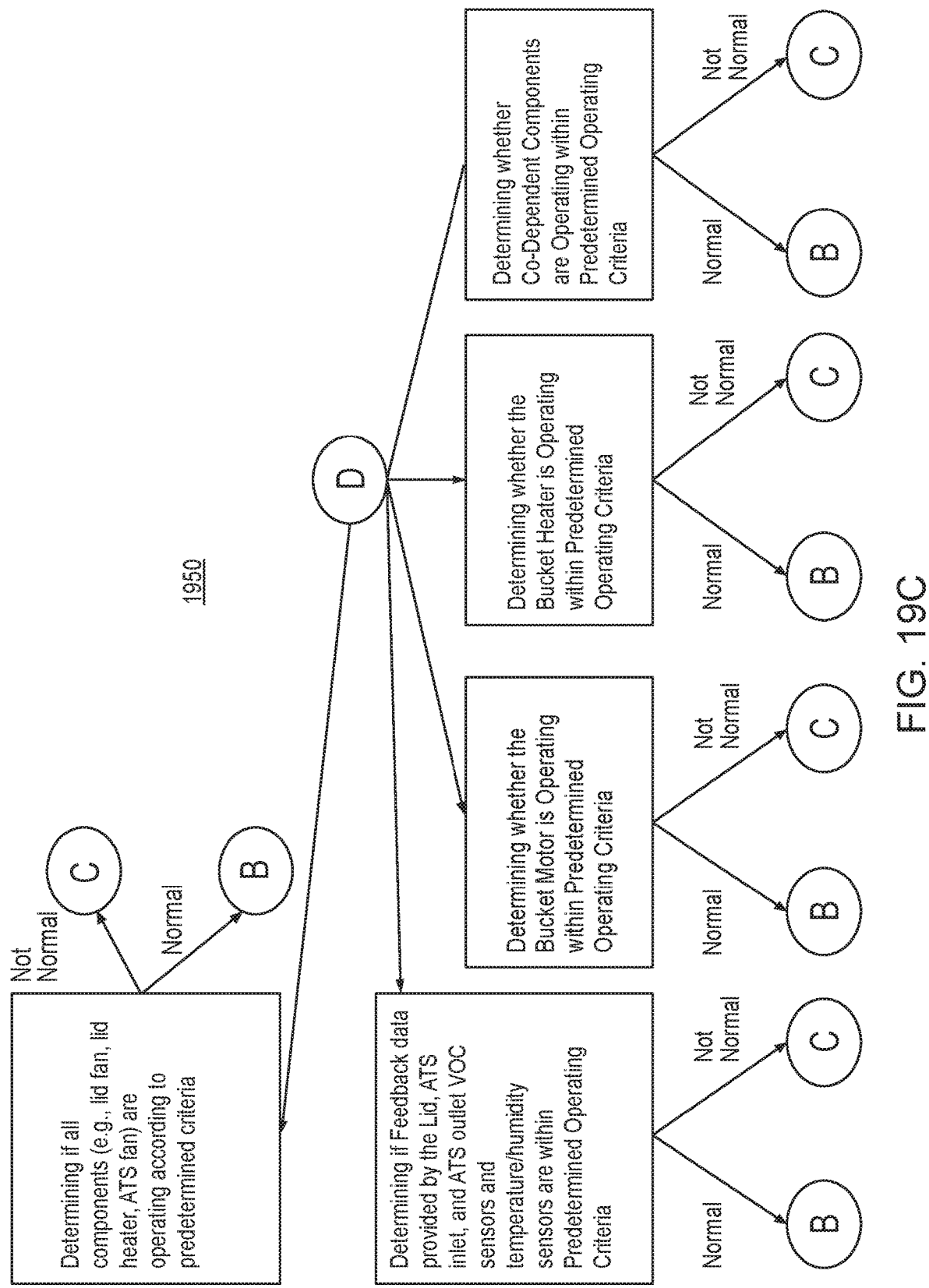

FIGS. 19A-19C show an illustrative process 1900 for enforcing a safety protocol in an OMPA according to an embodiment. Process 1900 may be implemented in an OMPA outfitted with sensors, components, a MCU, and a safety monitor such as that described above in connection with FIG. 14. Process 1900 may evaluate a first lid switch, a second lid switch, a physical safety switch, and lid motor encoder to determine whether a lid is open or closed, at indicated by step 1902. If, at any time, a determination is made that the lid is open, process 1900 proceeds to steps 1904 and 1906. At step 1904, a bucket motor can be stopped through use of control signals, and at step 1906, a bucket heater can be stopped with control signals. Thus, if either the bucket motor or bucket heater was in operation at the time of the lid open event, control signals stopping its operation are provided to stop its operation. In addition to stopping operation of the bucket motor and the bucket heater via control signals, DC power is cut from being supplied to the bucket motor (at step 1905) and AC power is cut from being supplied to the bucket heater (at step 1907). In some embodiments, power (regardless of whether the power is AC or DC) can be cut to the bucket motor, the bucket heater, and any other components selected for being cutoff from a power source when the lid is determined to be open.

If the lid is closed, process 1900 can determine if the latch is locked at step 1910. If the latch is not locked, process 1900 returns to steps 1904-1907. If latch is determined to be locked, process 1900 may determine if the bucket is present at step 1912. If the bucket is not present, process 1900 returns to steps 1904-1907. If the bucket is determined to be present, process 1900 may determine whether all components are reporting in as operating normally at step 1914. For example, the report in can be part of a thread assessment implemented by the safety monitor. If there is an issue with one or more components, process 1900 returns to steps 1904-1907, otherwise process 1900 can proceed to step 1920 (as shown in FIG. 19B).

At step 1920, a determination is made as to whether mass readings are stable. Stable, unchanging, mass readings may be required to confirm that the OMPA input is suitable for OMPA processing and that the OMPA is positioned on a stable surface. If the mass readings are not stable, the lid may be opened and the user may be alerted at step 1922, and then process 1900 returns to steps 1904-1907. If mass readings are stable at step 1920, process 1900 may execute OMPA processing at step 1924. OMPA processing may operate according to an OMPA processing schedule provided by step 1926.

While OMPA processing is being executed, the monitoring of sensors and components can be performed in step 1930. In particular, lid, ATS inlet, and ATS outlet VOC sensors and temperature/humidity sensors can be monitored at step 1931. The bucket motor operation can be monitored at step 1932. The bucket heater operation can be monitored at step 1933. The mass sensors can be monitored at step 1934. The ATS fan operation can be monitored at step 1935. The lid fan and lid heater operation can be monitored at step 1936. The monitoring can be performed in real-time so that a safety protocol can be enforced (in step 1950 of FIG. 19C) and so that the OMPA processing parameters can be adjusted based on the monitoring, at step 1940. The OMPA processing parameters can follow a recipe or a OMPA processing cycle to convert OMPA input to OMPA output the data acquired during the monitoring steps 1930-1936 can be used as inputs for controlling and monitoring the conversion process.

Step 1950 can represent enforcement of a safety protocol while the OMPA is operating (e.g., executing OMPA processing) by monitoring various specific feedback data and components to ensure their compliance with predetermined operating criteria. If the feedback and components are operating within the predetermined operating criteria, process 1900 can proceed back to step 1924. If, however, any of the feedback or components are not operating with the predetermined operating criteria, process 1900 may revert back to steps 1904-1907.

Step 1950 can be sub-divided into steps 1951-1955, as shown in FIG. 19C. Step 1951 may determine whether the bucket motor is operating within predetermined operating criteria. For example, predetermined operating criteria for the bucket motor can include a maximum current draw for a specified period of time, a maximum torque load for a specified period of time, and an unjamming procedure (e.g., used to re-mobilize the cut and paddle assembly if OMPA matters includes a substance that does not facture cut in a first instance). Step 1952 may determine whether the bucket heater is operating within predetermined operating criteria. For example, the bucket heater may operate with in a fixed temperature range. If the heater falls below that range or exceeds it while in steady state operation, then process 1900 may return to steps 1904-1907.

Step 1953 may determine if feedback data provided by the lid, ATS inlet, and ATS outlet VOC sensors and temperature/humidity sensors are within predetermined operating criteria. For example, if a VOC sensor detects a noxious or flammable gas, the OMPA may be shut down via steps 1904-1907 and the user may be informed. As another example, if a humidity sensor detects a high level of humidity for a prolonged period of time, such data may infer that excessive liquid has been deposited into the OMPA and that the OMPA should be shut down via steps 1904-1907 and the user is informed of the issue.

Step 1954 may determine if all other components (e.g., lid fan, lid heater, ATS fan) are operating according to predetermined criteria. For example, if the ATS fan is unable to move a minimum volume of air for a unit of time, this may indicate that there is an issue with the ATS fan or that there an air leak within the ATS. Such an ATS fan issue may trigger shutdown of the OMPA, alert, or both.

Figure 20:
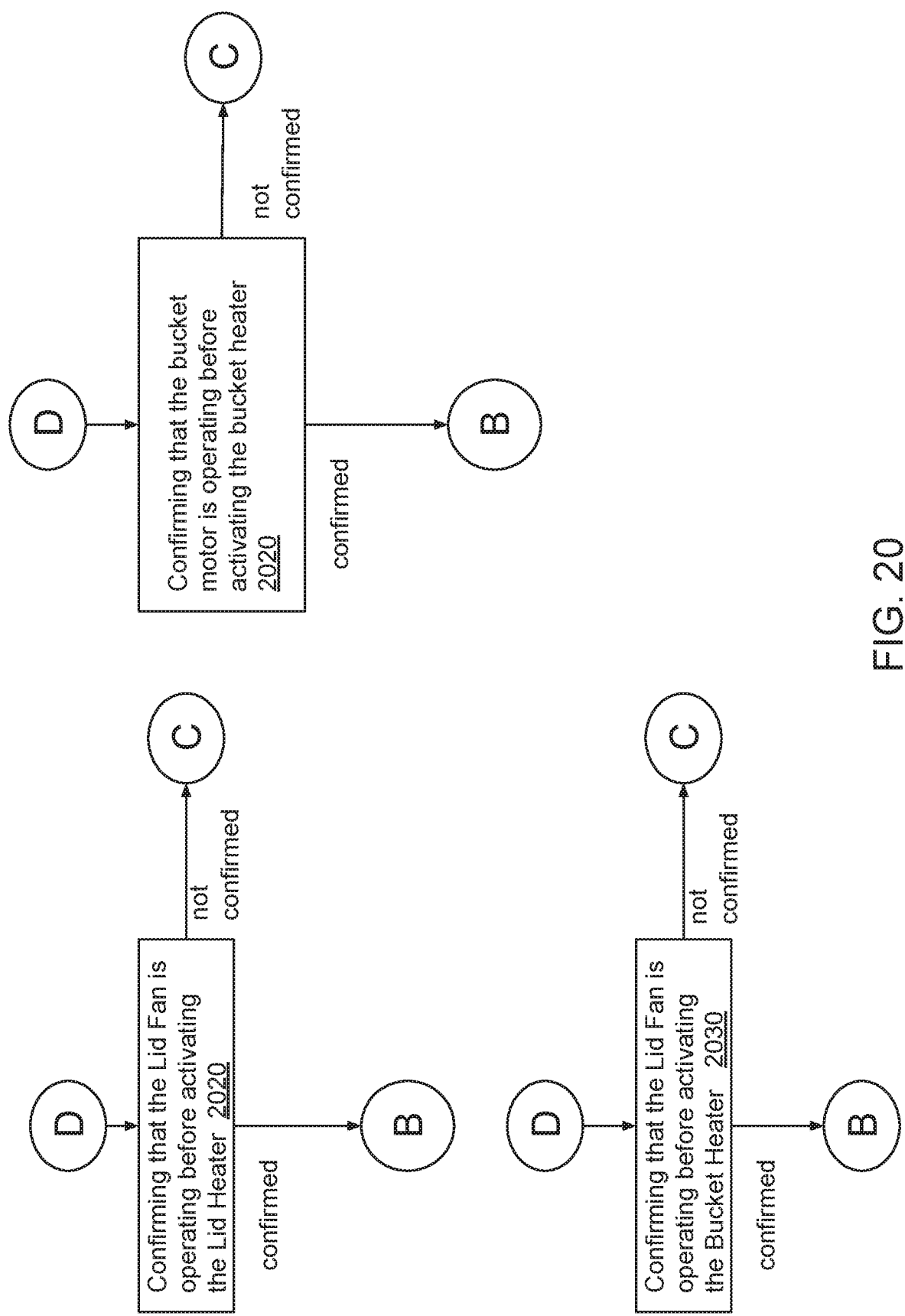
FIG. 20 shows several co-dependent component relationships that may be evaluated as part of a step in FIG. 19C according to an embodiment.

Step 1955 may determine whether co-dependent components are operating with predetermined operating conditions. Co-dependent component operation refers to a requirement that two or more components be operating together to ensure safe operation of the OMPA. FIG. 20 shows several co-dependent component relationships that may be evaluated as part of step 1955. Step 2010 may confirm that the lid fan is operating before activating the lid heater. Step 2020 can confirm that the bucket motor is running before activating the bucket heater. For example, the OMPA may be permitted to cut and grind OMPA matter for a fixed period of time while bucket is not being actively heated by the bucket heater, but the bucket heater is not permitted to run when the cut and paddle assembly is stationary. Step 2030 can confirm that the lid fan is operating before activating the bucket heater. This requirement may be enforced to ensure that bucket does not get too hot during operations. For all steps that are confirmed the process can revert to step 1924, and for steps that are not confirmed, the process may be revert to steps 1904-1907.

Figure 21:
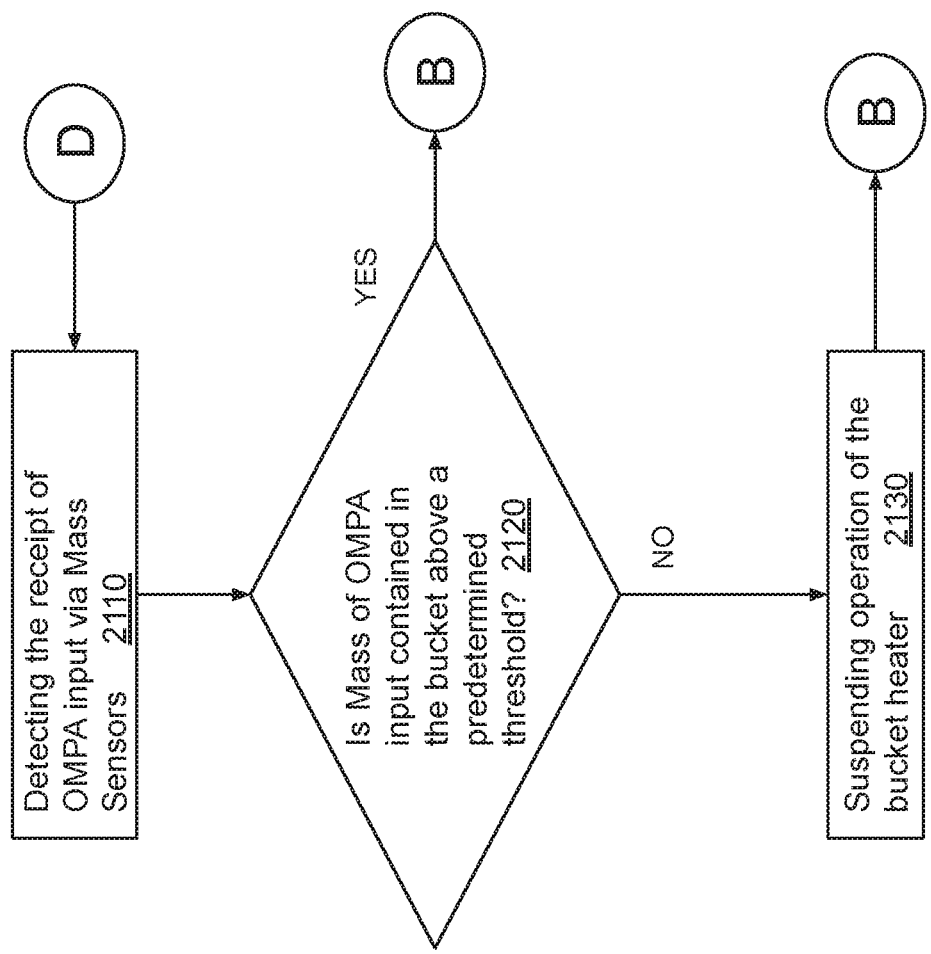
FIG. 21 shows a sequence of steps that may be executed following a step in FIG. 19B according to an embodiment.

FIG. 21 shows a sequence of steps that may be executed following step 1930 of FIG. 19B according to an embodiment. In step 2110, the receipt of OMPA input can be detected via the mass sensors. At step 2120, a determination can be made as to whether the mass of the OMPA input contained in the bucket is above a predetermined threshold. For example, if the user adds only a modest quantity of food scrap (e.g., a crust of bread), as measured by the mass sensors before and after the lid has been opened and closed, then it may be preferable not to fully activate OMPA processing. For example, the OMPA input may be cut, but the operation of the bucket heater may be suspended (as shown in step 2130) if the weight is below the predetermined threshold. This way, the OMPA is prevented from inadvertently charring the OMPA input by prematurely activating the bucket heater. If the determination in step 2120 is YES, the process can proceed to step 1924. After step 2130, the process can proceed to step 1924.

It should be understood that the steps shown in FIGS. 19A-19C, 20, and 21 are illustrative and the order of the steps may be changed, additional steps may be added, or steps may be omitted.

Figure 22:
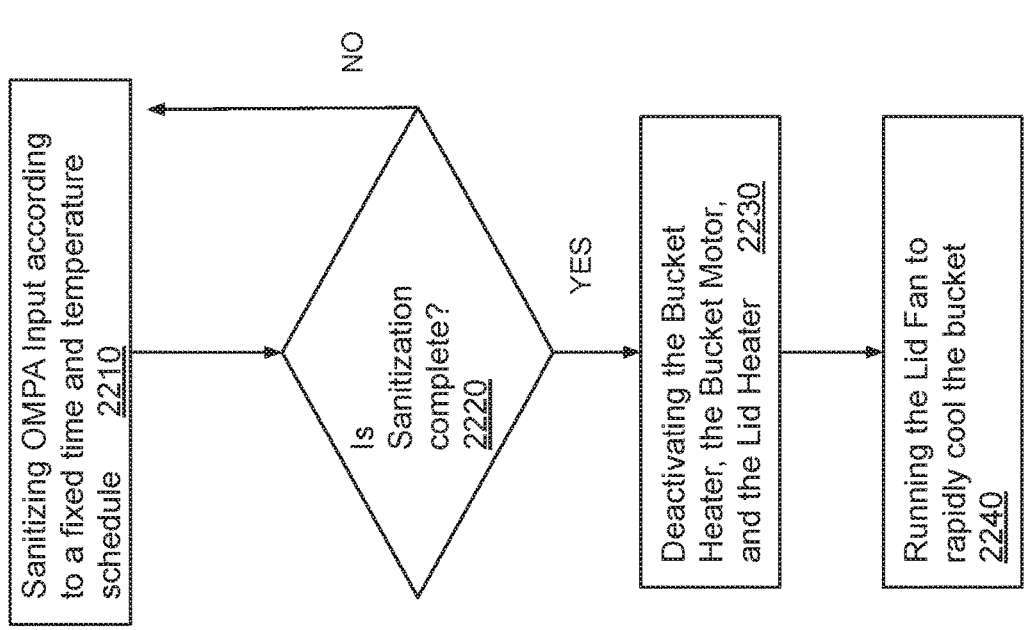
FIG. 22 shows an illustrative process for controlling heat of the bucket according to an embodiment.

FIG. 22 shows an illustrative process 2200 for controlling heat of the bucket according to an embodiment. At step 2210, the OMPA input is sanitized according to a fixed time and temperature schedule. The sanitizing process ensures any bacteria in the OMPA bucket and OMPA output is destroyed. This process requires that the bucket and contents therein be subjected to relatively high heat. The lid fan, lid heater, bucket motor, and bucket heater may be active in sanitizing. As a result, the bucket can reach temperatures that may be considered too hot to handle or touch. The latch may remain locked during the sanitization process to encourage the user not to open the lid. At step 2220, if sanitization is complete, process 2200 proceeds to step 2230 or reverts to step 2210. At step 2230, the bucket heater, the bucket motor, and the lid heater are deactivated, but the lid fan continues to run so that the bucket is cooled a relatively rapid pace. Rapid cooling may be desirable so that the user can gain access to the bucket as quick as possible and to reduce the temperature of the bucket for safe handling.

It should be understood that the steps shown in FIG. 22 are illustrative and the order of the steps may be changed, additional steps may be added, or steps may be omitted.

Figure 23:
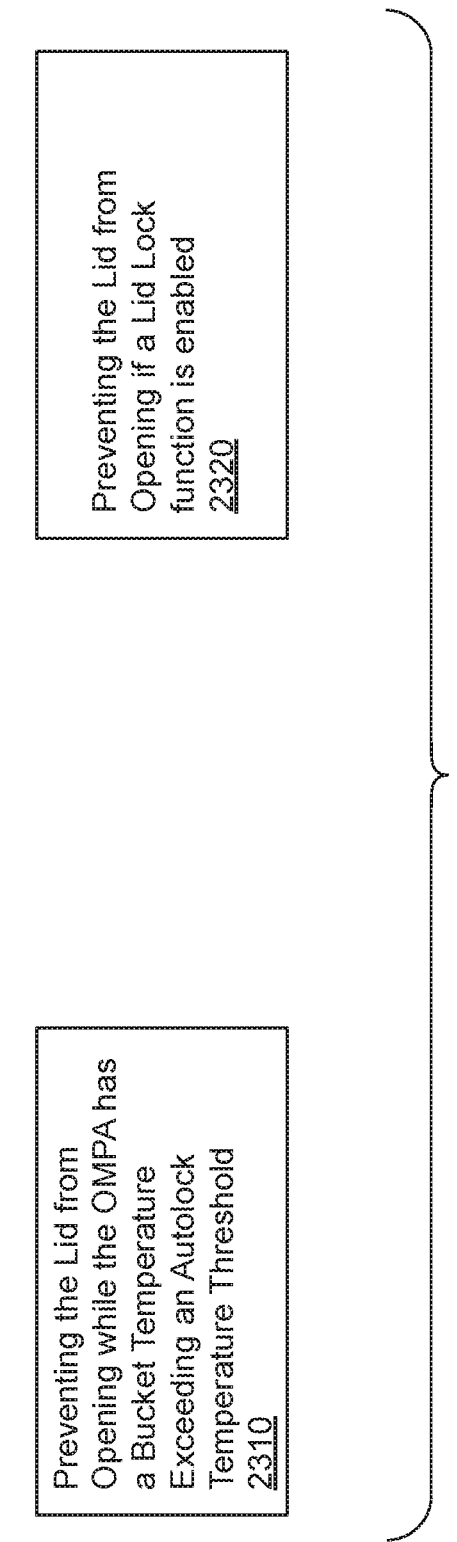
FIG. 23 shows examples of lid closure enforcement according to an embodiment.

FIG. 23 shows examples of lid closure enforcement according to an embodiment. Step 2310 can prevent the lid from opening while the OMPA has a bucket temperature that exceeds an autolock temperature threshold. For example, the bucket can be heated to relatively high temperatures (e.g., such as 160 degrees F. or temperatures that are too hot for safe handling). When the temperature of the bucket is above the autolock temperature threshold, the OMPA may keep the lid lock by controlling the latch lock solenoid. In addition, the OMPA may use the lid motor to make it difficult for the user to manually override the latch lock. In this approach, the OMPA may sense that the user is attempting to open the lid by observing the encoder, which can indicate that the lid is rotating upwards. In response to this determination, the motor can then activate to rotate the lid back down.

In step 2320, the lid can be prevented from being opened if a lid lock function has been enabled. The lid lock may a user defined function (e.g., set by a parent) that prevents the lid from being opened unless an override feature is enabled (e.g., via an application). This way, the owner or parent can prevent a guest, child, or pet from accessing the OMPA unless the appropriate override command is provided, or the lid lock function is turned off.

The OMPA according to embodiments discussed herein is operative to convert OMPA input to OMPA output. In some embodiments, the OMPA output is FOOD GROUNDS™. The FOOD GROUNDS™ can be produced using a OMPA processing algorithm designed to intelligently render OMPA input into FOOD GROUNDS™ and to maintain the FOOD GROUNDS™ in a state that is suitable for delivery to an OMPA processor. The OMPA processing algorithm exercises judicious control of airflow (e.g., via fans), heat (e.g., via heaters, grinding (e.g., via a cut and paddle assembly) based on sensor data, time, time windows, interrupt events, and safety requirements. The OMPA processing algorithm can instruct the OMPA to progress through several OMPA processing states to convert OMPA input into FOOD GROUNDS™. The algorithm is designed to maximize the quality of the FOOD GROUNDS™ dynamically transition between OMPA processing states (e.g., based on sensor data), and eliminate unnecessary power consumption.

Figure 24:
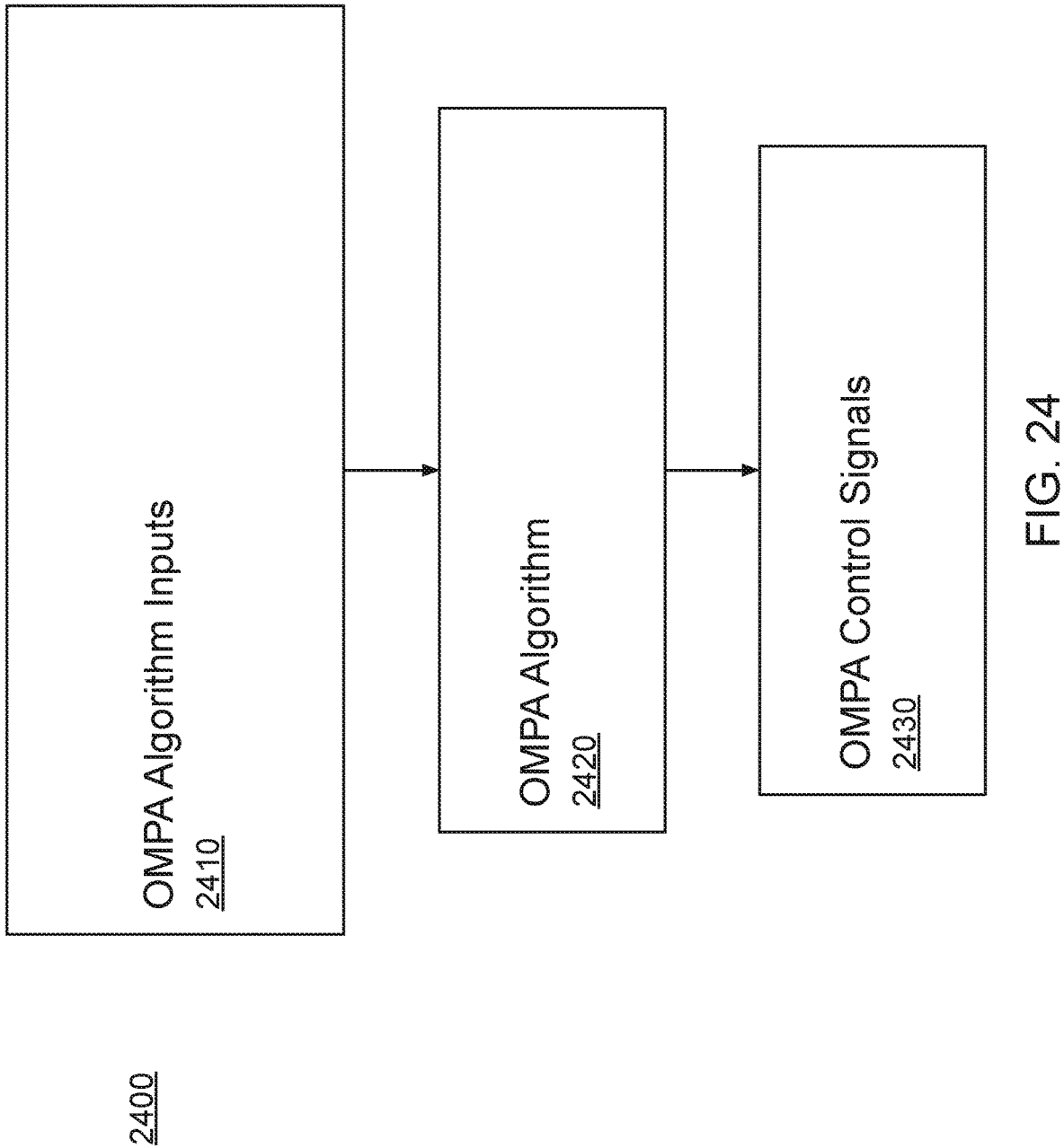
FIG. 24 shows an illustrative process for controlling the OMPA according to an OMPA algorithm to produce OMPA output according to an embodiment.

FIG. 24 shows an illustrative process 2400 for controlling the OMPA according to an OMPA processing algorithm to produce OMPA output according to an embodiment. OMPA processing algorithm 2420 receives inputs 2410 and provides control signals 2430 to control operation of the OMPA to convert OMPA input to OMPA output or to maintain the OMPA output in a state suitable for delivery to an OMPA processor. Inputs 2410 can include any of the data obtained from components or sensors included in the OMPA, including, for example, the sensors and components shown and discussed in FIGS. 14, 15A, 15B, and 15C. Inputs 2410 can include any combination of sensor data sources such as temperature sensors (e.g., temp sensor 1411b, temp sensors 1423a and 1423b, ATS inlet temp sensor 1431, ATS outlet temp sensor 1432), relative humidity sensor (e.g., humidity sensor 1411c, ATS inlet humidity sensor 1431, ATS outlet humidity sensor 1432), VOC sensors (e.g., VOC sensors 1411a, 1431 and 1432), mass sensors (e.g., mass sensors 1441 and mass processor and temperature sensor 1442). The sensor data sources can inform the algorithm of the conditions within the OMPA. Inputs 2410 can include switch or sensor states such as lid switches 1414 and 1415, latch switch 1416, safety switch 1418, electrical interface 1425, bucket present switch 1427, pedal switch 1450. The switch or sensor states may inform the algorithm of when the lid is open and closed and whether the bucket is inserted or removed from the OMPA. Inputs 2410 can also include operational characteristics of components such as lid heater 1412, lid fan 1413, bucket motor 1414, heater 1421, and ATS fan 1433. The operational characteristics can inform the algorithm of, for example, the spin direction of the motor, the grinding speed of the motor, the torque experienced by the motor, the temperature setpoints of the heaters (e.g., lid heater 1412 and heater 1421), and the fan speed of the fans (e.g., lid fan 1413 and ATS fan 1433).

OMPA inputs 2410 can also include data or commands received from sources located externally to the OMPA such as, for example, cloud based data provided by a proprietary server that is hosted by the same organization that provides the OMPA. The proprietary server may host a web-based interface or handle transactions implemented on an application located on a user's smart device. For example, a user may set a schedule using the application on his smart device and the proprietary server may relay the schedule to the algorithm running in the OMPA. As another example, the proprietary service may communicate with various third party servers or other clients to obtain information (e.g., power utility information, weather information) or request (e.g., an OMPA output processor request OMPA output to have a first set of characteristics) that can be provided to the OMPA processing algorithm. In some embodiments, the third party servers or clients can interact directly with the OMPA.

OMPA processing algorithm 2420 is responsible for managing OMPA processing states and the transitions from one OMPA processing state to another. Each OMPA processing state can cause the OMPA to operate in a particular way by providing OMPA control signals 2430. Each processing state can be designed to achieve a particular result in the process of converting OMPA input to OMPA output. The specifics of these states are discussed in more detail below. The management of state transitions can be based on a multitude of factors, including algorithm parameters, sensors/data inputs, user preferences (e.g., user schedule preferences), and third party data sources (e.g., utilities, weather, etc.). These factors can enable OMPA processing algorithm 2420 to execute OMPA input conversion in a robust manner that accounts for a large (e.g., essentially infinite) number of variables, optimizes energy consumption and associated costs (e.g., accounts for "green" factors such as green energy production (e.g., wind or solar produced power), varying utility power rates, environmental conditions, etc.), accounts for user schedule preferences or monitored user presence, and also takes into account desired OMPA output parameters.

Figure 25:
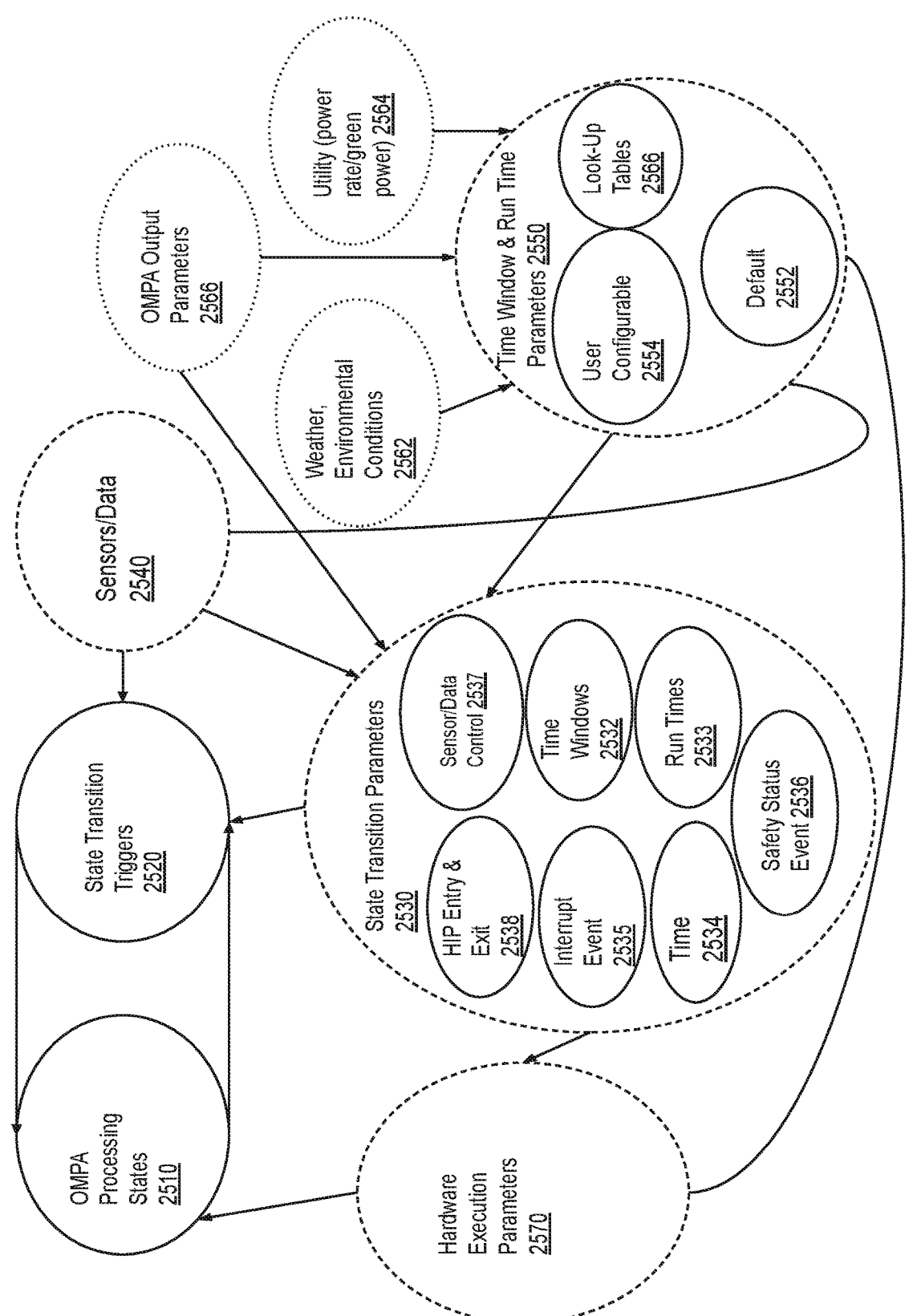
FIG. 25 shows an illustrative schematic diagram of various inputs that are provided to an OMPA algorithm according to an embodiment.
Figure 26:
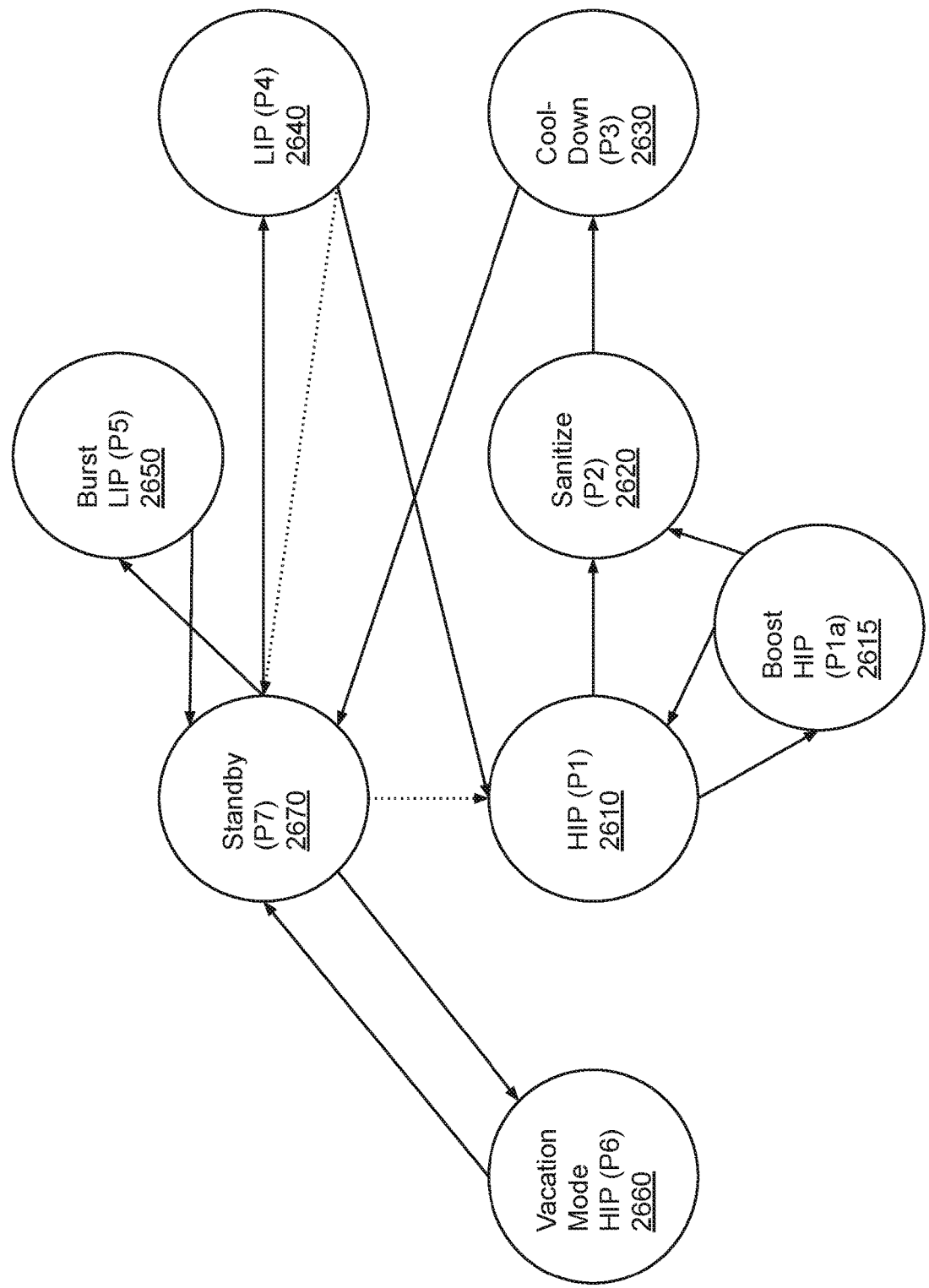
FIG. 26 shows several different OMPA processing states that may be executed by an OMPA according to an embodiment.

FIG. 25 shows an illustrative schematic diagram of various inputs that are provided to an OMPA processing algorithm according to an embodiment. FIG. 25 includes OMPA processing states 2510 and state transition triggers 2520. State transition triggers can determine when the OMPA should transition to another one of processing states 2510. FIG. 26 shows eight different OMPA processing states that may be embodied by the oval representing states 2510 in FIG. 25. As shown in FIG. 26, the eight processing states include high intensity processing (HIP) state 2610, Boost HIP state 2615, sanitize state 2620, cooldown state 2630, fixed low intensity processing (LIP) state 2640, burst LIP state 2650, vacation mode state 2660, and standby state 2670. The OMPA is instructed to perform (or not perform) various tasks depending on the state currently being executed. The arrows in FIG. 26 show illustrative state change transition. The task(s) by OMPA for each of states 2610, 2615, 2620, 2630, 2640, 2650, 2660, and 2670 is now discussed.

HIP state 2610 executes the primary desiccation function to reduce moisture content, mass, and volume of the OMPA input contained in the OMPA. HIP state 2610 may be selectively controlled to ensure that the entirety of the OMPA input—including pre-existing OMPA input that has already been converted to OMPA output and subsequently added OMPA input inserted into the OMPA prior to execution of HIP state 2610—is substantially converted to pre-sanitized OMPA output prior to transition to sanitize state 2720. In HIP state 2610, the bucket heater can be set to a HIP bucket temperature (e.g., 80 C), the lid fan can be set to run at a HIP fan speed, the motor can be set to run according to a HIP grinding routine, and the lid heater may be optionally activated, for example, depending on ambient conditions. If the ambient air meets predefined heat and moisture criteria (e.g., the air is sufficiently hot and dry enough), then the lid heater may not be activated. However, if the ambient air does not meet the predefined heat and moisture criteria, then the lid fan may be activated during HIP state 2610. Following completion of state 2610, the OMPA may transition to sanitize state 2620.

Boost HIP state 2615 may be similar to HIP state 2610, but operates some of the same hardware used in HIP state at an increased rate. For example, the bucket heater may be set to a boost HIP temperature (e.g., 85C), which is higher than the HIP bucket temperature. In addition, the lid fan may be set to run at a boost fan speed, which is greater than the HIP fan speed. With the increase in lid fan speed, the ATS fan speed may also be increased to ensure that ATS fans speed is equal to or greater than the lid fan speed.

Sanitize state 2620 executes a sanitization function to convert all pre-sanitized OMPA output to a sanitized OMPA output. Sanitize state 2620 is designed to eliminate or substantially reduce existence of pathogens that may exist in the pre-sanitized OMPA output. In sanitize state 2620, the bucket heater can be set to a sanitize bucket temperature (e.g., 96C), which may set to a higher temperature than the HIP bucket temperature, and the motor can be set to run according to a sanitize grinding routing. The lid fan and the ATS fan may be set to run at a relatively slow speed (e.g., 1 CFM) to maintain a constant negative pressure that prevents any untreated air from escaping through the lid while in sanitize state 2620. The lid heater may be turned off. Following completion of state 2620, the OMPA may transition to cool down state 2620. The OMPA may also transition to the cool down state even if there is an interrupt event (e.g., OMPA input is added) in the middle of the runtime of state 2620. Thus, although the addition of OMPA input may prevent the OMPA from fully converting the OMPA input to OMPA output during this fixed time OMPA cycle, the newly added OMPA input may be converted during the following fixed time OMPA cycle.

Cool down state 2630 executes a cool down function to rapidly cool down the temperature of the bucket so that the bucket is safe to touch with bare hands (e.g., less than about 40 C). This enables a user to access the bucket (e.g., remove it from the OMPA) relatedly soon after it has been subjected to high temperatures during states 2610 and 2620. The cool down can be implemented by turning on the lid fan, but keeping the lid heater off, turning off the bucket heater, and running the motor according to a cool down grinding routine. For example, lid fan and the ATS fan may be set to run at a relatively slow speed (e.g., 1 CFM) to maintain negative pressure within the OMPA and to keep fan noise to a minimum. Moreover, because cool down state may potentially occur close to a time frame in which users may be present, it is further desirable to run the fans at slower speeds so that air noise is kept to a minimum (so as not to disrupt the occupants). Following completion of state 2630, the OMPA may return to standby state 2670. In the event OMPA input is added during operation of state 2630, the OMPA may continue to execute state 2630 for its designed runtime before reverting to the standby state. The newly added OMPA input will be treated during the next fixed time OMPA cycle.

Fixed LIP state 2640 preconditions the OMPA for transition to state 2610. Fixed LIP state 2640 may run the motor according to a fixed LIP grinding routine to ensure that the OMPA input does not include any hard stop material that prevents the grinding mechanism from operating as intended. The bucket heater, the lid fan, and lid heater are all turned off during state 2640. Keeping the heaters turned off enables the user to extract any hard stop material and unjam the OMPA while it is still relatively cool. If a hard stop material (e.g., an unbreakable bone or utensil) exists in the bucket, the owner can be notified via text, email, or notification on his or her smart device, and the OMPA may indicate (e.g., via display) that a corrective action is required. It is desirable to ensure that the motor will operate as intended throughout HIP state 2610. Executing fixed LIP state 2640 can ensure that. Following completion of state 2650, the OMPA may return to standby state 2670 or proceed to HIP state 2610.

Burst LIP state 2650 executes an immediate mixture of newly added OMPA input with any pre-existing OMPA input or any pre-existing OMPA output after the new OMPA input is added and the lid is closed. Burst LIP state 2650 may operate the motor according to a burst state grinding routine whenever new OMPA input is added to the bucket. No fans and no heaters may be active during burst LIP state 2650. A purpose of burst LIP state 2650 is to mix newly added OMPA input with pre-existing and desiccated OMPA output to integrate any moisture contained in the OMPA input with the pre-existing OMPA output. In this manner, the moisture content of material contained in the bucket is at least partially distributed among the material, thus setting the OMPA up for more efficient operation of HIP state 2610. In some embodiments, burst LIP state 2650 may be executed only if pre-existing OMPA output currently exists in the bucket. Following completion of state 2650, the OMPA may return to standby state 2670.

Vacation mode HIP state 2660 maintains the OMPA output in a state suitable for long-term storage by periodically running a HIP cycle once every "x" number of days when the lid has been closed and no new OMPA input has been added for a relatively long duration. This way, after OMPA output has been produced and resides in the bucket, but the user does not remove the OMPA output or does not use the OMPA for an extended period of time, the OMPA can periodically execute the vacation mode HIP state 2660. In state 2660, the bucket heater can be set to a vacation mode HIP bucket temperature (e.g., 80C), the lid fan can be set to run at a vacation mode HIP fan speed, the motor can be set to run according to a vacation mode HIP grinding routine, and the lid heater may be optionally activated, for example, depending on ambient conditions. Following completion of state 2660, the OMPA may return to standby state 2670.

Standby state 2670 executes a low power mode of OMPA operation. In this mode, all heaters, all fans, and the motor may be turned off. The OMPA can transition to any one of states 2610, 2640, 2650, and 2660 depending on state transition triggers.

In each of states 2610, 2615, 2620, 2630, 2640, 2650, and 2660, the motor may operate according to a state specific grinding routine. Some states may share the same grinding routine, whereas others are different. The grinding routine can include motor speed, motor current limit, grinder stall speed, motor current threshold, number of stall recovery attempts, and motor direction.

It should be understood that the states shown in FIG. 26 are merely illustrative and that additional states may be added or an existing state may be omitted.

States 2610, 2615, 2620, 2630, 2640, 2650, 2660, and 2670 can be assigned respective priorities P1, P1a, P2, P3, P4, P5, P6, and P7, where the priority of P1 is greater than P2, which is greater than P3, and so on. The priority of a given state can determine which state takes priority if there is a scheduling conflict among any two or more states. The priority P1a of state 2615 can effectively be the same as priority P1. Whether the OMPA operates in state 2610 or

2615 depends on whether criteria for boost logic are met. The boost criteria is discussed below in connection with FIG. 35.

Referring now back to FIG. 25, parameters that can determine state transition triggers are now discussed. These parameters can include state transition parameters 2530 and sensors/data 2540. Sensors/data 2540 can include sensor data obtained from sensor such as temperature sensors, humidity sensors, and VOC sensors, data from components such as switches, and data provided by components being controlled by the OMPA. For example, sensor/data 2540 can include any of the data obtained from the sensors and components discussed in connection with FIGS. 14, and 15A-15C. In the embodiment shown in FIG. 25, sensors/data 2540 can be provided to state transition triggers 2520 and state transition parameters 2530. In another embodiment, sensors/data 2540 can be provided to state transition parameters 2530, but not to state transition triggers 2520. In this embodiment, the state transition parameters 2530 may use the data received from sensors/data 2540 to execute a state change transition.

State transition parameters 2530 can include time windows 2532, run times 2533, time 2534, interrupt event 2535, safety status event 2536, sensor/data control parameters 2537, and HIP entry and exit criteria 2538. Time 2534 can refer to the time of day, for example, the local time in the time zone in which the OMPA is located. A clock, residing in the OMPA, can keep track of the local time (or any other time (e.g., GMT)) and can provide the time to state transition triggers 2520. Interrupt event 2535 can be a user activated event that causes the lid of OMPA to open. Interrupt event 2535 may occur multiple times a day, for example, each time a user places OMPA input into the bucket. In response to an interrupt event 2535, burst LIP 2550 may be executed for a fixed period of time (e.g., five or ten minutes) and the expiration of the fixed period of time, the OMPA may evert back to standby state 2670. Safety status event 2536 may occur when the safety monitor (e.g., safety monitor 1620) or the MCU (e.g., MCU 1610) detects a safety event that requires activation of a safety protocol, as discussed above. The OMPA may revert to standby state 2670 in response to detection of safety status event 2536. In some embodiments, an occurrence of interrupt event 2535 may trigger safety status event 2536.

Sensor/Data control parameters 2537 can cause a state change transition based on data received from sensors/data 2540. For example, the sensor data may indicate that a humidity value has crossed a threshold that satisfies a condition for a state change transition, or the sensor data includes humidity, temperature, and mass data that supports criteria for a state change transition. In addition, sensor/data control parameters 2537 can cause a change in hardware execution parameters 2570. For example, sensor data may cause the OMPA to operate differently within a currently executed OMPA state. As a specific example, the OMPA may activate the lid heater and/or increase fan speed to avoid condensation while operating in the HIP state, based on the sensor data.

HIP entry and exit criteria 2538 can define various specific parameters that govern operation of and transition from HIP state 2610. Entry criteria for HIP state 2610 can include mass addition, interrupt event, and minimum runtime. The mass addition may define a minimum weight value of OMPA input added during a fixed time OMPA cycle to justify executing HIP state 2610. The fixed time OMPA cycle can refer to a fixed period (e.g., a 24 hour period) during which the OMPA transitions through several OMPA states to convert OMPA input to OMPA output. If the weight of the mass addition during the fixed time OMPA cycle does not exceed the minimum weight value, then the condition the entry into the HIP state may not be satisfied the HIP state may not necessarily be executed during this fixed time OMPA cycle. There may be exceptions, however, in certain situations. For example, if the OMPA has been previously loaded with substantial OMPA input that has not been fully converted to OMPA output, then the OMPA may execute the HIP state to resume conversion of the OMPA input to OMPA output. The occurrence of an interrupt event in which the lid has been opened and closed may be a prerequisite to entry to HIP state. For example, if the lid has not opened during the fixed time OMPA cycle, then it can be inferred that no additional OMPA input has been added and that there is no need to execute the HIP state during this cycle (unless there is prior OMPA input already existing in the OMPA that requires further conversion). The minimum runtime can be a specific runtime value selected for the runtime 2533 assigned to the HIP state during a particular fixed time OMPA cycle. This runtime can be based on a value obtained from look-up tables 2566.

HIP exit criteria can include expiration of the minimum runtime, expiration of a mass based runtime, satisfaction of absolute humidity data, satisfaction of mass data, or satisfaction of a combination of humidity data and mass data. The absolute humidity criteria can refer to a delta change in humidity when the humidity is below a set humidity threshold. For example, if the humidity is below a humidity threshold and the change in humidity (e.g., the delta) remains within a predetermined range over set period of time (e.g., 30 minutes), then the humidity criteria may be met. The mass data can refer to a delta change in mass criteria. For example, if the change in mass remains within a predetermined range over a set period of time, then the mass data may be satisfied. For example, if the mass remains relatively constant for a fixed period time, it can be inferred that the mass has been sufficiently desiccated and the OMPA can transition to another state. The OMPA can transition to another state (e.g., sanitize state 2620) when the minimum runtime or the mass based runtime expires. The OMPA can transition to another state prior expiration of the minimum runtime or the mass based runtime the absolute humidity data, mass data, or combination thereof is satisfied.

Time windows 2532 can define a time frame during which a particular OMPA processing state is permitted to be executed. The time frame can include a start time and an end time. Each OMPA processing state can be assigned a time window. The time windows for some processing states may be based on time window parameters 2550, which can include default parameters 2552, user configurable parameters 2554, look up tables 2556, or a combination thereof. The start time and the end time for one or more time windows can be set to default values. For example, the start time and end time of the time windows for standby state 2670 and Burst LIP state 2650 can set to 8:00 AM and 12:00 AM, respectively. As another example, the time window for vacation mode HIP state 2660 can have a 12:00 AM start time and a 4:00 AM end time. Other OMPA processing states may have time windows that assigned a default start time or a user configurable start time and have a look up table based end time. For example, the time window for HIP state 2610 can have a default start time (e.g., 8:00 PM) or a user configurable start time (e.g., 8:45 PM) and look-up table based end time (e.g., the selected start time plus a look-up table time value). The look-up table based end time can be based on mass data and/or moisture data received from sensor/data 2540. The mass data can include the mass of new OMPA input added prior to execution of HIP state 2610 or a combination of pre-existing mass already included in the bucket and the mass of new OMPA input. In some embodiments, the look-up table time value can be based only on mass data.

Run times 2533 can be assigned to each OMPA processing state. The run time can serve as an initial guidepost for how long the OMPA operates in a particular state. After the run time has run its course, the OMPA can transition to another state. In some embodiments, depending on data received from sensors/data 2540, the run time can be modified (e.g., extended or shortened) to delay or speed up a state change transition. The run time can be set to zero (e.g., for standby state 2670), a default or preset run time (e.g., for fixed LIP state 2640 and burst LIP state 2650), or a look-up table run time (e.g., for HIP state 2610, sanitize state 2620, cool down state 2630, and vacation mode HIP state 2660). In some embodiments, the run time assigned to a particular processing state may be equivalent to the look-up table based end time for that state. For example, if the run time for one state is set to 2.5 hours, the look-up table based end time for that particular state can also be 2.5 hours.

Time window and run time parameter 2550 may receive inputs from various third party sources that influence selection of time windows and execution of run times. For example, weather or environmental data 2562 may be provided to parameters 2550. If the weather is cold and wet, the time windows and run times may be adjusted to account for additional presence of moisture and colder temperatures. Or if the weather is hot and dry, the time windows and run times may be adjusted to account for warmer temperatures and absence of moisture. Utility information 2564 can provide utility rates (e.g., peak power and non-peak pricing) and the source of the power (e.g., whether power is derived from a green power source such as solar or wind or whether the power is derived from fossil fuel sources or nuclear sources). The time windows and run times can be adjusted to minimize cost and to maximize use of green power sources to the extent possible. OMPA output parameters 2566 can specify the desired characteristics of the OMPA output to be produced by the OMPA. OMPA output parameters 2566 may be provided by OMPA output processor that receive the OMPA output and further process it to produce a higher value good. For example, one entity may desire OMPA output having a first moisture content (e.g., 10% by weight) whereas another entity may desire OMPA output having a second moisture content (e.g., 14% by weight), where the first and second moisture contents are different. The time windows and run times can be adjusted to achieve the desired OMPA output parameters.

Time window and run time parameter 2550 can include default parameters 2552 and user configurable parameters 2554, and look-up table parameters 2556. Default parameters 2552 can set time windows and run times for each OMPA processing state. Default parameters 2552 can be the system defaults that are set at the factory or can be the default values that are selected based on inputs from 2562, 2564, or 2566. Moreover, default parameters 2552 can be updated periodically as part of a standard software update. User configurable parameters 2554 can set time windows and run times for a subset of the OMPA processing states. In other words, a user can set a schedule for when the OMPA operates in various states, and in particular, the HIP state. The user configurable parameters can override one or more default parameters. For example, a user can set HIP state time window to commence at 10:30 PM (whereas the default setting may start the HIP state at 10:00). When a user sets the time window for the HIP state, the time windows for other states such as the sanitize and cool downs states may be automatically adjusted and set based on the time window set for the HIP state. In addition, the time window for the fixed LIP state may also be set based on the user defined time window for the HIP state. In some embodiments, user configurable 2554 can include heuristic scheduling based on detected user presence within the vicinity of the OMPA. Look-Up table parameters 2566 can define the run times for several OMPA states and the end time frame of the time window for several OMPA states. Look-up table parameters 2566 may receive sensor/data 2540 information to select the appropriate parameters. In some embodiments, the look-up table parameters 2566 can be updated as part of a routine software update.

FIG. 27A shows an illustrative look-up table for determining run times for the HIP state according to an embodiment. The look-up table shows that the HIP runtime can be based on daily added mass, a minimum run time, and a maximum run time. For example, if less 0.5 pounds of material is added, then the HIP state may be not run. If 0.5 to 1 pounds of matter are added, then the HIP run time can be set to the minimum run time of 2.5 hours. If 3 pounds are added, then the HIP run time can be set to 7.5 hours (e.g., 2.5 times 3). If 6 pounds are added, then the HIP run time is set to the maximum runtime of 12.5 hours (even though 2.5 times 6 is more than 12.5).

FIG. 27B shows an illustrative look-up table for determining run times for the sanitize processing state and the cool down processing state. As shown, the run times for sanitize and cool down states can be based on the total mass of the matter included in the bucket. This contrasts with daily mass added for determining the HIP run time.

Returning back to FIG. 25, hardware execution parameters 2570 are now discussed. Hardware execution parameters 2570 can define how various components of the OMPA operate during each OMPA processing state. For example, during HIP state 2610, the bucket heater, the lid fan, and the motor are all active, with the lid heater being optionally activated. Parameters 2570 can set the operating conditions of each of the activated components. For example, parameters can control the set point temperature of the heaters, the fan speed, and the HIP grinding schedule for the motor. In some embodiments, depending (e.g., on parameters 2550), parameters 2570 can dynamically control the operating conditions of the activated components for any OMPA processing state.

FIG. 28 shows an illustrative chart showing the OMPA processing states, the time windows thereof, the run times thereof, and other information. FIG. 28 also shows hardware execution parameters for several components such as the lid fan, ATS fan, bucket heater, and motor for the grinder. FIG. 28 also shows grinder stall cycles and stall recovery attempts. The chart also indicates whether the grinder motor and lid heater are enabled for a particular state.

It should be understood that the values shown in FIG. 28 are merely illustrative and are not limiting.

Figure 29:
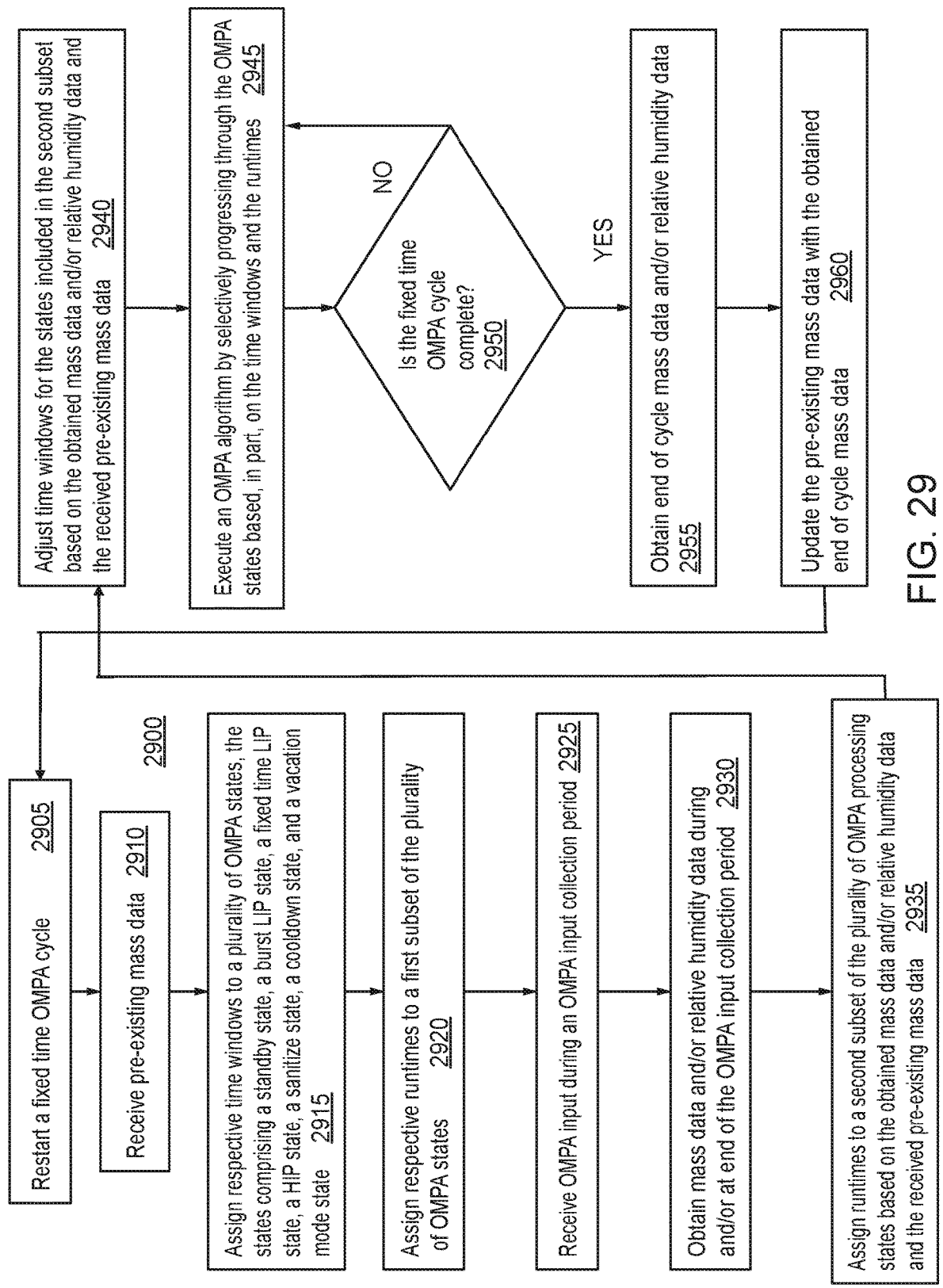
FIG. 29 shows an illustrative process for producing OMPA output according to an embodiment.

FIG. 29 shows an illustrative process 2900 for producing OMPA output according to an embodiment. Process 2900 can be implemented in a OMPA such as OMPA 1300 or the OMPA of FIG. 14. Starting at step 2905, a fixed time OMPA processing cycle can be restarted. The fixed time OMPA processing cycle refers to a time period during which the OMPA receives OMPA input and converts all or substantially all of the OMPA input to OMPA output by the of the time period. This time period can be a daily time period (e.g., starting and ending at 8:00 AM). Process 2900 may receive pre-existing mass data at step 2910. The pre-existing mass data may include previously processed OMPA input that has already been converted to OMPA output. At step 2915, time windows can be assigned to the OMPA processing states (e.g., states 2610, 2620, 2630, 2640, 2650, 2660, and 2670). The time windows can be assigned based on default parameters, user configurable parameters, look-up table parameters, or a combination thereof.

At step 2920, runtimes can be assigned to a first subset of the OMPA states. In some embodiments, the first subset can include the OMPA states that do not require a mass dependent runtime. The assigned runtimes for the first subset can be based on default values, for example. OMPA input may be received during an OMPA input collection period, at step 2925. The OMPA input collection period may represent a preferred time frame during which the user inserts matter into the OMPA. The preferred time frame may span from the start of the fixed time OMPA processing cycle and the start of the HIP state. In other words, the OMPA input collection period represents the time period when most or all of the OMPA input is inserted into the bucket and the user typically no longer needs to insert any additional matter after the collection period. The mass data and/or the relatively humidity data collected during and/or at the end of the OMPA input collection period (as shown in step 2930) typically represents the starting mass prior to execution of the HIP state. The mass measurements and/or moisture measurement taken at the end of the collection period may be used to determine the time windows and run times (by accessing the look-up tables). Runtimes can be assigned to a second subset of the OMPA states based on the obtained mass data and/or relatively humidity data and the received pre-existing mass data, as shown in step 2935. For example, the second subset can include the HIP, sanitize, and cool down states. At step 2940, the time windows for the states included in the second subset may be adjusted based on the mass data and/or relatively humidity data and the received pre-existing mass data.

An OMPA processing algorithm is executed throughout the fixed time OMPA processing cycle by progressing through the OMPA processing states based, in part, on the time windows and the runtimes, as shown in step 2945. At step 2950, a determination is made whether the fixed time OMPA processing cycle is complete. If no, process 2900 can revert back to step 2945. If yes, process 2900 can proceed to step 2955 where the end of cycle mass and/or relative humidity data are obtained. The pre-existing mass data is updated with the obtained end of cycle mass data at step 2960 and process 2900 reverts back to step 2905.

It should be understood that the steps shown in FIG. 29 are merely illustrative and that additional steps may be added, the order of the steps may be rearranged, and that steps may be omitted. Furthermore, one or more of the steps can be modified. For example, step 2930 may be modified to only collect mass data and not collect moisture data.

Figure 30B:
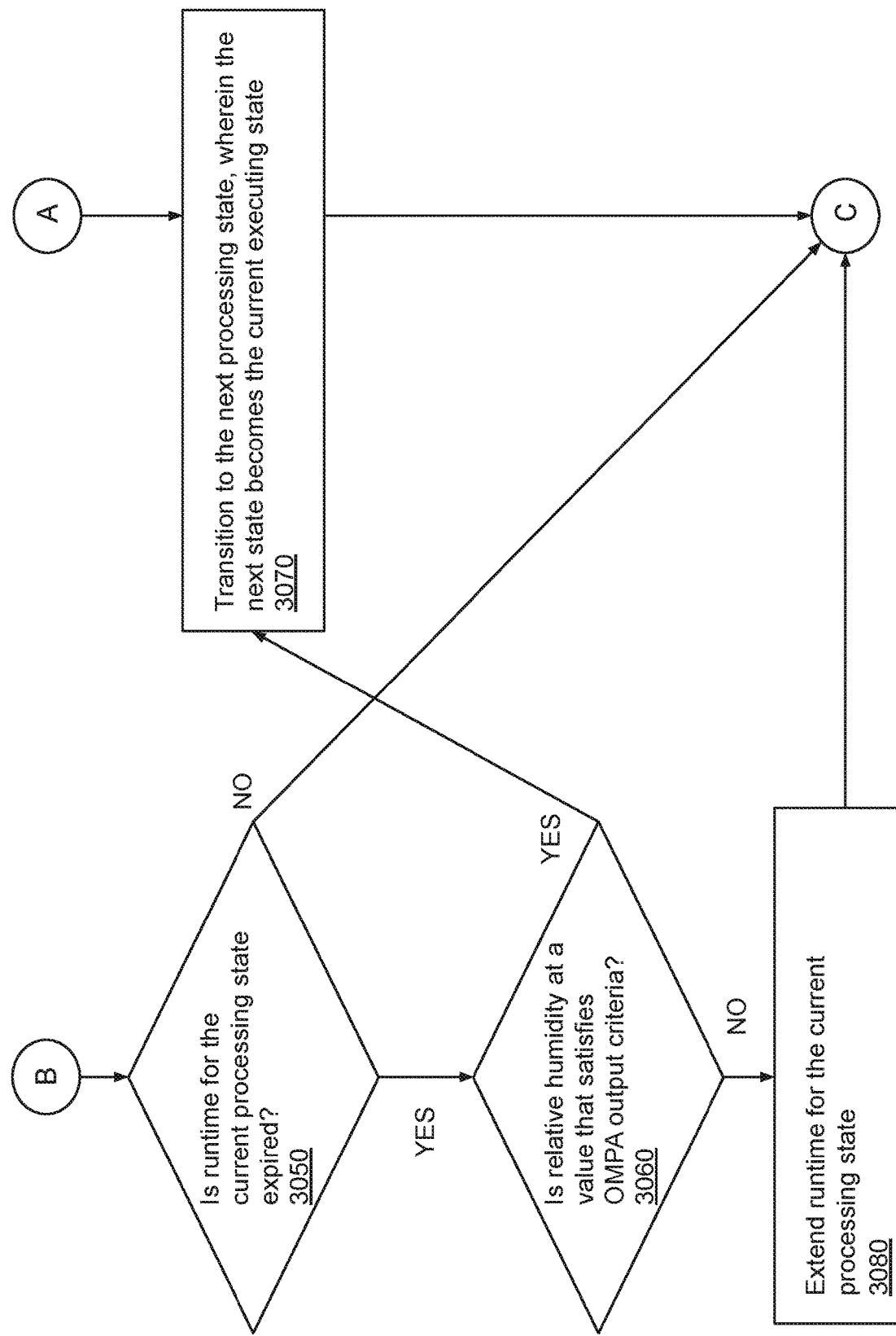

FIGS. 30A and 30B show an illustrative process 3000 for executing an OMPA algorithm according to an embodiment. Process 3000 may represent steps performed by step 2945 of FIG. 29. Starting at step 3010, process 3000 can determine which of a plurality of OMPA states to execute based, in part, on a time and time windows assigned to the OMPA states. The determined processing state is a current processing state. The current processing state can be executed for the runtime assigned to that processing state, at step 3020. The relative humidity and mass can be monitored to determine whether to transition to a different one of the plurality of processing states before the expiry of the runtime assigned to the currently executed processing state. The OMPA is outfitted with moistures sensors and a mass sensing system and can determine a rate in which the OMPA input is being processed. In some scenarios, depending on the characteristics of the OMPA input (e.g., the molecular structure and moisture content of the matter contained in the bucket), the conversion rate from input to output may vary. As a result, the OMPA input can potentially convert to OMPA output before the runtime of a particular state expires or, alternatively, the runtime may not be long enough to sufficiently complete the conversion.

In step 3040, determination is made whether to transition to a next one of the processing states based on the monitored relative humidity and mass. If the determination is yes, process 3000 can transition to the next processing, at step 3070, where the next state becomes the current executing state. Following step 3070, process 3000 can revert back to step 3020. If the determination (at step 3040) is no, process 3000 can proceed to step 3050. At step 3050, a determination is made whether the runtime for the current processing state has expired. If the determination is no, process 3000 can proceed to step 3050. However, if the determination at step 3050 is yes, process 3000 can determine if the relative humidity is at a value that satisfies OMPA output criteria. If the determination at step 3060 is yes, process 3000 can proceed to step 3070. If the determination at step 3060 is no, the runtime can be extended (e.g., for a fixed period of time) for the currently executing processing state, at step 3080. Following step 3080, process 3000 can revert back to step 3020.

It should be understood that the steps shown in FIG. 30 are merely illustrative and that additional steps may be added, the order of the steps may be rearranged, and that steps may be omitted.

Figure 31:
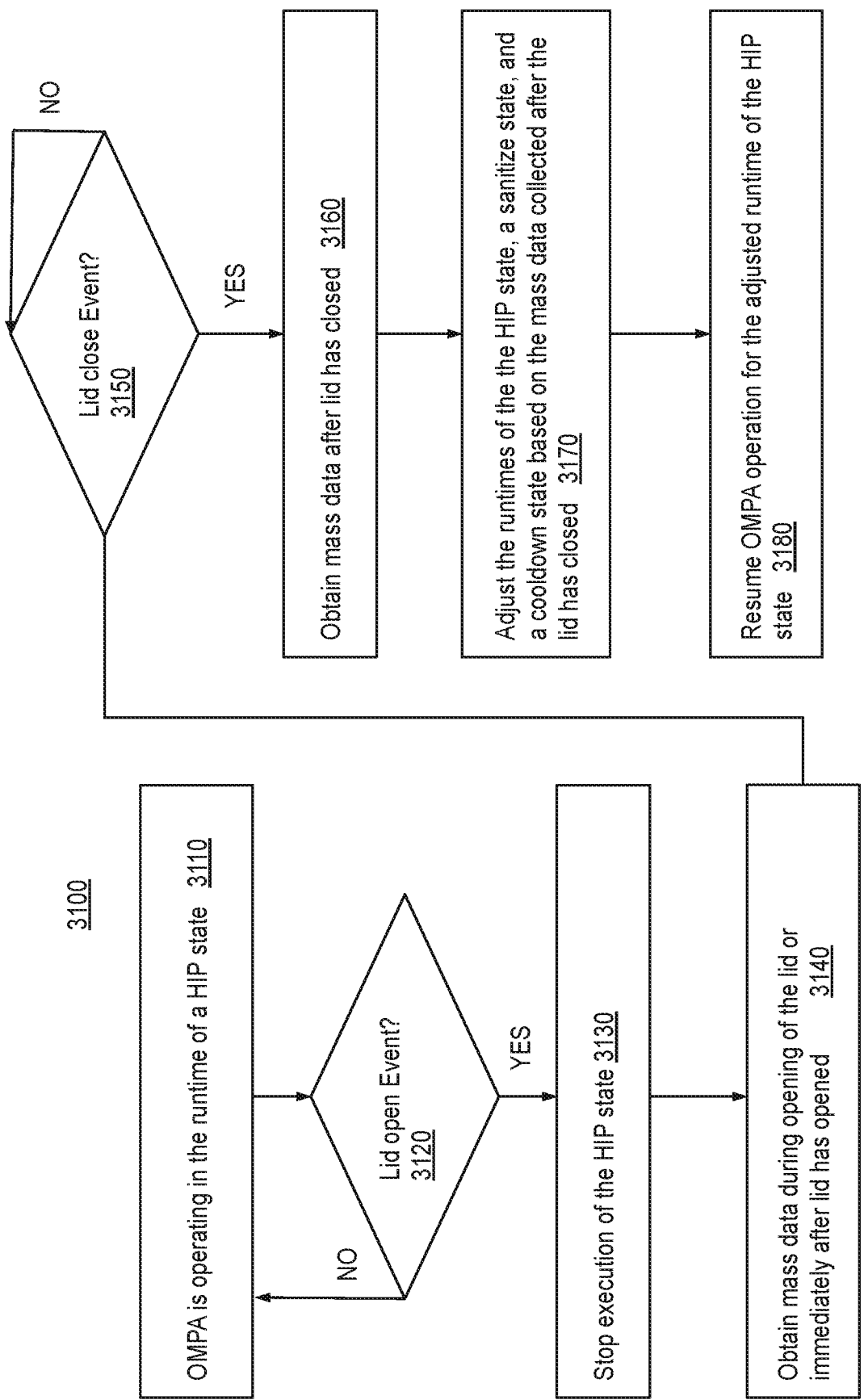
FIG. 31 shows an illustrative process for handling OMPA input during execution a HIP state according to an embodiment.

FIG. 31 shows an illustrative process 3100 for handling OMPA input during execution a HIP state according to an embodiment. The OMPA is operating in the runtime of a HIP state at step 3110. Process 3100 can check for a lid open event at step 3120. If there is no lid open event, process 3100 can revert back to step 3110. If there a lid open event, process 3100 can stop execution of the HIP processing state (at step 3130) and obtain mass data during opening of the lid or immediately after the lid has opened (at step 3140). This mass data measurement provides a baseline for determining how much mass is being added by a user when the lid is open. Process 3100 can continue to cycle to step 3150 until a lid close event, at which point, mass data is obtained at step 3160. The delta in mass obtained at step 314 and at step 3160 can represent the added mass. This mass delta can be used to adjust the runtimes of the HIP state, a sanitize state, and cooldown state, at step 3170. The OMPA can resume operation for the adjusted runtime of the HIP state at step 3180.

It should be understood that the steps shown in FIG. 31 are merely illustrative and that additional steps may be added, the order of the steps may be rearranged, and that steps may be omitted.

Figure 32:
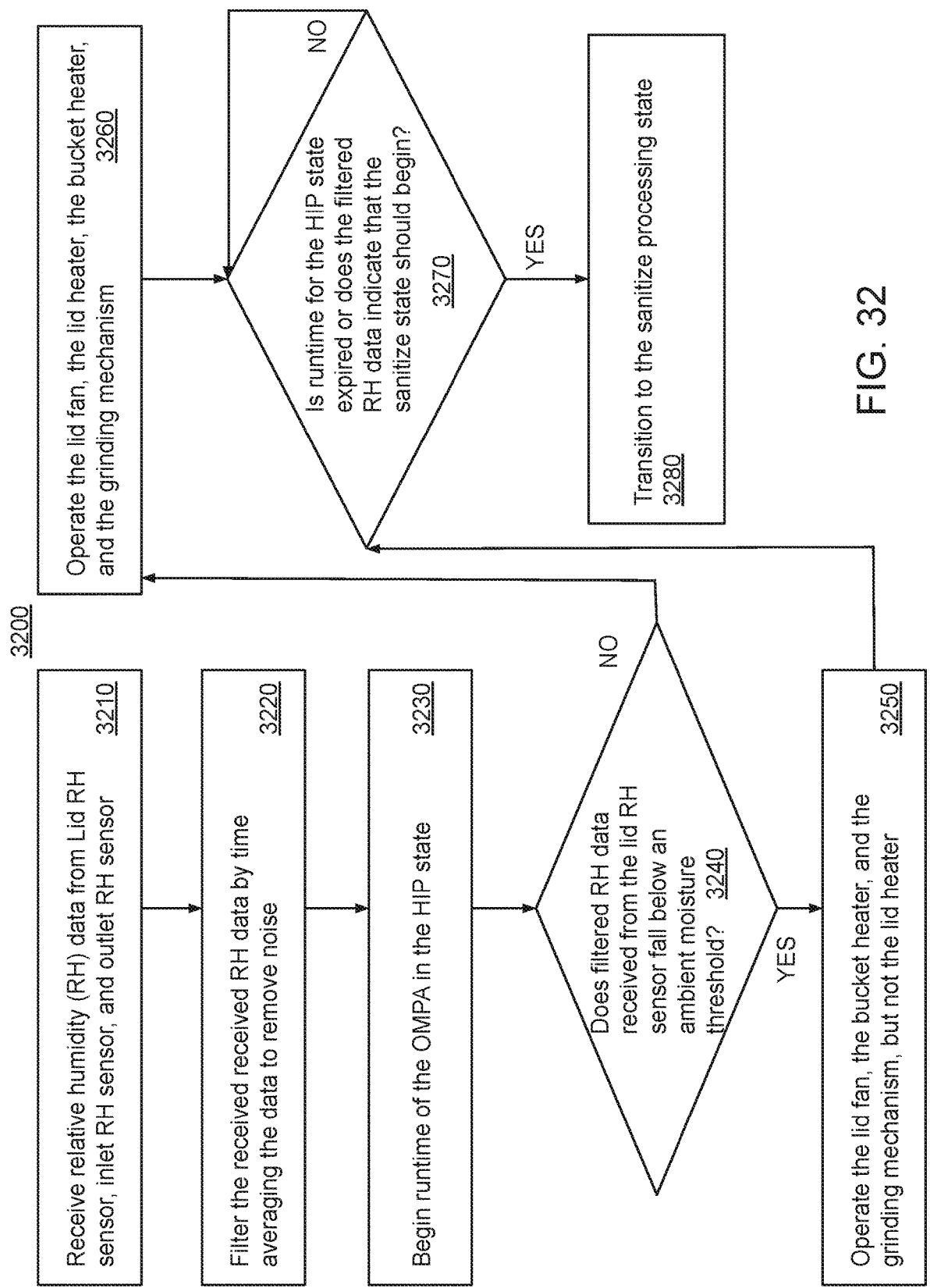
FIG. 32 shows an illustrative process for using relative humidity data to trigger a state transition according to an embodiment.

FIG. 32 shows an illustrative process 3200 for using relative humidity data to trigger a state transition according to an embodiment. Starting at step 3210, relative humidity data can be received from a lid RH sensor, an inlet RH sensor, and outlet RH sensor. The RH data can be filtered (e.g., using time averaging) to remove noise at step 3220. The OMPA can begin runtime in the HIP state 3230. The received RH data can be constantly monitored during the HIP state. At step 3240, process 3200 can determine whether lid heater needs to be activated or not based on the ambient air humidity being sensed by the lid RH sensor. If the RH data received from the lid RH sensor falls below an ambient moisture threshold (i.e., the air meets certain dryness criteria), the OMPA may operate the lid fan, the bucket heater, and the grinding mechanism, but not the lid heater (in step 3250). This saves power consumption because the ambient air is sufficiently dry for the HIP state. If the determination at step 3240 is no, then the OMPA may operate the lid fan, the lid heater, the bucket heater, and the grinding mechanism at step 3260.

At step 3270, process 3200 can determine if the runtime for the HIP state has expired or whether the filtered RH data indicates that the sanitize state should begin. Process 3200 can compared the filtered RH data of lid RH sensor to the filtered RH data of the inlet RH sensor. When the filtered RH values of the lid and the inlet are the same or within a predetermined range to each other for a minimum period of time, then it can be assumed that the moisture level of the contents in the bucket have stabilized. If this moisture level satisfies OMPA output criteria, then OMPA processing algorithm can transition to the next state, which can be the sanitize state, as shown in step 3280.

It should be understood that the steps shown in FIG. 32 are merely illustrative and that additional steps may be added, the order of the steps may be rearranged, and that steps may be omitted.

Figure 33:
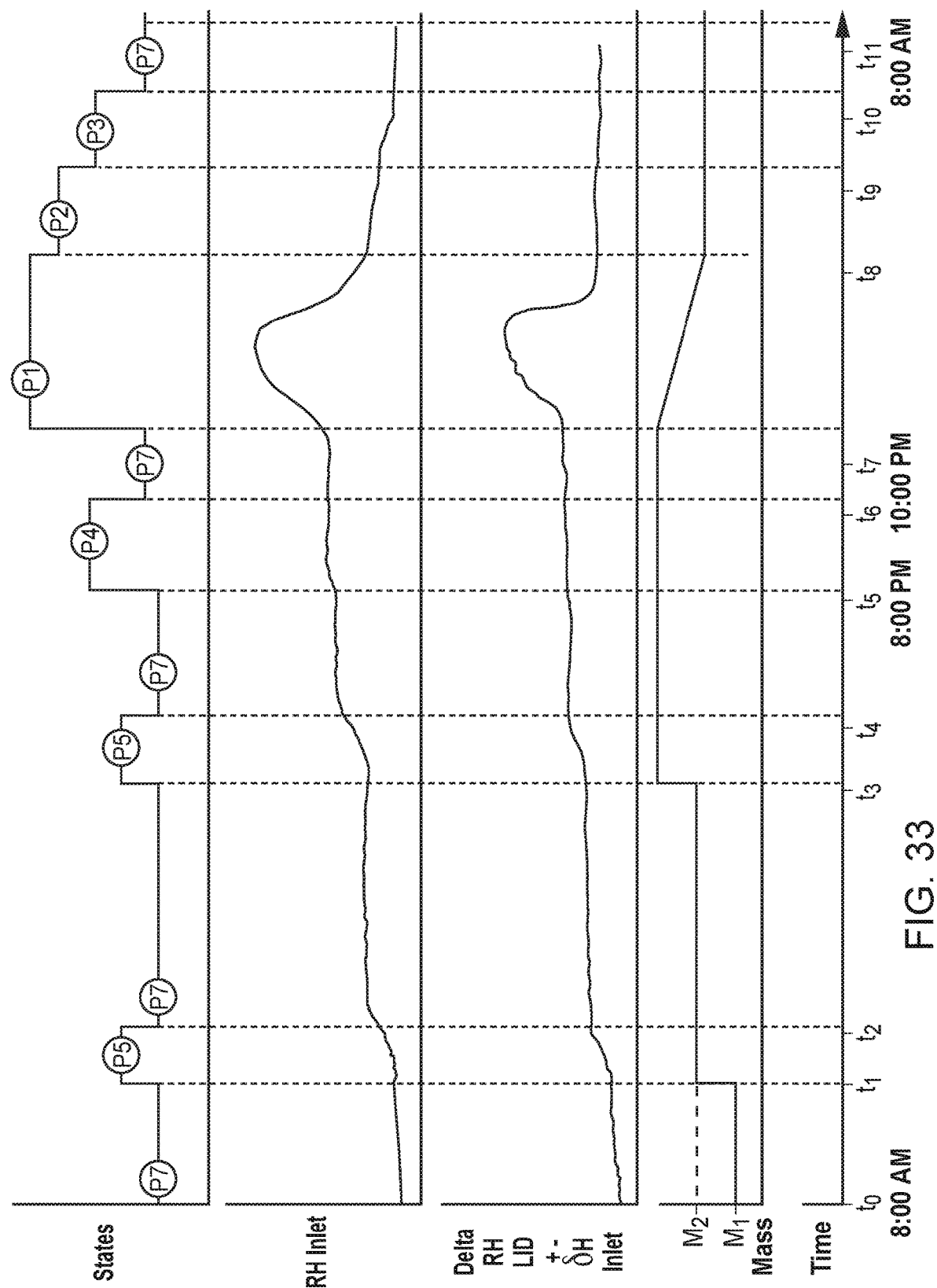
FIG. 33 shows an illustrative timing diagram according to an embodiment.

FIG. 33 shows an illustrative timing diagram showing operation of the OMPA according to various OMPA processing states and measure sensor values according to an embodiment. As shown, FIG. 33 shows time, mass, delta between RH values measured by the lid RH sensor (e.g., sensor 1411c) and the inlet RH sensor (e.g., ATS inlet sensor 1431), the RH values measured by the inlet RH sensor, and the OMPA processing state. The time shows a fixed time OMPA processing cycle of 24 hours, starting and ending at 8:00 AM. The time diagram show a exemplary execution an OMPA processing algorithm throughout the fixed time OMPA processing cycle. Starting at time, to, the OMPA may be in the standby state (e.g., P7), the RH inlet value may be relatively low (because the prior fixed time OMPA processing cycle has been completed), the delta value is near zero or close to zero, and the mass is set to a pre-existing mass value (M1). At time, $t_1$, the user may insert OMPA input into the OMPA, causing the OMPA to transition to the burst LIP state (e.g., P5) for a period of time. The OMPA may run the burst LIP grinding routine from time $t_1$ to $t_2$, during which time the inlet RH value and the mass values increase. From time, $t_2$ to $t_3$, the OMPA operates in the standby state. At time, $t_3$, the user may insert additional OMPA input. From time $t_3$ to $t_4$, the OMPA may operate in the burst LIP state. Note changes in mass and RH values during this time period. From time, $t_4$ to $t_5$, the OMPA may operate in the standby state. At time, $t_5$, the OMPA may operate in the fixed time LIP state to condition the OMPA input for the HIP state and to ensure that are no hard objects contained in the bucket that may affect grinder operation. At time, $t_7$, the HIP state (e.g., P4) commences and runs until time $t_8$. Note that the humidity value initially climbs during the beginning of the HIP state and then starts to fall. Further note that the mass values fall during the HIP state due to elimination of the moisture contained in the OMPA input. At time, $t_8$, the OMPA transitions to the sanitize state (P2) and then transitions to the cooldown state (e.g., P3) at time $t_9$. Note that the mass value stabilizes at or near time $t_8$ and has mass value M2, which is greater than mass value M1. Further note that the inlet humidity values have fallen substantially by time $t_8$ and can continue to fall from time $t_8$ to $t_{10}$. The delta RH values are shown to zero or near zero by time $t_9$. The OMPA can transition to the standby state at time $t_{10}$ and remain through the end of the fixed time OMPA processing cycle at time $t_{11}$.

Figure 34:
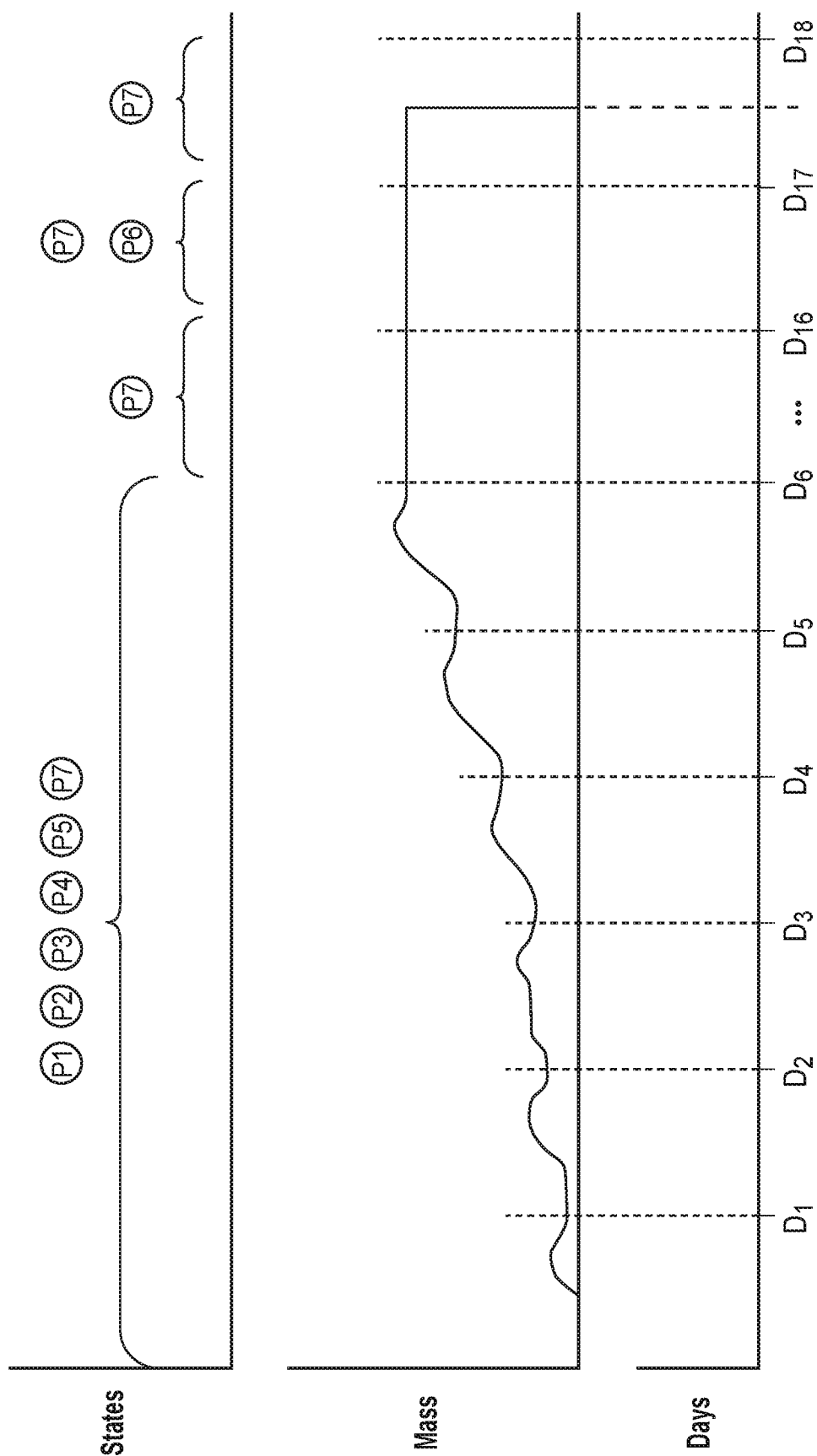
FIG. 34 shows an illustrative timing diagram according to an embodiment.

FIG. 34 shows an illustrative timing diagram showing operation of the OMPA over several days and the corresponding mass values according to an embodiment. FIG. 34 shows days, mass, and states used over the course of days. From days 1 to 6, a combination of HIP (P1), sanitize (P2), cooldown (P3), fixed time LIP (P4), burst LIP (P5), and standby states (P7). Note that the mass steadily increases from day 1 to day 6. From day 6 to day 16, the device may remain in the standby state (P7). Then, during day 16, the vacation mode HIP cycle (P6) may run in addition to standby state (P7). Then, during day 17, the user empties the contents of OMPA, resulting in mass going back to a baseline value (e.g., zero).

FIG. 35 shows an illustrative table of lid heater logic according to an embodiment. The table shows the intake temperature and intake relative humidity (RH) of the ambient air being drawn into the lid assembly, the mass of OMPA input currently residing in the bucket, whether the lid heater is on or off. The OMPA may run the lid fan for a fixed period of time (e.g., 10 minutes) to assess the temperature and humidity of the ambient air being drawn into the lid. Based on the temperature, humidity and weight of the OMPA input contained in the bucket, the OMPA can employ the logic defined in the table to determine whether to activate the lid heater at the inception of the HIP state. As shown in the table, when the intake temperature is greater than 20 C, the intake humidity is between 0 and 50, and the mass has any value, the lid heater may be turned off. Based on these conditions, the air exist in a nominal condition that is sufficiently warm and dry to be injected into the bucket and thus the heater does not need to be turned on, thereby saving power by not running the heater. When the intake temperature the intake humidity is less than 15 C, and the humidity has any value, and the mass has any value, the lid heater may be turned on. Based on these conditions, the air exist in a cold state. When the intake temperature has a value of any, and the intake humidity is greater than 70, and the mass has any value, the lid heater may be turned on. Based on these conditions, the air exist in a humid state. When the intake temperature has a value of any, and the intake humidity has a value of any, and the mass weights, for example, 3 pounds or more value, the lid heater may be turned on. Based on these conditions, the bucket exists in a "heavy" state and the lid heater is required for HIP state operation.

FIG. 36 shows an illustrative process 3600 for operating the OMPA in a boost mode to avoid condensation or to speed up the drying process according to an embodiment. Process 3600 may use the conditions specified in the logic table of FIG. 35. Starting at step 3610, the lid heater may be activated if any one of the lid heater logic conditions that require the lid heater to be turned on is met. The OMPA algorithm may specify how the lid heater, lid fan, and other hardware operate by configuring hardware execution parameters 2570. At step 3620, the lid fan may be operated at a boosted fan speed if two or more of the lid heater logic conditions that require the lid heater to be turned on are met. The boosted fan speed may be faster than a normal fan speed for the lid fan. In some embodiments, if the lid fan is required to operate at the boosted fan speed, other components in the OMPA may also operate in a "boosted mode" relative to a "normal mode." For example, if the boosted fan speed is 15% faster than the normal fan speed, the ATS fan may be also run 15% faster than normal when the lid fan is operating at the boosted fan speed. In addition, the bucket heater may be instructed to run at a higher temperature than normal (e.g., 90 C in a boosted mode as opposed to 80 C in a normal mode during HIP). At step 3630, the OMPA can transition to the standby state if the relative humidity is above a predetermined high humidity value (e.g., RH of 70) for a fixed period of time (e.g., one or two hours). The OMPA may turn off if the humidity levels are too high. This can protect OMPA from moisture damage and prevent premature deactivation of odor treating media contained in the air treatment media chamber. For example, a user may have inserted OMPA input that has high water content such as soup. If the water content of the OMPA input too high, the OMPA can detect this and notify the user that excessive moisture OMPA input is present and that it should be removed.

It should be understood that the steps shown in FIG. 36 are merely illustrative and that additional steps may be added, the order of the steps may be rearranged, and that steps may be omitted.

Figure 37:
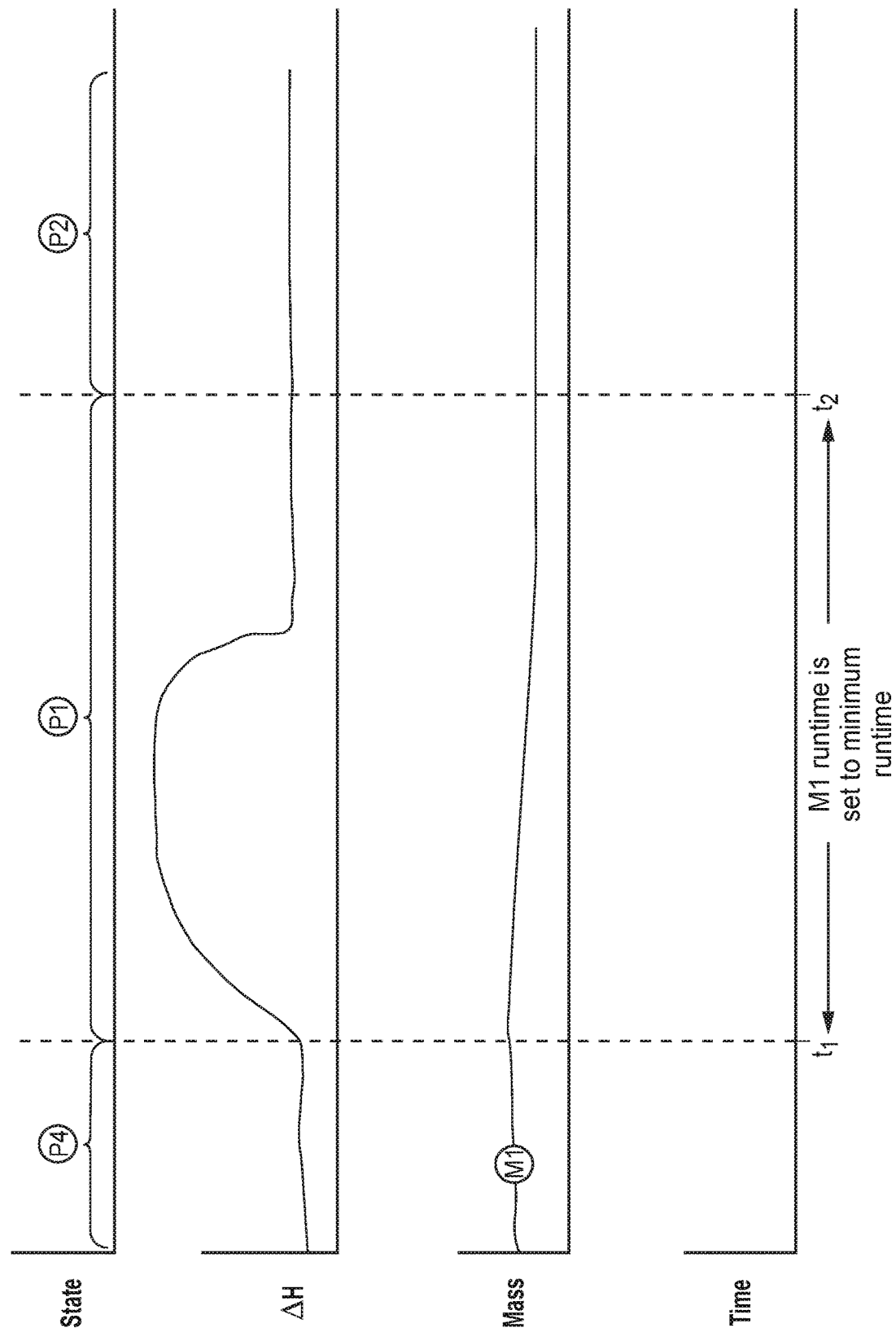
FIG. 37 shows an illustrative timing diagram according to an embodiment.

FIG. 37 shows an illustrative timing diagram according to an embodiment. FIG. 37 shows time, mass, delta in humidity between the lid sensor and the ATS inlet sensor, and the state. The humidity can be relative humidity or absolute humidity. The mass of the OMPA input is measured to be M1 prior to the start of the HIP state (P1) at time, $t_1$. The value of the mass M1 may fall into a category that requires the OMPA to run the HIP state for a minimum amount of time. Thus, the OMPA is scheduled to run from time, $t_1$, to time, $t_2$. Note that during the HIP runtime, the mass stabilizes at a relatively constant mass and the delta humidity also stabilizes at a relatively constant delta humidity before the timeline reaches time, $t_2$. Thus, although the sensor data (e.g., stable mass and stable delta humidity) indicate that OMPA could transition to the sanitize state before time, $t_2$, the OMPA may continue to run in the HIP state for the minimum runtime. Operating the OMPA in the HIP state for the minimum run time may ensure that any latent release of moisture is effectively treated during the HIP state. For example, some OMPA input items may be more resistant to releasing its moisture than other items. Thus, sufficient time is provided for the OMPA to extract any moisture from all OMPA input contained therein. Moreover, even though this illustrative timing diagram does not show a latent moisture release, there are scenarios in which moisture may be released later in the HIP runtime.

Figure 38:
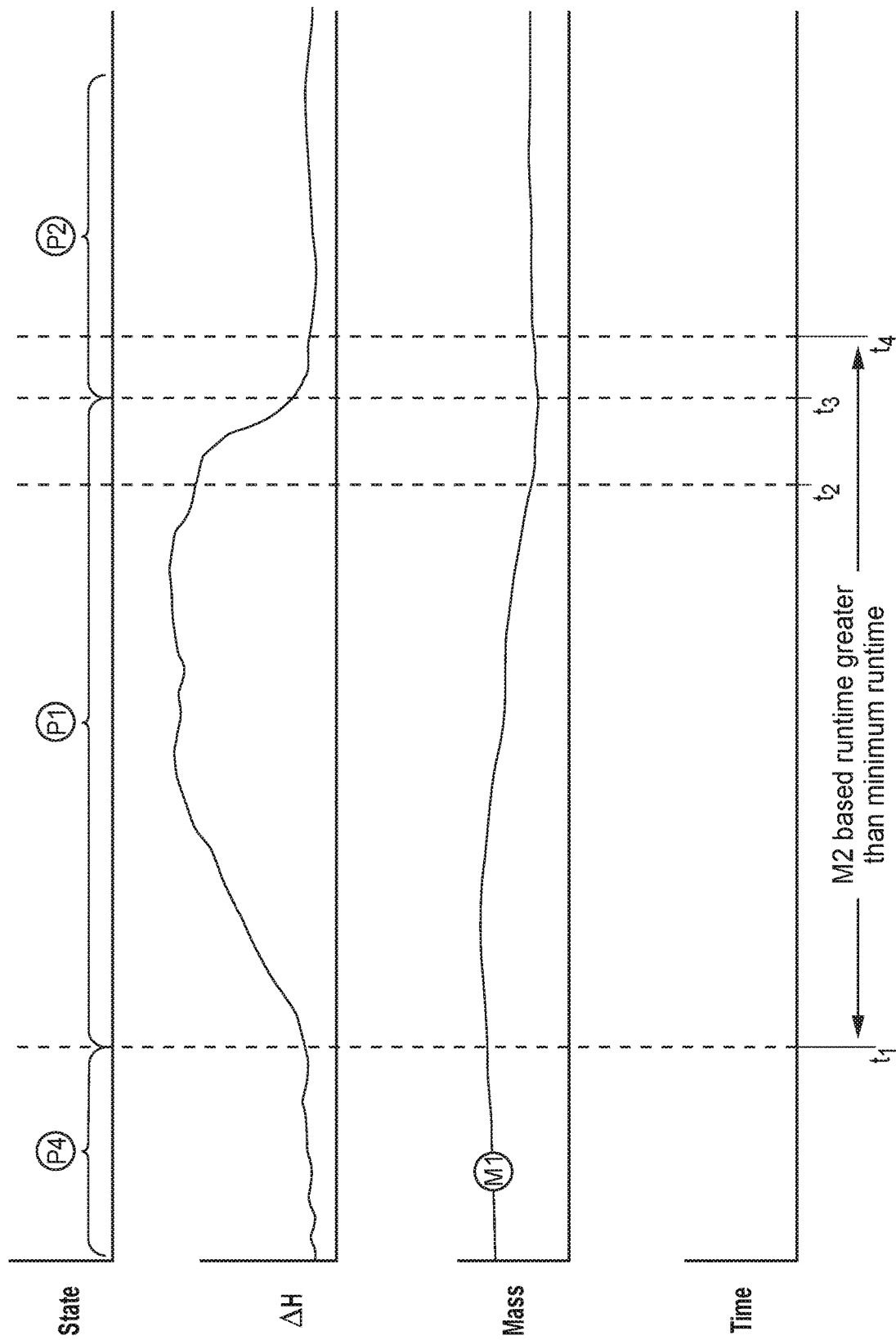
FIG. 38 shows another illustrative timing diagram according to an embodiment.

FIG. 38 shows another illustrative timing diagram according to an embodiment. FIG. 38 shows time, mass, delta in humidity between the lid sensor and the ATS inlet sensor, and the state. The humidity can be relative humidity or absolute humidity. The mass of the OMPA input is measured to be M2 prior to the start of the HIP state (P1) at time, $t_1$. The value of the mass M2 may fall into a category that requires the OMPA to run the HIP state for a M2 based lookup table runtime, spanning from time $t_1$ to $t_4$, and which is a runtime greater than the minimum runtime. During the HIP runtime, the delta humidity and mass stabilize at time $t_2$. The OMPA may confirm that the delta humidity and mass remain stabilized for a fixed period of time (e.g., thirty minutes) before transitioning to the sanitize state at time $t_3$. In this illustrative timing diagram, the OMPA transitions to the next state (e.g., the sanitize state) when the sensor data indicates that the humidity and mass values have stabilized prior to the end of the M2 runtime.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

The following provides a listing of various claim sets focusing on OMPAs and the use thereof. The claims, including the incorporated disclosures, cover various embodiments or configurations, methods, algorithms, and structures related to the embodiments defined herein. Features may be mixed between the various claim sets. Thus, various concepts covered in these claims can be integrated into different embodiments. The statement sets below are organized into different concepts. Each statement can be combined with any other statement. References to "any previous statement"

expressly extend beyond just the particular subset of statements but refers to any of the statements below.

Statement 1. A method for controlling an organic matter processing apparatus (OMPA), the OMPA comprising a control unit, a first heater for heating a bucket assembly, a grinding mechanism, a first fan, a second fan, a second heater for heating ambient air, a first humidity sensor, and a second humidity sensor, the method comprising:
 receiving a plurality of OMPA algorithm inputs comprising intra-device sensor data inputs including mass data and humidity data, interrupt event inputs, and timing inputs including a current time, time windows, and runtimes;
 executing an OMPA algorithm that controls operation of the OMPA to convert OMPA input to OMPA output by managing transitions among a plurality of processing states, wherein each of the plurality of processing states comprises a time window, a runtime, and hardware execution parameters, and wherein transitions among the plurality of processing states are based on the received plurality of OMPA algorithm inputs; and
 controlling operation of the OMPA according to the hardware execution parameters of one of the processing states selected by the OMPA algorithm.

Statement 2. The method of any preceding statement, further comprising assigning time windows to each of the plurality of processing states, wherein the time window defines when the OMPA algorithm can transition to that processing state.

Statement 3. The method of any preceding statement, wherein each time window comprises a start time and an end time, wherein the start time and the end time is based on default parameters, user configurable parameters, look-up table parameters, or a combination thereof.

Statement 4. The method of any preceding statement, wherein the plurality of processing states comprise:
 a high intensity processing (HIP) state;
 a boost HIP state;
 a sanitize state;
 a cooldown state;
 a fixed time low intensity processing (LIP) state;
 a burst LIP state; and
 a standby state.

Statement 5. The method of any preceding statement, wherein hardware execution parameters of the HIP state comprise a HIP bucket temperature for the first heater, a HIP fan speed for the first fan, a HIP grinding routine for the grinding mechanism, and optional activation of the second heater.

Statement 6. The method of any preceding statement, wherein hardware execution parameters of the sanitize state comprise a sanitize bucket temperature for the first heater, a sanitize grinding routine for the grinding mechanism, wherein the sanitize bucket temperature is greater the HIP bucket temperature, wherein the first fan and the second fan operate at respective sanitize fan speeds, and wherein the second heater is turned off.

Statement 7. The method of any preceding statement, wherein hardware execution parameters of the cooldown state comprise respective cooldown fan speeds of the first fan and the second fan, and a cooldown grinding routine, and wherein the first heater and the second heater are turned off.

Statement 8. The method of any preceding statement, wherein hardware execution parameters of the fixed time LIP state comprise a LIP grinding routine and wherein the first fan, the first heater, and the second heater are turned off, and wherein the burst time LIP state comprises the LIP grinding routine and wherein the first fan, the first heater, and the second heater are turned off.

Statement 9. The method of any preceding statement, wherein the burst LIP state is executed in response to an interrupt event that occurs within the time window assigned to the burst LIP state;
 wherein the fixed time LIP state is executed at a start of the time window assigned to the fixed time LIP state;
 wherein the HIP state is executed at the start of the time window assigned to the HIP state;
 wherein the sanitize state is executed immediately following an end of the runtime of the HIP state; and
 wherein the cooldown state is executed immediately following an end of the runtime of the sanitize state.

Statement 10. The method of any preceding statement, wherein the second fan is turned on during execution of the HIP state and the cooldown state and turned off during execution of the standby state, the burst LIP state, the fixed time LIP state, and the sanitize state.

Statement 11. The method of any preceding statement, wherein hardware execution parameters of the standby state comprise non activation of the first heater, the second heater, the grinding mechanism, the first fan, and the second fan.

Statement 2. The method of any preceding statement, wherein the plurality of states further comprise a vacation mode state, wherein hardware execution parameters of the vacation mode state comprise a HIP bucket temperature for the first heater, a HIP fan speed for the first fan, a HIP grinding routine for the grinding mechanism, and optional activation of the second heater, and wherein the second fan is turned on.

Statement 13. The method of any preceding statement, wherein the runtimes specify how long the OMPA operates according to the hardware execution parameters for a particular processing state.

Statement 14. The method of any preceding statement, wherein each runtime is based on default parameters or look-up table parameters, wherein the look-up table parameters use mass data to determine runtimes for the HIP state, the sanitize state, and the cooldown state.

Statement 15. The method of any preceding statement, further comprising:
 during the runtime of the HIP state, monitoring at least one of the mass data and the humidity data to determine whether to increase a duration of the runtime or to transition to another one of the plurality of processing states;
 increasing the duration of the runtime when at least one of the mass data and the humidity data indicate that the OMPA input has not been sufficiently converted to OMPA output; and
 transitioning to another one of the plurality of states when at least one of the mass data and the humidity data indicate that the OMPA input has been sufficiently converted to OMPA output.

Statement 16. The method of any preceding statement, wherein the plurality of OMPA algorithm inputs further comprise:
 weather data;
 utility power data; and
 OMPA output parameters.

Statement 17. An organic matter processing apparatus (OMPA), comprising:
 a first heater for heating a bucket assembly and a second heater for heating ambient air being forced into the bucket assembly;

a grinding mechanism driven by a motor;

a first fan for forcing ambient air into the bucket assembly and a second fan for pulling untreated air from the bucket assembly;

a first humidity sensor for monitoring the ambient air and a second humidity sensor for monitoring the untreated air;

a mass sensing system operative to measure mass; and a control unit operative to:

receive humidity data from the first humidity sensor and the second humidity sensor;

receive mass data from the mass sensing system; and execute an OMPA algorithm that controls conversion of OMPA input to OMPA output by managing transitions among a plurality of processing states, wherein each processing state comprises a time window, a runtime, and hardware execution parameters that control the first heater, the second heater, the motor, the first fan, and the second fan, and wherein transitions among the plurality of processing states are based on a schedule, the received mass data, and the received humidity data.

Statement 18. The OMPA of any preceding statement, wherein the schedule is derived from the time window and runtime assigned to each processing state.

Statement 19. The OMPA of any preceding statement, wherein the control unit is further operative to assign time windows to each of the plurality of processing states, wherein the time window defines when the OMPA algorithm can transition to that processing state.

Statement 20. The OMPA of any preceding statement, wherein each time window comprises a start time and an end time, wherein the start time and the end time is based on default parameters, user configurable parameters, look-up table parameters, or a combination thereof.

Statement 21. The OMPA of any preceding statement, wherein the plurality of processing states comprise:

a high intensity processing (HIP) state;

a boost HIP state;

a sanitize state;

a cooldown state;

a fixed time low intensity processing (LIP) state;

a burst LIP state; and a standby state.

Statement 22. The OMPA of any preceding statement, wherein hardware execution parameters of the HIP state comprise a HIP bucket temperature for the first heater, a HIP fan speed for the first fan, a HIP grinding routine for the grinding mechanism, and optional activation of the second heater.

Statement 23. The OMPA of any preceding statement, wherein hardware execution parameters of the sanitize state comprise a sanitize bucket temperature for the first heater, a sanitize grinding routine for the grinding mechanism, wherein the sanitize bucket temperature is greater than the HIP bucket temperature, wherein the first fan and the second fan operate at respective sanitize fan speeds, and wherein the second heater is turned off.

Statement 24. The OMPA of any preceding statement, wherein hardware execution parameters of the cooldown state comprise respective cooldown fan speeds of the first fan and the second fan, and a cooldown grinding routine, and wherein the first heater and the second heater are turned off.

Statement 25. The OMPA of any preceding statement, wherein hardware execution parameters of the fixed time LIP state comprise a LIP grinding routine and wherein the first fan, the first heater, and the second heater are turned off, and wherein the burst time LIP state comprises the LIP grinding routine and wherein the first fan, the first heater, and the second heater are turned off.

Statement 26. The OMPA of any preceding statement, wherein the burst LIP state is executed in response to an interrupt event that occurs within the time window assigned to the burst LIP state;

wherein the fixed time LIP state is executed at a start of the time window assigned to the fixed time LIP state;

wherein the HIP state is executed at the start of the time window assigned to the HIP state;

wherein the sanitize state is executed immediately following an end of the runtime of the HIP state; and wherein the cooldown state is executed immediately following an end of the runtime of the sanitize state.

Statement 27. The OMPA of any preceding statement, wherein the second fan is turned on during execution of the HIP state and the cooldown state and turned off during execution of the standby state, the burst LIP state, the fixed time LIP state, and the sanitize state.

Statement 28. The OMPA of any preceding statement, wherein hardware execution parameters of the standby state comprise non activation of the first heater, the second heater, the motor, the first fan, and the second fan.

Statement 29. The OMPA of any preceding statement, wherein the plurality of states further comprise a vacation mode state, wherein hardware execution parameters of the vacation mode state comprise a HIP bucket temperature for the first heater, a HIP fan speed for the first fan, a HIP grinding routine for the grinding mechanism, and optional activation of the second heater, and wherein the second fan is turned on.

Statement 30. The OMPA of any preceding statement, wherein the runtimes specify how long the OMPA operates according to the hardware execution parameters for a particular processing state.

Statement 31. The OMPA of any preceding statement, wherein each runtime is based on default parameters or look-up table parameters, wherein the look-up table parameters use mass data to determine runtimes for the HIP state, the sanitize state, and the cooldown state.

Statement 32. The OMPA of any preceding statement, wherein the control unit is further operative to:

during the runtime of the HIP state, monitor at least one of the mass data and the humidity data to determine whether to increase a duration of the runtime or to transition to another one of the plurality of processing states;

increase the duration of the runtime when the least one of the mass data and the humidity data indicate that the OMPA input has not been sufficiently converted to OMPA output; and transition to another one of the plurality of states when the at least one of the mass data and the humidity data indicate that the OMPA input has been sufficiently converted to OMPA output.

Statement 33. The OMPA of any preceding statement, wherein the control unit is further operative to:

operate the OMPA in the runtime of a HIP state;

in response to a lid open event:

stop execution of the HIP state; and obtain first mass data during opening of the lid or immediately after the lid has opened; and in response to a lid close event:

obtain second mass data after the lid has closed;

adjust runtimes of the HIP state, a sanitize state, and a cooldown state based on the second mass data; and resume OMPA operation for the adjusted runtime of the HIP state.

Statement 34. The OMPA of any preceding statement, wherein the control unit is further operative to:
 filter the received humidity data to time average the received humidity data, the time averaged humidity data comprise filtered ambient air data and filtered untreated air data;
 execute runtime of the OMPA in an HIP state;
 if the filtered ambient air data has a moisture value that falls below ambient moisture threshold, operate the first fan, the first heater, and the motor but not the second heater;
 if the filtered ambient air data has a moisture value that equals or exceeds the ambient moisture threshold, operate the first fan, the first heater, the motor, and the second heater; and
 transition to a sanitize processing state when the runtime for the HIP state has expired or if the filtered untreated air data has a moisture value that falls below an OMPA output moisture threshold.

Statement 35. A method for controlling an organic matter processing apparatus (OMPA), comprising:
 receiving OMPA output parameters defining a desiccation quantity per unit of mass of OMPA output;
 restarting a fixed time OMPA processing cycle;
 receiving pre-existing mass data;
 assigning respective time windows to a plurality of OMPA states;
 assigning respective runtimes to a first subset of the plurality of OMPA states;
 receiving OMPA input during an OMPA input collection period;
 obtaining mass data during or after an end of the OMPA input collection period;
 assigning respective runtimes to a second subset of the plurality of OMPA states based on the obtained mass data and the received pre-existing mass data; and
 executing an OMPA algorithm by selectively progressing through the OMPA states based, in part, on the time windows and the runtimes to convert OMPA input to OMPA output that satisfies the OMPA output parameters.

Statement 36. The method of any preceding statement, further comprising:
 obtaining end of cycle mass data when the fixed time OMPA processing cycle is complete; and
 updating the pre-existing mass data with the end of cycle mass data.

Statement 37. The method of any preceding statement, further comprising adjusting time windows for the OMPA states included in the second subset based on the obtained mass data and the received pre-existing data.

Statement 38. The method of any preceding statement, further comprising:
 obtaining relative humidity data during or after the end of the OMPA input collection period; and
 assigning respective runtimes to the second subset of the plurality of OMPA states based on the obtained mass data, the received pre-existing mass data, and the obtained relative humidity data.

Statement 39. The method of any preceding statement, further comprising. further comprising adjusting time windows for the OMPA states included in the second subset based on the obtained mass data, the received pre-existing data, and the obtained relative humidity data.

Statement 40. The method of any preceding statement, wherein the plurality of OMPA states comprise a standby state, a high intensity processing (HIP) state, a sanitize state, a cooldown state, a fixed time low intensity processing (LIP) state, a burst LIP state, and a vacation mode state.

Statement 41. The method of any preceding statement, wherein the first subset of OMPA states include the standby state, the fixed LIP state, the burst LIP state, and the vacation mode state, and wherein the second subset of OMPA states include the HIP state, the sanitize state, and the cooldown state.

Statement 42. The method of any preceding statement, wherein the fixed LIP state is scheduled to be executed prior to the HIP state, wherein the sanitize state is scheduled to be executed immediately after the HIP state, and wherein the cooldown state is scheduled to be executed immediately after the sanitize state.

Statement 43. The method of any preceding statement, wherein the burst LIP state is selected by the OMPA algorithm in response to an interruption event the occurs during the time window assigned to the burst LIP state, wherein the interruption event comprises a lid opening event.

Statement 44. The method of any preceding statement, wherein the vacation mode state is selected by the OMPA algorithm when OMPA output exist within the OMPA and no new OMPA input has been added within a fixed period of time.

Statement 45. The method of any preceding statement, wherein the OMPA input collection period spans a time period between a beginning of the restart of the fixed time OMPA processing cycle and a beginning of a HIP state.

Statement 46. The method of any preceding statement, wherein said executing the OMPA algorithm comprises:
 determining which of the OMPA states to execute based, in part, on a time and the assigned time windows, wherein the determined OMPA state is a current processing state;
 executing the current processing state for the runtime assigned to that processing state;
 monitoring relative humidity and mass to determine whether to transition to a different one of the plurality of OMPA states before expiry of the runtime assigned to the current processing state; and
 transitioning to the different one of the plurality of OMPA states when the monitored relative humidity, the monitored mass, or a combination thereof support a pre-emptive state change transition.

Statement 47. The method of any preceding statement, wherein said executing the OMPA algorithm comprises:
 determining which of the OMPA states to execute based, in part, on a time and the time windows, wherein the determined OMPA state is a current processing state;
 executing the current processing state for the runtime assigned to that processing state;
 monitoring relative humidity and mass; and
 when the runtime for the currently processing state has expired:
  extending the runtime for the current processing state if the monitored relative humidity, the monitored mass, or a combination thereof do not satisfy OMPA output parameters; and
  transitioning to a different one of the plurality of OMPA states when the monitored relative humidity, the monitored mass, or a combination thereof satisfy OMPA output parameters.

Statement 48. An organic matter processing apparatus (OMPA), comprising:
- a first heater for heating a bucket assembly and a second heater for heating ambient air being forced into the bucket assembly;
- a grinding mechanism driven by a motor;
- a first fan for forcing ambient air into the bucket assembly and a second fan for pulling untreated air from the bucket assembly;
- a first sensor for monitoring the ambient air and a second sensor for monitoring the untreated air;
- a mass sensing system operative to measure mass; and
- a control unit operative to:
  - receive OMPA output parameters defining a desiccation quantity per unit of mass of OMPA output;
  - restart a fixed time OMPA processing cycle;
  - receive pre-existing mass data;
  - assign respective time windows to a plurality of OMPA states;
  - assign respective runtimes to a first subset of the plurality of OMPA states;
  - receive OMPA input during an OMPA input collection period;
  - obtain mass data during or after an end of the OMPA input collection period;
  - assign respective runtimes to a second subset of the plurality of OMPA states based on the obtained mass data and the received pre-existing mass data; and
  - execute the fixed time OMPA processing cycle by selectively progressing through the OMPA states based, in part, on the time windows and the runtimes to convert OMPA input to OMPA output that satisfies the OMPA output parameters.

Statement 49. The OMPA of any preceding statement, wherein each OMPA state comprises hardware execution parameters that specify how the first heater, the second heater, the motor, the first fan, and the second operate during the runtime assigned to that OMPA state.

Statement 50. The OMPA of any preceding statement, wherein the control unit is further operative to:
- obtain end of cycle mass data when the fixed time OMPA processing cycle is complete; and
- update the pre-existing mass data with the end of cycle mass data.

Statement 51. The OMPA of any preceding statement, wherein the control unit is further operative to adjust time windows for the OMPA states included in the second subset based on the obtained mass data and the received pre-existing data.

Statement 52. The OMPA of any preceding statement, wherein the control unit is further operative to:
- obtain relative humidity data during or after the end of the OMPA input collection period; and
- assign respective runtimes to the second subset of the plurality of OMPA states based on the obtained mass data, the received pre-existing mass data, and the obtained relative humidity data.

Statement 53. The OMPA of any preceding statement, wherein the control unit is further operative to:
- adjust time windows for the OMPA states included in the second subset based on the obtained mass data, the received pre-existing data, and the obtained relative humidity data.

Statement 54. The OMPA of any preceding statement, wherein the plurality of OMPA states comprise a standby state, a high intensity processing (HIP) state, a sanitize state, a cooldown state, a fixed time low intensity processing (LIP) state, a burst LIP state, and a vacation mode state.

Statement 55. The OMPA of any preceding statement, wherein the first subset of OMPA states include the standby state, the fixed LIP state, the burst LIP state, and the vacation mode state, and wherein the second subset of OMPA states include the HIP state, the sanitize state, and the cooldown state.

Statement 56. The OMPA of any preceding statement, wherein the fixed LIP state is scheduled to be executed prior to the HIP state, wherein the sanitize state is scheduled to be executed immediately after the HIP state, and wherein the cooldown state is scheduled to be executed immediately after the sanitize state.

Statement 57. The OMPA of any preceding statement, wherein the burst LIP state is selected by the OMPA algorithm in response to an interruption event the occurs during the time window assigned to the burst LIP state, wherein the interruption event comprises a lid opening event.

Statement 58. The OMPA of any preceding statement, wherein the vacation mode state is selected by the OMPA algorithm when OMPA output exist within the OMPA and no new OMPA input has been added within a fixed period of time.

Statement 59. The OMPA of any preceding statement, wherein the OMPA input collection period spans a time period between a beginning of the restart of the fixed time OMPA processing cycle and a beginning of a HIP state.

Statement 60. The OMPA of any preceding statement, wherein the control unit is operative to:
- determine which of the OMPA states to execute based, in part, on a time and the assigned time windows, wherein the determined OMPA state is a current processing state;
- execute the current processing state for the runtime assigned to that processing state;
- monitor relative humidity and mass to determine whether to transition to a different one of the plurality of OMPA states before expiry of the runtime assigned to the current processing state; and
- transition to the different one of the plurality of OMPA states when the monitored relative humidity, the monitored mass, or a combination thereof support a preemptive state change transition.

Statement 61. The OMPA of any preceding statement, wherein the control unit is further operative to:
- determine which of the OMPA states to execute based, in part, on a time and the time windows, wherein the determined OMPA state is a current processing state;
- execute the current processing state for the runtime assigned to that processing state;
- monitor relative humidity and mass; and
- when the runtime for the currently processing state has expired:
  - extend the runtime for the current processing state if the monitored relative humidity, the monitored mass, or a combination thereof do not satisfy OMPA output parameters; and
  - transition to a different one of the plurality of OMPA states when the monitored relative humidity, the monitored mass, or a combination thereof satisfy OMPA output parameters.

What is claimed is:

1. A method for controlling an organic matter processing apparatus (OMPA), the OMPA comprising a control unit, a first heater for heating a bucket assembly, a grinding mechanism, a first fan, a second fan, a second heater for heating ambient air, a first humidity sensor, and a second humidity sensor, the method comprising:

receiving a plurality of OMPA algorithm inputs comprising intra-device sensor data inputs including mass data and humidity data, interrupt event inputs, and timing inputs including a current time, time windows, and runtimes;

executing an OMPA algorithm that controls operation of the OMPA to convert OMPA input to OMPA output by managing transitions among a plurality of processing states, wherein each of the plurality of processing states comprises a time window, a runtime, and hardware execution parameters, and wherein transitions among the plurality of processing states are based on the received plurality of OMPA algorithm inputs; and controlling operation of the OMPA according to the hardware execution parameters of one of the processing states selected by the OMPA algorithm.

2. The method of claim 1, further comprising assigning time windows to each of the plurality of processing states, wherein the time window defines when the OMPA algorithm can transition to that processing state.

3. The method of claim 2, wherein each time window comprises a start time and an end time, wherein the start time and the end time is based on default parameters, user configurable parameters, look-up table parameters, or a combination thereof.

4. The method of claim 1, wherein the plurality of processing states comprise:
a high intensity processing (HIP) state;
a boost HIP state;
a sanitize state;
a cooldown state;
a fixed time low intensity processing (LIP) state;
a burst LIP state; and
a standby state.

5. The method of claim 4, wherein hardware execution parameters of the HIP state comprise a HIP bucket temperature for the first heater, a HIP fan speed for the first fan, a HIP grinding routine for the grinding mechanism, and optional activation of the second heater.

6. The method of claim 5, wherein hardware execution parameters of the sanitize state comprise a sanitize bucket temperature for the first heater, a sanitize grinding routine for the grinding mechanism, wherein the sanitize bucket temperature is greater the HIP bucket temperature, wherein the first fan and the second fan operate at respective sanitize fan speeds, and wherein the second heater is turned off.

7. The method of claim 6, wherein hardware execution parameters of the cooldown state comprise respective cooldown fan speeds of the first fan and the second fan, and a cooldown grinding routine, and wherein the first heater and the second heater are turned off.

8. The method of claim 7, wherein hardware execution parameters of the fixed time LIP state comprise a LIP grinding routine and wherein the first fan, the first heater, and the second heater are turned off, and wherein the burst time LIP state comprises the LIP grinding routine and wherein the first fan, the first heater, and the second heater are turned off.

9. The method of claim 8, wherein the burst LIP state is executed in response to an interrupt event that occurs within the time window assigned to the burst LIP state;

wherein the fixed time LIP state is executed at a start of the time window assigned to the fixed time LIP state;

wherein the HIP state is executed at the start of the time window assigned to the HIP state;

wherein the sanitize state is executed immediately following an end of the runtime of the HIP state; and wherein the cooldown state is executed immediately following an end of the runtime of the sanitize state.

10. The method of claim 8, wherein the second fan is turned on during execution of the HIP state and the cooldown state and turned off during execution of the standby state, the burst LIP state, the fixed time LIP state, and the sanitize state.

11. The method of claim 8, wherein hardware execution parameters of the standby state comprise non activation of the first heater, the second heater, the grinding mechanism, the first fan, and the second fan.

12. The method of claim 4, wherein the plurality of states further comprise a vacation mode state, wherein hardware execution parameters of the vacation mode state comprise a HIP bucket temperature for the first heater, a HIP fan speed for the first fan, a HIP grinding routine for the grinding mechanism, and optional activation of the second heater, and wherein the second fan is turned on.

13. The method of claim 1, wherein the runtimes specify how long the OMPA operates according to the hardware execution parameters for a particular processing state.

14. The method of claim 10, wherein each runtime is based on default parameters or look-up table parameters, wherein the look-up table parameters use mass data to determine runtimes for the HIP state, the sanitize state, and the cooldown state.

15. The method of claim 1, further comprising:
during the runtime of a high intensity processing (HIP) state, monitoring at least one of the mass data and the humidity data to determine whether to increase a duration of the runtime or to transition to another one of the plurality of processing states;

increasing the duration of the runtime when at least one of the mass data and the humidity data indicate that the OMPA input has not been sufficiently converted to OMPA output; and transitioning to another one of the plurality of states when at least one of the mass data and the humidity data indicate that the OMPA input has been sufficiently converted to OMPA output.

16. The method of claim 1, wherein the plurality of OMPA algorithm inputs further comprise:
weather data;
utility power data; and
OMPA output parameters.

17. An organic matter processing apparatus (OMPA), comprising:
a first heater for heating a bucket assembly and a second heater for heating ambient air being forced into the bucket assembly;
a grinding mechanism driven by a motor;
a first fan for forcing ambient air into the bucket assembly and a second fan for pulling untreated air from the bucket assembly;
a first humidity sensor for monitoring the ambient air and a second humidity sensor for monitoring the untreated air;
a mass sensing system operative to measure mass; and
a control unit operative to:
receive humidity data from the first humidity sensor and the second humidity sensor;

receive mass data from the mass sensing system; and
execute an OMPA algorithm that controls conversion of OMPA input to OMPA output by managing transitions among a plurality of processing states, wherein each processing state comprises a time window, a runtime, and hardware execution parameters that control the first heater, the second heater, the motor, the first fan, and the second fan, and wherein transitions among the plurality of processing states are based on a schedule, the received mass data, and the received humidity data.

18. The OMPA of claim 17, wherein the schedule is derived from the time window and runtime assigned to each processing state.

19. The OMPA of claim 17, wherein the control unit is further operative to assign time windows to each of the plurality of processing states, wherein the time window defines when the OMPA algorithm can transition to that processing state.

20. The OMPA of claim 19, wherein each time window comprises a start time and an end time, wherein the start time and the end time is based on default parameters, user configurable parameters, look-up table parameters, or a combination thereof.

21. The OMPA of claim 17, wherein the plurality of processing states comprise:
a high intensity processing (HIP) state;
a boost HIP state;
a sanitize state;
a cooldown state;
a fixed time low intensity processing (LIP) state;
a burst LIP state; and
a standby state.

22. The OMPA of claim 21, wherein hardware execution parameters of the HIP state comprise a HIP bucket temperature for the first heater, a HIP fan speed for the first fan, a HIP grinding routine for the grinding mechanism, and optional activation of the second heater.

23. The OMPA of claim 22 wherein hardware execution parameters of the sanitize state comprise a sanitize bucket temperature for the first heater, a sanitize grinding routine for the grinding mechanism, wherein the sanitize bucket temperature is greater than the HIP bucket temperature, wherein the first fan and the second fan operate at respective sanitize fan speeds, and wherein the second heater is turned off.

24. The OMPA of claim 23, wherein hardware execution parameters of the cooldown state comprise respective cooldown fan speeds of the first fan and the second fan, and a cooldown grinding routine, and wherein the first heater and the second heater are turned off.

25. The OMPA of claim 24, wherein hardware execution parameters of the fixed time LIP state comprise a LIP grinding routine and wherein the first fan, the first heater, and the second heater are turned off, and wherein the burst time LIP state comprises the LIP grinding routine and wherein the first fan, the first heater, and the second heater are turned off.

26. The OMPA of claim 25, wherein the burst LIP state is executed in response to an interrupt event that occurs within the time window assigned to the burst LIP state;
wherein the fixed time LIP state is executed at a start of the time window assigned to the fixed time LIP state;
wherein the HIP state is executed at the start of the time window assigned to the HIP state;
wherein the sanitize state is executed immediately following an end of the runtime of the HIP state; and
wherein the cooldown state is executed immediately following an end of the runtime of the sanitize state.

27. The OMPA of claim 25, wherein the second fan is turned on during execution of the HIP state and the cooldown state and turned off during execution of the standby state, the burst LIP state, the fixed time LIP state, and the sanitize state.

28. The OMPA of claim 25, wherein hardware execution parameters of the standby state comprise non activation of the first heater, the second heater, the motor, the first fan, and the second fan.

29. The OMPA of claim 21, wherein the plurality of states further comprise a vacation mode state, wherein hardware execution parameters of the vacation mode state comprise a HIP bucket temperature for the first heater, a HIP fan speed for the first fan, a HIP grinding routine for the grinding mechanism, and optional activation of the second heater, and wherein the second fan is turned on.

30. The OMPA of claim 17, wherein the runtimes specify how long the OMPA operates according to the hardware execution parameters for a particular processing state.

31. The OMPA of claim 30, wherein each runtime is based on default parameters or look-up table parameters, wherein the look-up table parameters use mass data to determine runtimes for the HIP state, the sanitize state, and the cooldown state.

32. The OMPA of claim 17, wherein the control unit is further operative to:
during the runtime of the HIP state, monitor at least one of the mass data and the humidity data to determine whether to increase a duration of the runtime or to transition to another one of the plurality of processing states;
increase the duration of the runtime when the least one of the mass data and the humidity data indicate that the OMPA input has not been sufficiently converted to OMPA output; and
transition to another one of the plurality of states when the at least one of the mass data and the humidity data indicate that the OMPA input has been sufficiently converted to OMPA output.

33. The OMPA of claim 17, wherein the control unit is further operative to:
operate the OMPA in the runtime of a HIP state;
in response to a lid open event:
stop execution of the HIP state; and
obtain first mass data during opening of the lid or immediately after the lid has opened; and
in response to a lid close event:
obtain second mass data after the lid has closed;
adjust runtimes of the HIP state, a sanitize state, and a cooldown state based on the second mass data; and
resume OMPA operation for the adjusted runtime of the HIP state.

34. The OMPA of claim 17, wherein the control unit is further operative to:
filter the received humidity data to time average the received humidity data, the time averaged humidity data comprise filtered ambient air data and filtered untreated air data;
execute runtime of the OMPA in an HIP state;
if the filtered ambient air data has a moisture value that falls below ambient moisture threshold, operate the first fan, the first heater, and the motor but not the second heater;

if the filtered ambient air data has a moisture value that equals or exceeds the ambient moisture threshold, operate the first fan, the first heater, the motor, and the second heater; and transition to a sanitize processing state when the runtime for the HIP state has expired or if the filtered untreated air data has a moisture value that falls below an OMPA output moisture threshold.

\* \* \* \* \*